(12) United States Patent
Zhang et al.

(10) Patent No.: US 12,551,108 B2
(45) Date of Patent: Feb. 17, 2026

(54) ANGIOGRAPHY IMAGE/VIDEO SYNCHRONIZATION WITH PULLBACK AND ANGIO DELAY MEASUREMENT

(71) Applicant: Canon U.S.A., Inc., Melville, NY (US)

(72) Inventors: Yu Zhang, Concord, MA (US); Daisuke Yamada, Cambridge, MA (US)

(73) Assignee: CANON U.S.A., INC., Mel Ville, NY (US)

( * ) Notice: Subject to any disclaimer, the term of this patent is extended or adjusted under 35 U.S.C. 154(b) by 624 days.

(21) Appl. No.: 17/936,767

(22) Filed: Sep. 29, 2022

(65) Prior Publication Data

US 2024/0108224 A1 Apr. 4, 2024

(51) Int. Cl.
*A61B 5/00* (2006.01)
*A61B 6/50* (2024.01)

(52) U.S. Cl.
CPC ............ *A61B 5/0066* (2013.01); *A61B 6/504* (2013.01); *G06T 2207/30101* (2013.01)

(58) Field of Classification Search
CPC .................................................. A61B 5/0066
See application file for complete search history.

(56) References Cited

U.S. PATENT DOCUMENTS

| | | |
|---|---|---|
| 6,763,261 B2 | 7/2004 | Casscells, III et al. |
| 7,366,376 B2 | 4/2008 | Shishkov et al. |
| 7,593,559 B2 | 9/2009 | Toth et al. |
| 7,843,572 B2 | 11/2010 | Tearney et al. |
| 7,872,759 B2 | 1/2011 | Tearney et al. |
| 7,889,348 B2 | 2/2011 | Tearney et al. |
| 8,289,522 B2 | 10/2012 | Tearney et al. |
| 8,676,013 B2 | 3/2014 | Bouma et al. |
| 8,928,889 B2 | 1/2015 | Teamney et al. |

(Continued)

FOREIGN PATENT DOCUMENTS

| | | |
|---|---|---|
| JP | 2017532173 A | 11/2017 |
| WO | 2016/015052 A1 | 1/2016 |

(Continued)

*Primary Examiner* — Joseph M Santos Rodriguez
(74) *Attorney, Agent, or Firm* — Canon U.S.A., Inc. IP Division

(57) ABSTRACT

One or more devices, systems, methods and storage mediums for optical imaging medical devices, such as, but not limited to, Optical Coherence Tomography (OCT), single mode OCT, and/or multi-modal OCT apparatuses and systems, and methods and storage mediums for use with same, for viewing, controlling, updating, and emphasizing imaging modalities, for performing angio delay determination to find relative delay difference(s) between angio image(s) and another modality image(s), and/or for performing synchronization technique(s) are provided herein. One or more embodiments provide at least one intuitive Graphical User Interface (GUI), method, device, apparatus, system, or storage medium to comprehend information, to improve or maximize accuracy in one or more images and to perform angio delay (or delay time) determination and/or synchronization. In addition to controlling one or more imaging modalities, the GUI may operate for one or more applications, including, but not limited to, angio delay measurement(s), synchronization, co-registration, and imaging.

24 Claims, 19 Drawing Sheets

(56) References Cited

U.S. PATENT DOCUMENTS

| | | |
|---|---|---|
| 9,087,368 B2 | 7/2015 | Tearney et al. |
| 9,332,942 B2 | 5/2016 | Jaffer et al. |
| 9,557,154 B2 | 1/2017 | Tearney et al. |
| 9,795,301 B2 | 10/2017 | Fleming et al. |
| 9,869,828 B2 | 1/2018 | Altshuler |
| 10,323,926 B2 | 6/2019 | Elmaanaoui |
| 10,558,001 B2 | 2/2020 | Altshuler et al. |
| 10,601,173 B2 | 3/2020 | Altshuler |
| 10,606,064 B2 | 3/2020 | Wu |
| 10,743,749 B2 | 8/2020 | Yamada |
| 10,842,589 B2 | 11/2020 | Kunio |
| 10,884,199 B2 | 1/2021 | Altshuler et al. |
| 10,895,692 B2 | 1/2021 | Yamada |
| 10,912,462 B2 | 2/2021 | Wang et al. |
| 11,175,126 B2 | 11/2021 | Elmaanaoui et al. |
| 11,375,881 B2 | 7/2022 | Hamm et al. |
| 11,473,896 B2 | 10/2022 | Elmaanaoui |
| 2009/0297034 A1 | 12/2009 | Pettigrew et al. |
| 2010/0092389 A1 | 4/2010 | Jaffer |
| 2011/0292400 A1 | 12/2011 | Fleming et al. |
| 2012/0101374 A1 | 4/2012 | Teamney et al. |
| 2014/0094689 A1 | 4/2014 | Cohen et al. |
| 2014/0276011 A1 | 9/2014 | Schmitt et al. |
| 2016/0073885 A1* | 3/2016 | Adler .................. A61B 5/0066 600/427 |
| 2016/0228097 A1 | 8/2016 | Jaffer et al. |
| 2017/0135584 A1 | 5/2017 | Tearney et al. |
| 2018/0003481 A1 | 1/2018 | Yamada et al. |
| 2018/0045501 A1 | 2/2018 | Elmaanaoui |
| 2019/0254506 A1 | 8/2019 | Hamm et al. |
| 2019/0298174 A1 | 10/2019 | Watanabe |
| 2019/0374109 A1 | 12/2019 | Wu et al. |
| 2020/0390323 A1 | 12/2020 | Yamada |
| 2021/0077037 A1 | 3/2021 | Kunio |
| 2021/0121132 A1 | 4/2021 | Watanabe et al. |
| 2021/0174125 A1 | 6/2021 | Zhang |
| 2022/0040454 A1 | 2/2022 | Hamm et al. |
| 2022/0042783 A1 | 2/2022 | Elmaanaoui |
| 2022/0044428 A1 | 2/2022 | Elmaanaoui et al. |
| 2023/0389892 A1 | 12/2023 | Palermo et al. |

FOREIGN PATENT DOCUMENTS

| | | |
|---|---|---|
| WO | 2016/144878 A1 | 9/2016 |
| WO | 2021/055837 A9 | 3/2021 |

\* cited by examiner n₀: frames where the linear stage is stationary (during time t0)
nₐ: where catheter imaging core start moving on angio image at time ta

ANGIOGRAPHY IMAGE/VIDEO SYNCHRONIZATION WITH PULLBACK AND ANGIO DELAY MEASUREMENT

FIELD OF THE INVENTION

This present disclosure generally relates to computer imaging and/or to the field of optical imaging, particularly to devices/apparatuses, systems, methods, and storage mediums for performing image/video synchronization with pullback and delay measurement and/or for using one or more imaging modalities, such as, but not limited to, angiography, Optical Coherence Tomography (OCT), Multi-modality OCT (MM-OCT), near-infrared fluorescence (NIRF), near-infrared auto-fluorescence (NIRAF), OCT-NIRAF, robot imaging, snake robot imaging, etc. Examples of OCT applications include imaging, evaluating, and diagnosing biological objects, including, but not limited to, for gastro-intestinal, pulmonary, cardio, ophthalmic, and/or intravascular applications, and being obtained via one or more optical instruments, including but not limited to, one or more optical probes, one or more catheters, one or more endoscopes, one or more capsules (e.g., one or more tethered capsules), and one or more needles (e.g., a biopsy needle). One or more devices, systems, methods and storage mediums for characterizing, examining and/or diagnosing, and/or measuring a target, sample, or object in application(s) using an apparatus or system that uses and/or controls one or more imaging modalities are discussed herein.

BACKGROUND OF THE INVENTION

Fiber optic catheters and endoscopes have been developed to access to internal organs. For example in cardiology, Optical Coherence Tomography (OCT) has been developed to see depth resolved images of vessels with a catheter. The catheter, which may include a sheath, a coil, and an optical probe, may be navigated to a coronary artery.

OCT is a technique for obtaining high-resolution cross-sectional images of tissues or materials, and enables real time visualization. The aim of the OCT techniques is to measure the time delay of light by using an interference optical system or interferometry, such as via Fourier Transform or Michelson interferometers. A light from a light source delivers and splits into a reference arm and a sample (or measurement) arm with a splitter (e.g., a beamsplitter). A reference beam is reflected from a reference mirror (partially reflecting or other reflecting element) in the reference arm while a sample beam is reflected or scattered from a sample in the sample arm. Both beams combine (or are recombined) at the splitter and generate interference patterns. The output of the interferometer is detected with one or more detectors, such as, but not limited to, photodiodes or multi-array cameras, in one or more devices, such as, but not limited to, a spectrometer (e.g., a Fourier Transform infrared spectrometer). The interference patterns are generated when the path length of the sample arm matches that of the reference arm to within the coherence length of the light source. By evaluating the output beam, a spectrum of an input radiation may be derived as a function of frequency. The frequency of the interference patterns corresponds to the distance between the sample arm and the reference arm. The higher frequencies are, the more the path length differences are. Single mode fibers may be used for OCT optical probes, and double clad fibers may be used for fluorescence and/or spectroscopy.

A multi-modality system such as an OCT, fluorescence, and/or spectroscopy system with an optical probe is developed to obtain multiple information at the same time. During vascular diagnosis and intervention procedures, such as Percutaneous Coronary Intervention (PCI), users of optical coherence tomography (OCT) sometimes have difficulty understanding the tomography image in correlation with other modalities because of an overload of information, which causes confusion in image interpretation.

Additionally, in situations where two different images or videos, such as an intravascular image or video and an angiography image or video, are displayed side-by-side or on a display together, users (e.g., technicians, physicians, clinicians, etc.) may obtain the impression that the two images or videos have a certain association. For example, a side-by-side view may suggest that the two images or videos happen at the same time. However, based on a design of an imaging or information processing apparatus or system (e.g., an OCT apparatus or system), the two image or video sequences come from two completely independent paths. The origins of the two images or videos often have slightly different latency in terms of image or video data arrivals to a software component, a processor component, or a memory or memory pool. During such an arrival, a defined time stamp typically is given for each image or video frame by a clock of the apparatus or system. Such time stamps are not the exact time when the data has been acquired.

In order to achieve a goal to display the synchronized images or videos coming from two data sources, there is a need to figure out the correct relative delay difference between the images or videos. One method proposed before is to conduct a coregistration process on data available in a pullback to calculate a delay (e.g., angio delay) on each angio frame. However, such a process is computationally intensive and may lead to error-prone result(s). In addition, such a process is dependent on each pullback and accuracy is likely to be detrimentally affected by anatomy or structure of a blood vessel.

Accordingly, it would be desirable to provide at least one imaging, information, or optical apparatus/device, system, method, and storage medium for using, controlling, and/or emphasizing one or more imaging modalities (such as, but not limited to, angiography, tomography, OCT, etc.) and for determining a correct delay difference between two different or independently received images or videos. It also would be desirable to provide at least one imaging, information, or optical apparatus/device, system, method, and storage medium for ensuring that side-by-side views or contemporaneous views on a display are showing synchronized images or videos that have come from two or more independent sources.

SUMMARY OF THE INVENTION

Accordingly, it is abroad object of the present disclosure to provide imaging (e.g., OCT, Intravascular Imaging (IVI), IVUS, NIRF, NIRAF, SNAKE robots, robots, etc.) apparatuses, systems, methods, and storage mediums for using and/or controlling multiple imaging modalities, that apply image and/or video synchronization with delay measurement(s). It is also a broad object of the present disclosure to provide OCT devices, systems, methods, and storage mediums using an interference optical system, such as an interferometer (e.g., spectral-domain OCT (SD-OCT), swept-source OCT (SS-OCT), multimodal OCT (MM-OCT), Intravascular Ultrasound (IVUS), Near-Infrared Autofluorescence (NIRAF), Near-Infrared Spectroscopy (NIRS), Near-Infrared Fluorescence (NIRF), therapy modality using light, sound, or other source of radiation, etc.).

One or more embodiments provide at least one intuitive Graphical User Interface (GUI), method, device, apparatus, system, or storage medium to comprehend information, including, but not limited to, molecular structure of an object (e.g., a vessel), and to provide an ability to perform image and/or video synchronization and/or to determine delay or angio delay.

One or more embodiments of the present disclosure operate to figure out the correct relative delay difference between images or videos. Such relative delay between an angiography image or video and an image or video of another type (such as, but not limited to, an intravascular image or video, an OCT image or video, etc.) is referred to herein as "angio delay" or "angio delay time". More generally, such a delay difference is referred to herein as "delay" or "delay time".

One or more embodiments of any method discussed herein (e.g., synchronization method(s), delay or angio delay determination method(s), detecting method(s), imaging or visualization method(s), etc.) may be used with any feature or features of the apparatuses, systems, other methods, storage mediums, or other structures discussed herein.

One or more embodiments of the present disclosure may use a system for one or more imaging modalities that employs a GUI to display an image of one imaging modality side-by-side with, or along with, an image of another imaging modality on a display. For example, while not limited hereto, one or more embodiments may be for an OCT system or an MM-OCT system having a GUI that operates to display a tomography image or video frame(s) along with, or side-by-side with, an angiography image or video frame(s).

Using one or more of the features or techniques of the present disclosure, one or more embodiments may achieve one or more of the following: (i) define a delay (e.g., an angio delay for an angio video or image) and related concepts and clarify the best method(s) to calculate the delay to manage multiple measurements (e.g., in a software or processor Service Mode before normal pullback(s)); (ii) use a normal pullback process with zoomed-in angiography view and linear regression to calculate an accurate delay measurement(s) (e.g., accurate angio delay measurement(s)) (e.g., at least a first embodiment of a method of the present disclosure); (iii) use a spinning device with geometric (e.g., triangular) windows on angiography and a catheter with an LED (e.g., a NIRF and/or NIRAF light LED) and a rotational switch to measure delay time (e.g., angio delay time); (iv) save and manage multiple delay measurements (e.g., angio delay measurements) in a Service Mode table and apply the averaged result as the delay (e.g., angio delay) applied for pullbacks acquired in a same operating room (OR) environment; and/or (v) use a Service Mode that supports improved visualization components in a GUI of one or more systems (e.g., OCT system, MM-OCT system, system for one or more imaging modalities, etc.) for delay measurements (e.g., angio delay measurements) using one or more methods discussed herein.

Additionally or alternatively, one or more embodiments of the present disclosure may achieve at least the following advantages or may include at least the following feature(s): (i) based on an analysis of an apparatus/system (e.g., an OCT apparatus/system, an MM-OCT apparatus/system, an apparatus/system of one or more imaging modalities, etc.) and its usage environment, a delay measurement (e.g., an angio delay measurement) may be independent from individual pullback(s) and may be measured ahead of time (e.g., as part of a system configuration process, such as, but not limited to, in a Service Mode); (ii) the Service Mode may be designed to provide the delay measurement (e.g., the angio delay measurement) and maintain an operating room (OR) dependent database to keep all measurement records; (iii) the Service Mode may define the systematic procedure to measure the delay (e.g., angio delay, delay for an imaging modality, etc.) and provide a graphic user interface (GUI) to assist with calculating or determining the accurate measurements; (iv) one or more embodiments of the present disclosure may use a catheter (e.g., a simplified catheter) with an angio (or other imaging/video modality) opaque marker in a test pullback as a method to measure the delay value (e.g., the angio delay value, the imaging or video modality delay value, etc.) in one or more methods of the present disclosure and may use a linear regression method to increase an accuracy of the delay (e.g., angio delay, imaging/video modality delay, etc.) value results; and/or (v) one or more embodiments of the present disclosure may use a spinning device and a catheter that has been designed to support the delay (e.g., the angio delay) as a more accurate method or process because synchronized signals may be used for the measurement(s) in one or more embodiments of the present disclosure.

In one or more embodiments, the object may be a blood vessel, and the acquisition location(s) may be a region that is diseased and/or is a region that a physician(s), clinician(s) or other user(s) of the apparatus is/are considering for further assessment. In one or more embodiments, the object may be a sample or other target structure for imaging or information gathering.

In one or more embodiments, one or more processors may further operate to one or more of the following: (i) display an image for each of multiple imaging modalities on a display, wherein the multiple imaging modalities include two or more of the following: a tomography image; an Optical Coherence Tomography (OCT) image; a fluorescence image; a near-infrared fluorescence (NIRF) image; a near-infrared fluorescence (NIRF) image in a predetermined view (e.g., a carpet view, an indicator view, etc.); a near-infrared autofluorescence (NIRAF) image; a near-infrared autofluorescence (NIRAF) image in a predetermined view (e.g., a carpet view, an indicator view, etc.); a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); Magnetic Resonance Imaging (MRI); Intravascular Ultrasound (IVUS); an X-ray image or view; and an angiography view; (ii) display an image for each of multiple imaging modalities on a display, wherein the multiple imaging modalities include three or more of the following: a tomography image; an Optical Coherence Tomography (OCT) image; a fluorescence image; a near-infrared fluorescence (NIRAF) image; a near-infrared fluorescence (NIRAF) in a predetermined view (e.g., a carpet view, an indicator view, etc.); a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); Magnetic Resonance Imaging (MRI); Intravascular Ultrasound (IVUS); an X-ray image or review; and an angiography view; and (iii) change or update the displays for each of the multiple imaging modalities based on the in-plane orientation information and/or based on a request to update or change the in-plane orientation.

When the user obtains an intravascular image at a location within the object, that specific portion of the object may be at a predetermined location based on prior angiographic images or other information.

One or more embodiments of an imaging apparatus or system used for synchronization and/or angio delay (or delay time) measurement(s) may include any feature or combination of features discussed in the present disclosure. For example, one or more image processing apparatuses or systems may include: one or more processors that operate to: obtain one or more angiography images of an object; obtain one or more intravascular images at an acquisition location that is within at least a portion of the object, wherein the one or more angiography images are obtained before the obtaining of the one or more intravascular images, after the obtaining of the one or more intravascular images, or simultaneously with the obtaining of the one or more intravascular images, and wherein the one or more angiography images are obtained from a first data source and the one or more intravascular images are obtained independently from a second data source; and determine one or more angio delay times or one or more delay times each being a latency difference between the first data source and the second data source. The one or more processors of imaging apparatuses or systems may perform any technique discussed herein. For example, the one or more processors may further operate to: (i) measure the one or more angio delay times or the one or more delay times with a controlled pullback; or (ii) measure the one or more angio delay times or the one or more delay times with synchronized signals.

In one or more embodiments, a system or an apparatus may further include a catheter or probe including one or more markers or radiopaque markers, the catheter or probe operating to obtain the one or more angiography images of the object and the one or more intravascular images of the object, wherein, in the case where the controlled pullback is used, the one or more processors may further operate to: conduct the controlled pullback and review data in the one or more angiography images; label a location or locations of the one or more markers or radiopaque markers; apply linear regression processing to calculate a fractional starting time or a time where the one or more markers or radiopaque markers move or start to move; and estimate or determine the one or more angio delay times or the one or more delay times and/or a tolerance error(s) for the one or more angio delay times or the one or more delay times based on the fractional starting time or the time where the one or more markers or radiopaque markers move or start to move, and, in a case where the estimated or determined one or more angio delay times or the one or more delay times and/or the tolerance error(s) is within a predetermined or set respective threshold, then accept the estimated or determined one or more angio delay times or the one or more delay times and/or the tolerance error(s), and/or enter the estimated or determined one or more angio delay times or the one or more delay times and/or the tolerance error(s) in a result data table. The one or more processors may further operate to estimate or determiner the one or more angio delay times or the one or more delay times by calculating a difference between the fractional starting time or the time where the one or more markers or radiopaque markers move or start to move and a time of a first intravascular image of the one or more intravascular images obtained in, during, or near the controlled pullback.

In one or more embodiments, a system or an apparatus may further include a spin motor and a linear pullback motor, wherein: (i) the one or more processors may further operate to find each of the estimated or determined one or more angio delay times or the one or more delay times as a difference in time between a time where a recording is ready after the spin motor starts and achieves a steady, predetermined, or target speed and a time where the one or more angiography images are starting to be obtained; (ii) the one or more processors may further operate to determine an initiation time for the controlled pullback and an image capturing start time for the controlled pullback, a difference between the initiation time and the image capturing start time representing a time that the linear pullback motor takes to go from a default or rest state to a pullback-ready state where the linear pullback motor starts the controlled pullback and captures the one or more angiography images and/or the one or more intravascular images; (iii) the one or more processors may further operate to calculate a total delay time or times by adding each of the estimated or determined one or more angio delay times or the one or more delay times to a respective difference between the initiation time and the image capturing start time of the controlled pullback, and/or the one or more processors further operate to interpolate the start time of the controlled pullback into a sub angio interval level, which operates to match the first intravascular image of the one or more intravascular images with a time stamp between two adjacent angio images; and (iv) the one or more processors may further operate to determine a time period during which the one or more angiography images and/or the one or more intravascular images are obtained for the pullback, the time period starting at a first time which is after the start time of the controlled pullback by an amount equal to the respective angio delay time or the delay time of the one or more angio delay times or the one or more delay times, and the time period ending at a second time which is after an end time of the pullback by an amount equal to the respective angio delay time or the delay time of the one or more angio delay times or the one or more delay times. In one or more embodiments, one or more of the following conditions may occur or exist: (i) data for the controlled pullback may include one or more data packets, where each of the one or more data packets includes intravascular image frames and one or more of the data packets include video frames; (ii) a frame acquisition rate for the one or more intravascular images may be 200 frames per second (FPS), a length of the controlled pullback may be 80 mm, the duration of the controlled pullback may be 2.0 seconds, and an average frame resolution on a horizontal pullback distance may be about 0.2 mm per frame; and/or (iii) the apparatus may further include a clock and a video acquisition board or frame grabber that may operate to capture the video frames into digital frames and register the digital frames with the one or more processors with a time stamp from the clock, where the time stamp may operate to adjust, order, or rank a relative relevance, order, or display of the one or more angiography images and/or the one or more intravascular images.

In one or more embodiments, a system or an apparatus may further include a catheter or probe operating to obtain the one or more angiography images of the object and the one or more intravascular images of the object; and a rotating device having a stationary portion and a rotating portion, the stationary portion and the rotating portion each having a window or area where the window or area of the rotating portion operates to overlap with the window or area of the stationary portion at one or more times during the rotation of the rotating portion, wherein, in the case where the synchronized signals are used to measure the one or more angio delay times or the one or more delay times, the one or more processors may further operate to: (i) prepare the apparatus and the catheter or probe with near-infrared fluorescence (NIRF) light and/or near-infrared auto-fluorescence (NIRAF) light and/or prepare the rotating portion of the rotating device to be spun or rotated for a pullback; (ii) start the pullback, turn on the NIRF and/or NIRAF light, and trigger the rotation of the rotating portion of the rotating device to rotate for one or more rounds under an angio image view; (iii) on or using the angio frames, detect the frames with a partially or completely open window or area and calculate the open windows or areas for each image frame; (iv) on or using the one or more intravascular images, detect the frames where the NIRF and/or NIRAF light is turned on by detecting a signal for the NIRF and/or NIRAF light and finding a center, middle, or other predetermined portion of the NIRF and/or NIRAF signal; and/or (v) calculate the one or more angio delay times or the one or more delay times by determining a peak time where the calculated open windows or areas are at a maximum and/or based on a signal represented by an amount of overlap between at least the open windows or areas of the rotating device from one or more open areas in one or more angio images, by determining or identifying a corresponding time value for a corresponding portion or location of the NIRF and/or NIRAF light, and calculate a time difference between the peak time and the determined or identified corresponding time value for the corresponding portion or location of the NIRF and/or NIRAF light. In one or more embodiments, one or more of the following conditions may occur or exist: (i) the rotating portion and the stationary portion of the rotating device may each have a plate having the same size and/or shape and each plate having the windows or areas of the same size and/or shape; or the rotating portion and the stationary portion of the rotating device each comprise a plate having the same size and/or shape and each plate having the windows or areas of the same size and/or shape, and the shape is one of: triangular, trapezoidal, square, rectangular, trapezoidal, or circular; (ii) the stationary portion may be fixed on a base or other location of the rotating device, and the rotating portion operates to rotate around an axis over, or adjacent to, the stationary portion such that the rotating portion acts as a shutter where the shutter is open in a case where the windows or areas of the rotating portion and the stationary portion are partially or completely overlapping, and where the shutter is otherwise closed; (iii) the rotating device may use X-rays that operate to pass through or be blocked by the windows or areas that are detectable in the one or more angiography images to evaluate and confirm whether the windows or areas are partially or completely overlapping or not; and (iv) the rotating device may include a switch and a light emitting diode (LED), where the switch operates to connect both of the rotating portion and the stationary portion at a point where the windows or areas are at the peak time such that the switch turns on the LED at the peak time and turns off the LED during other times. In one or more embodiments, the one or more processors may operate to: (i) display or show the overlapping windows or areas from the closed position or condition for the shutter to the fully overlapped, maximum area for the windows or areas at the peak time; (ii) measure a size of the windows or areas in each image frame of the one or more intravascular images and/or in each frame of the one or more angiography images; and (iii) in a case where a peak time is in between frames, use two adjacent frames to interpolate the peak time to achieve an improved accuracy of a location of the peak time.

One or more embodiments of method(s) or process(es) may include any feature or combination of features discussed in the present disclosure. For example, a method for measuring or determining one or more angio delay times and/or for performing angiography synchronization using an imaging apparatus having one or more processors, the method may include: obtaining, via the one or more processors, one or more angiography images of an object; obtaining, via the one or more processors, one or more intravascular images at an acquisition location that is within at least a portion of the object, wherein the one or more angiography images are obtained before the obtaining of the one or more intravascular images, after the obtaining of the one or more intravascular images, or simultaneously with the obtaining of the one or more intravascular images, and wherein the one or more angiography images are obtained from a first data source and the one or more intravascular images are obtained independently from a second data source; and determining, via the one or more processors, one or more angio delay times or one or more delay times each being a latency difference between the first data source and the second data source. The method(s) may further include: (i) measuring, via the one or more processors, the one or more angio delay times or the one or more delay times with a controlled pullback; or (ii) measuring, via the one or more processors, the one or more angio delay times or the one or more delay times with synchronized signals.

In one or more method embodiments, in a case where the controlled pullback is used and where the imaging apparatus further includes, or is in communication with, one or more markers or radiopaque markers and a catheter or probe that operates to obtain the one or more angiography images of the object and the one or more intravascular images of the object and one or more markers or radiopaque markers, the method may further include: conducting the controlled pullback and reviewing data in the one or more angiography images; labeling a location or locations of the one or more markers or radiopaque markers; applying, via the one or more processors, linear regression processing to calculate a fractional starting time or a time where the one or more markers or radiopaque markers move or start to move; and estimating or determining, via the one or more processors, the one or more angio delay times or the one or more delay times and/or a tolerance error(s) for the one or more angio delay times or the one or more delay times based on the fractional starting time or the time where the one or more markers or radiopaque markers move or start to move, and, in a case where the estimated or determined one or more angio delay times or the one or more delay times and/or the tolerance error(s) is within a predetermined or set respective threshold, then accepting the estimated or determined one or more angio delay times or the one or more delay times and/or the tolerance error(s), and/or entering the estimated or determined one or more angio delay times or the one or more delay times and/or the tolerance error(s) in a result data table. In one or more method embodiments, the estimating or determining of the one or more angio delay times or the one or more delay times may further include calculating a difference between the fractional starting time or the time where the one or more markers or radiopaque markers move or start to move and a time of a first intravascular image of the one or more intravascular images obtained in, during, or near the controlled pullback. In one or more embodiments, the method(s) may further include: (i) finding, via the one or more processors, each of the estimated or determined one or more angio delay times or the one or more delay times as a difference in time between a time where a recording is ready after a spin motor of the imaging apparatus starts and achieves a steady, predetermined, or target speed and a time where the one or more angiography images are starting to be obtained; (ii) determining, via the one or more processors, an initiation time for the controlled pullback and an image capturing start time for the controlled pullback, a difference between the initiation time and the image capturing start time representing a time that a linear pullback motor of the imaging apparatus takes to go from a default or rest state to a pullback-ready state where the linear pullback motor starts the controlled pullback and captures the one or more angiography images and/or the one or more intravascular images; (iii) calculating, via the one or more processors, a total delay time or times by adding each of the estimated or determined one or more angio delay times or the one or more delay times to a respective difference between the initiation time and the image capturing start time of the controlled pullback, and/or interpolating the start time of the controlled pullback into a sub angio interval level, which operates to match the first intravascular image of the one or more intravascular images with a time stamp between two adjacent angio images; and (iv) determining, via the one or more processors, a time period during which the one or more angiography images and/or the one or more intravascular images are obtained for the pullback, the time period starting at a first time which is after the start time of the controlled pullback by an amount equal to the respective angio delay time or the delay time of the one or more angio delay times or the one or more delay times, and the time period ending at a second time which is after an end time of the pullback by an amount equal to the respective angio delay time or the delay time of the one or more angio delay times or the one or more delay times. In one or more embodiments, the method(s) may further include: capturing data for the controlled pullback, the data including one or more data packets, where each of the one or more data packets includes intravascular image frames and one or more of the data packets include video frame, the video frames being captured into digital frames, and registering the digital frames with the one or more processors with a time stamp, where the time stamp operates to adjust, order, or rank a relative relevance, order, or display of the one or more angiography images and/or the one or more intravascular images. In one or more embodiments, the intravascular image frames of the one or more data packets may include Optical Coherence Tomography (OCT) image frame(s), Multi-Modal OCT (MM-OCT) images, near-infrared fluorescence (NIRF) image frame(s), near-infrared auto-fluorescence (NIRAF) image frame(s), other intravascular image frame(s), and/or a combination of OCT, MM-OCT, NIRF, NIRAF, and/or other intravascular image frames; and the method may further include: (i) obtaining, calculating, or determining, via the one or more processors, a relative delay time between a time for the one or more MM-OCT images, OCT images, intravascular images, or other imaging modality images and the respective angio delay time or the delay time of the one or more angio delay times or the one or more delay times to perform angiography image synchronization; (ii) setting a target time to synchronize for each of the one or more intravascular images and each of the one or more angiography images as a time at a middle or other predetermined location of each image acquisition; and/or (iii) evaluating a sample rate for the one or more intravascular images and a sample rate for the one or more angiography images to determine an accuracy of the image, delay, or synchronization result(s).

In one or more method embodiments, in a case where the synchronized signals are used and where the imaging apparatus further includes, or is in communication with, a catheter or probe operating to obtain the one or more angiography images of the object and the one or more intravascular images of the object, and a rotating device having a stationary portion and a rotating portion, the stationary portion and the rotating portion each having a window or area where the window or area of the rotating portion operates to overlap with the window or area of the stationary portion at one or more times during the rotation of the rotating portion, the method(s) may further include: (i) preparing the imaging apparatus and the catheter or probe with near-infrared fluorescence (NIRF) light and/or near-infrared auto-fluorescence (NIRAF) light and/or preparing the rotating portion of the rotating device to be spun or rotated for a pullback; (ii) starting the pullback, turning on the NIRF and/or NIRAF light, and triggering the rotation of the rotating portion of the rotating device to rotate for one or more rounds under an angio image view; (iii) on or using the angio frames, detecting, via the one or more processors, the frames with a partially or completely open window or area and calculating the open windows or areas for each image frame; (iv) on or using the one or more intravascular images, detecting, via the one or more processors, the frames where the NIRF and/or NIRAF light is turned on by detecting a signal for the NIRF and/or NIRAF light and finding a center, middle, or other predetermined portion of the NIRF and/or NIRAF signal; and/or (v) calculating the one or more angio delay times or the one or more delay times by determining a peak time where the calculated open windows or areas are at a maximum and/or based on a signal represented by an amount of overlap between at least the open windows or areas of the rotating device from one or more open areas in one or more angio images, by determining or identifying a corresponding time value for a corresponding portion or location of the NIRF and/or NIRAF light, and calculating a time difference between the peak time and the determined or identified corresponding time value for the corresponding portion or location of the NIRF and/or NIRAF light. In one or more embodiments, the stationary portion may be fixed on a base or other location of the rotating device, and the rotating portion may operate to rotate around an axis over, or adjacent to, the stationary portion such that the rotating portion acts as a shutter where the shutter is open in a case where the windows or areas of the rotating portion and of the stationary portion are partially or completely overlapping, and where the shutter is otherwise closed; and the method may further include: (i) displaying or showing the overlapping windows or areas from the closed position or condition for the shutter to the fully overlapped, maximum area for the windows or areas at the peak time; (ii) measuring a size or sizes of the windows or areas in each image frame of the one or more intravascular images and/or in each frame of the one or more angiography images; and (iii) in a case where a peak time is in between frames, using two adjacent frames to interpolate the peak time to achieve an improved accuracy of a location of the peak time.

In one or more embodiments of apparatuses, systems, methods, or storage mediums discussed herein, one or more of the following conditions may occur or exist: (i) the intravascular image frames of the one or more data packets may include Optical Coherence Tomography (OCT) image frame(s), Multi-Modal OCT (MM-OCT) images, near-infrared fluorescence (NIRF) image frame(s), near-infrared auto-fluorescence (NIRAF) image frame(s), other intravascular image frame(s), and/or a combination of OCT, MM-OCT, NIRF, NIRAF, and/or other intravascular image frames; (ii) the one or more processors may further operate to obtain, calculate, or determine a relative delay time between a time for the one or more MM-OCT images, OCT images, intravascular images, or other imaging modality images and the respective angio delay time or the delay time of the one or more angio delay times or the one or more delay times to perform angiography image synchronization; (iii) the one or more processors may operate to set a target time to synchronize for each of the one or more intravascular images and each of the one or more angiography images as a time at a middle or other predetermined location of each image acquisition; and/or (iv) the one or more processors may further operate to evaluate a sample rate for the one or more intravascular images and a sample rate for the one or more angiography images to determine an accuracy of the image, delay, or synchronization result(s).

In one or more embodiments of apparatuses, systems, methods, or storage mediums discussed herein, the technique(s) and/or the one or more processors may: (i) display a graphical user interface (GUI) on a display, where the GUI operates to manage the angio delay time information for multiple Operating Rooms (ORs) or other locations so that the apparatus operates to be used in different locations; (ii) perform an initialization process that operates to add or include data for all of the ORs or other locations to the apparatus; and (iii) perform the estimation or determination of the one or more angio delay times or the delay times for each location among all of the ORs and the other locations having data added or included in to the apparatus to allow for angio delay compensation to be applied for all pullbacks done in each location among all of the ORs and the other locations. In one or more embodiments, the technique(s) and/or the one or more processors may do one or more of the following: co-register the obtained one or more angiography images and the one or more intravascular images; co-register the obtained one or more angiography images and the one or more intravascular images, where the one or more intravascular images include one or more of the following: one or more Optical Coherence Tomography (OCT) or Intravascular Ultrasound (IVUS) images or frames; a tomography image; a fluorescence image; a near-infrared fluorescence (NIRAF) image; a near-infrared fluorescence (NIRAF) image in a predetermined view, a carpet view, and/or an indicator view; a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); a Magnetic Resonance Imaging (MRI) image; an X-ray image or view; and an angiography view; and/or display an image for each of multiple imaging modalities on a display, wherein the multiple imaging modalities include two or more of the following: a tomography image; an Optical Coherence Tomography (OCT) image; a fluorescence image; a near-infrared fluorescence (NIRAF) image; a near-infrared fluorescence (NIRAF) image in a predetermined view, a carpet view, and/or an indicator view; a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); Magnetic Resonance Imaging (MRI); Intravascular Ultrasound (IVUS); an X-ray image or view; and an angiography view.

One or more embodiments of storage mediums may include any feature or combination of features discussed in the present disclosure. For example, a non-transitory computer-readable storage medium may store at least one program for causing a computer to execute a method for measuring or determining one or more angio delay times and/or for performing angiography synchronization using an imaging apparatus having one or more processors, where the method may include: obtaining, via the one or more processors, one or more angiography images of an object; obtaining, via the one or more processors, one or more intravascular images at an acquisition location that is within at least a portion of the object, wherein the one or more angiography images are obtained before the obtaining of the one or more intravascular images, after the obtaining of the one or more intravascular images, or simultaneously with the obtaining of the one or more intravascular images, and wherein the one or more angiography images are obtained from a first data source and the one or more intravascular images are obtained independently from a second data source; and determining, via the one or more processors, one or more angio delay times or one or more delay times each being a latency difference between the first data source and the second data source. The storage medium(s) may include or perform, or be used with, any other techniques or structure discussed herein.

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein. Additionally, while certain embodiments are discussed herein, the embodiments of the present disclosure are not limited thereto, and any combination of feature(s) discussed herein may be used in any combination in one or more embodiments of the present disclosure.

According to other aspects of the present disclosure, one or more additional devices, one or more systems, one or more methods and one or more storage mediums using OCT and/or other imaging modality technique(s) to construct/reconstruct 3D structure(s) are discussed herein. Further features of the present disclosure will in part be understandable and will in part be apparent from the following description and with reference to the attached drawings.

BRIEF DESCRIPTION OF THE DRAWINGS

For the purposes of illustrating various aspects of the disclosure, wherein like numerals indicate like elements, there are shown in the drawings simplified forms that may be employed, it being understood, however, that the disclosure is not limited by or to the precise arrangements and instrumentalities shown. To assist those of ordinary skill in the relevant art in making and using the subject matter hereof, reference is made to the appended drawings and figures, wherein.

DETAILED DESCRIPTION OF THE PRESENT INVENTION

Figure 1A:
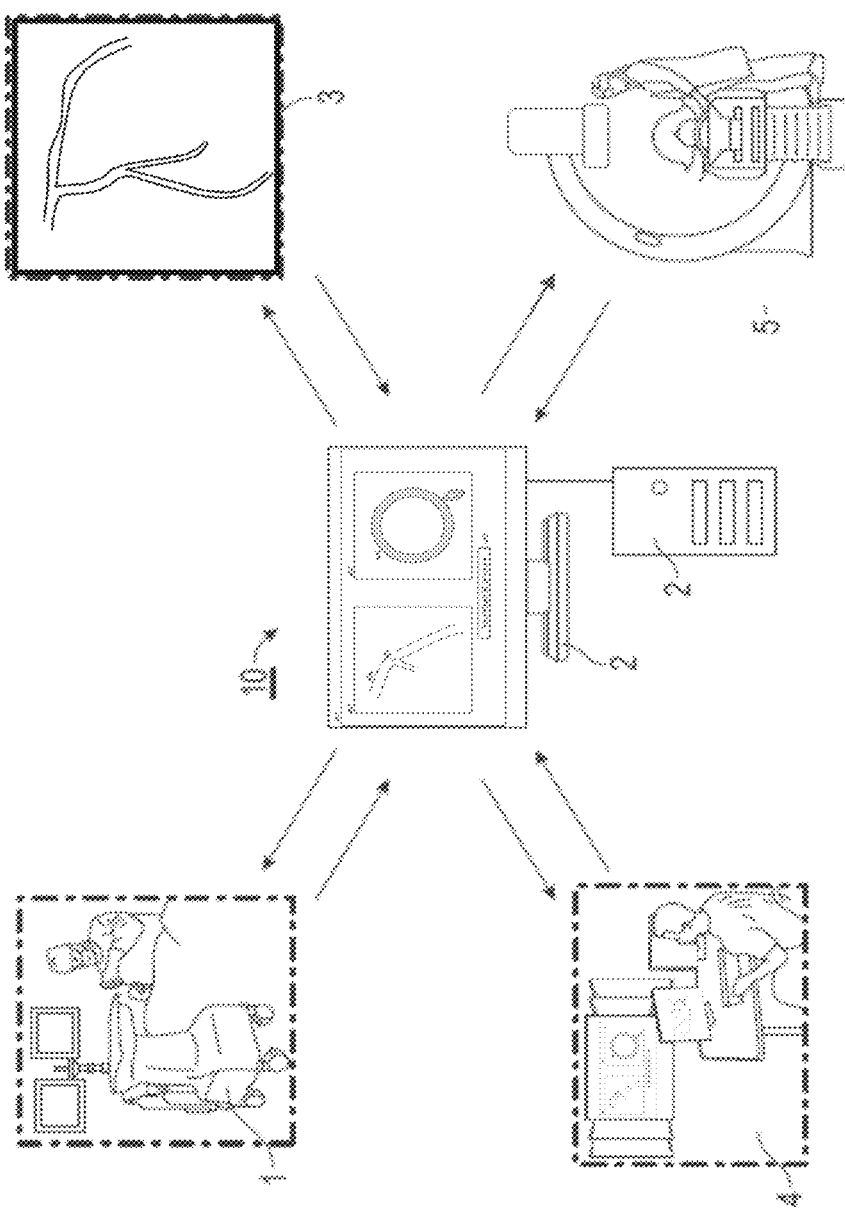
FIG. 1A is a schematic diagram showing at least one embodiment of a system that may be used for performing one or multiple imaging modality viewing and control, and/or angio delay determination and/or synchronization technique(s), in accordance with one or more aspects of the present disclosure.

The following description is of certain illustrative embodiments, although other embodiments may include alternatives, equivalents, and modifications. Additionally, the illustrative embodiments may include several novel features, and a particular feature may or may not be used to practice one or more embodiments of the devices, systems, and methods described herein. Embodiments will be described below with reference to the attached drawings. Like numbers refer to like elements throughout. It shall be noted that the following description is merely illustrative and exemplary in nature, and is in no way intended to limit the disclosure and its applications or uses. The relative arrangement of components and steps, numerical expressions, and numerical values set forth in the embodiments do not limit the scope of the disclosure unless it is otherwise specifically stated. Techniques, methods, and devices which are well known by individuals skilled in the art may not have been discussed in detail since an individual skilled in the art would not need to know these details to enable the embodiments discussed below. Further, endoscopes or other imaging devices discussed herein are not limited to the discussed applications or uses. One or more non-limiting, non-exhaustive embodiments examples of endoscopes or specialized endoscopes may include, but are not limited to, the following: angioscope; anoscope; arthroscope; arterioscope; arthroscope, bronchoscope; capsule endoscope; choledochoscope; colonoscope; colposcope; cystoscope; encephaloscope; esophagogastroduodenoscope; esophagoscope; gastroscope; hysteroscope; laparoscope; laryngoscope; mediastinoscope; nephroscope; neuroendoscope; proctoscope; resectoscope; rhinoscope; sigmoidoscope; sinusoscope; thoracoscope; ureteroscope; uteroscope; borescope; fiberscope; inspection camera; and/or any specialized endoscope or imaging device which may be adapted to include one or more features of the present disclosure. In one or more embodiments, an endoscope may be flexible or rigid. One or more embodiments may also be a probe or an imaging apparatus, such as, but not limited to, the other imaging devices or systems discussed herein.

It is a broad object of the present disclosure to provide imaging (e.g., OCT, IVI, IVUS, NIRF, NIRAF, SNAKE robots, robots, any other imaging known to those skilled in the art, etc.) apparatuses, systems, methods, and storage mediums for using and/or controlling multiple imaging modalities, that apply image and/or video synchronization with delay measurement(s). It is also a broad object of the present disclosure to provide OCT devices, systems, methods, and storage mediums using an interference optical system, such as, but not limited to, an interferometer (e.g., spectral-domain OCT (SD-OCT), swept-source OCT (SS-OCT), multimodal OCT (MM-OCT), Intravascular Ultrasound (IVUS), Near-Infrared Autofluorescence (NIRAF), Near-Infrared Spectroscopy (NIRS), Near-Infrared Fluorescence (NIRF), therapy modality using light, sound, or other source of radiation, etc.).

One or more embodiments provide at least one intuitive Graphical User Interface (GUI), method, device, apparatus, system, or storage medium to comprehend information, including, but not limited to, molecular structure of an object (e.g., a vessel), and to provide an ability to perform image and/or video synchronization and/or to determine delay or angio delay.

One or more embodiments of the present disclosure operate to figure out the correct relative delay difference between images or videos. Such relative delay between an angiography image or video and an image or video of another type is referred to herein as "angio delay" or "angio delay time". More generally, such a delay difference is referred to herein as "delay" or "delay time". Indeed, in one or more embodiments, another imaging modality may be used such that the delay is for an image or video of an imaging/video modality other than an angiography image or video.

One or more embodiments of any method discussed herein (e.g., synchronization method(s), delay or angio delay determination method(s), detecting method(s), imaging or visualization method(s), etc.) may be used with any feature or features of the apparatuses, systems, other methods, storage mediums, or other structures discussed herein.

One or more embodiments of the present disclosure may use a system for one or more imaging modalities that employs a GUI to display an image of one imaging modality side-by-side with, or along with, an image of another imaging modality on a display. For example, while not limited hereto, one or more embodiments may be for an OCT system or an MM-OCT system having a GUI that operates to display a tomography image or video frame(s) along with, or side-by-side with, an angiography image or video frame(s).

Using one or more of the features or techniques of the present disclosure, one or more embodiments may achieve one or more of the following: (i) define a delay (e.g., an angio delay for an angio video or image) and related concepts and clarify the best method(s) to calculate the delay to manage multiple measurements (e.g., in a software or processor Service Mode before normal pullback(s)); (ii) use a normal pullback process with zoomed-in angiography view and linear regression to calculate an accurate delay measurement(s) (e.g., accurate angio delay measurement(s)) (e.g., at least a first embodiment of a method of the present disclosure); (iii) use a spinning device with geometric (e.g., triangular) windows on angiography and a catheter with an LED (e.g., a NIRF and/or NIRAF light LED) and a rotational switch to measure delay time (e.g., angio delay time); (iv) save and manage multiple delay measurements (e.g., angio delay measurements) in a Service Mode table and apply the averaged result as the delay (e.g., angio delay) applied for pullbacks acquired in a same operating room (OR) environment; and/or (v) use a Service Mode that supports improved visualization components in a GUI of one or more systems (e.g., OCT system, MM-OCT system, system for one or more imaging modalities, etc.) for delay measurements (e.g., angio delay measurements) using one or more methods discussed herein.

Additionally or alternatively, one or more embodiments of the present disclosure may achieve at least the following advantages or may include at least the following feature(s): (i) based on an analysis of an apparatus/system (e.g., an OCT apparatus/system, an MM-OCT apparatus/system, an apparatus/system of one or more imaging modalities, etc.) and its usage environment, a delay measurement (e.g., an angio delay measurement) may be independent from individual pullback(s) and may be measured ahead of time (e.g., as part of a system configuration process, such as, but not limited to, in a Service Mode); (ii) the Service Mode may be designed to provide the delay measurement (e.g., the angio delay measurement) and maintain an operating room (OR) dependent database to keep all measurement records; (iii) the Service Mode may define the systematic procedure to measure the delay (e.g., angio delay, delay for an imaging modality, etc.) and provide a graphic user interface (GUI) to assist with calculating or determining the accurate measurements; (iv) one or more embodiments of the present disclosure may use a catheter (e.g., a simplified catheter) with an angio (or other imaging/video modality) opaque marker in a test pullback as a method to measure the delay value (e.g., the angio delay value, the imaging or video modality delay value, etc.) in one or more methods of the present disclosure and may use a linear regression method to increase an accuracy of the delay (e.g., angio delay, imaging/video modality delay, etc.) value results; and/or (v) one or more embodiments of the present disclosure may use a spinning device and a catheter that has been designed to support the delay (e.g., the angio delay) as a more accurate method or process because synchronized signals may be used for the measurement(s) in one or more embodiments of the present disclosure.

In one or more embodiments of an imaging or medical apparatus/system having one or more processors that operate to evaluate or determine delay (e.g., angio delay), the one or more processors may further operate to: (i) acquire or receive the image data during a pullback operation of an intravascular imaging catheter.

In one or more embodiments, the object or sample may include one or more of the following: a vessel, a target specimen or object, and a patient.

One or more devices/apparatuses, optical systems, methods, and storage mediums for performing one or more synchronization and/or delay measurement techniques and/or one or more imaging techniques are disclosed herein. Several embodiments of the present disclosure, which may be carried out by the one or more embodiments of an apparatus, system, method, and/or computer-readable storage medium of the present disclosure are described diagrammatically and visually in at least FIGS. 1 through 15 and other disclosure included herein below.

Turning now to the details of the figures, imaging modalities may be displayed in one or more ways as discussed herein. One or more displays discussed herein may allow a user of the one or more displays to use, control and/or emphasize one or more imaging techniques or modalities, such as, but not limited to, angiography, OCT, NIRF, NIRAF, etc., and may allow the user to use, control, and/or emphasize the one or more imaging techniques or modalities synchronously.

In at least one further embodiment example, a method of image and/or video synchronization and/or delay measurement may be employed. While not limited hereto, one or more methods of the present disclosure may use intravascular imaging or video frames, e.g., IVUS, OCT, MM-OCT, etc., and one (1) view of angiography (e.g., imaging or video frames). For example, one or more embodiments of the present disclosure synchronize the intravascular image(s)/video(s) and angiography image(s)/video(s) on a display or screen (e.g., an OCT display or screen, an MM-OCT display or screen, a display or screen of another imaging modality, etc.) during a pullback at a review or display time. The intravascular images may be called Tomo images, MM-OCT images, or OCT images in one or more embodiments. In one or more embodiments using Tomo images, a tomography view of a cross-section of a target or object (e.g., a vessel) may include NIRF and/or NIRAF signals (if available). In one or more embodiments, angiography images or video frames may be used interchangeably with the term "angio images or video frames". In one or more other embodiments, one or more methods of the present disclosure may use any other imaging/video modality or any combination of imaging/video modalities. In the description below, while intravascular imaging of the present disclosure is not limited to OCT, OCT is used as a representative of intravascular imaging for describing one or more features herein.

In one or more embodiments of the present disclosure, one or more synchronization techniques and/or one or more delay determination techniques may be used with an OCT or other imaging modality device, system, storage medium, etc.

One or more apparatuses/systems of the present disclosure may include one or more processors that operate to perform one or more synchronization techniques and/or one or more delay determination techniques, or any other technique(s) discussed herein.

The one or more processors may further operate to perform coregistration by co-registering an acquired or received angiography image and an obtained one or more Optical Coherence Tomography (OCT) or Intravascular Ultrasound (IVUS) images or frames. In one or more embodiments, the processors may operate to perform coregistration by co-registering an acquired or received angiography image or video (or image/video of another imaging modality) and an obtained one or more images or video frames of another imaging modality or modalities.

In one or more embodiments, the one or more processors may further operate to one or more of the following: (i) display angiography data along with an image for each of one or more imaging modalities on the display, wherein the one or more imaging modalities include one or more of the following: a tomography image; an Optical Coherence Tomography (OCT) image; a fluorescence image; a near-infrared auto-fluorescence (NIRAF) image; a near-infrared auto-fluorescence (NIRAF) image in a predetermined view, a carpet view, and/or an indicator view; a near-infrared fluorescence (NIRF) image; a near-infrared fluorescence (NIRF) image in a predetermined view, a carpet view, and/or an indicator view; a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); Magnetic Resonance Imaging (MRI); Intravascular Ultrasound (IVUS); an X-ray image or view; and an angiography view; and (ii) change or update the displays for the angiography data along with each of the one or more imaging modalities based on the rotary joint health and/or apparatus/system health results and/or an updated location of the catheter (or other imaging device). In one or more embodiments, the one or more imaging modalities may include one or more of the following: Optical Coherence Tomography (OCT); another lumen image(s) modality; an intravascular imaging modality; an imaging modality for fluorescence; a near-infrared auto-fluorescence (NIRAF) imaging modality; a near-infrared auto-fluorescence (NIRAF) imaging modality in a predetermined view, a carpet view, and/or an indicator view; a near-infrared fluorescence (NIRF) imaging modality; a near-infrared fluorescence (NIRF) imaging modality in a predetermined view, a carpet view, and/or an indicator view; a three-dimensional (3D) rendering imaging modality; an imaging modality for a 3D rendering of a vessel; an imaging modality for a 3D rendering of a vessel in a half-pipe view or display; an imaging modality for a 3D rendering of an object, target, or specimen; an imaging modality for a lumen profile; an imaging modality for a lumen diameter display; an imaging modality for a longitudinal view; computer tomography (CT); Magnetic Resonance Imaging (MRI); Intravascular Ultrasound (IVUS); an imaging modality for an X-ray image or view; and an imaging modality for an angiography view.

Just like OCT (or other imaging modality) apparatuses or systems may benefit from performing image/video synchronization and/or delay measurements/calculations, SNAKE devices or systems, or other types of robot devices or systems, that may use the same or similar connections may benefit from accurately performing image/video synchronization and/or delay measurements/calculations. The OCT (or other imaging modality or modalities) application(s) may have mechanisms for saving data, and the SNAKE or robot application(s) may also use saving data mechanisms in one or more embodiments. Additionally, the SNAKE robot or other robot camera(s) may be or may include a color camera, and the OCT images collected by the OCT application(s) may be greyscale or may include greyscale images, so a shift from color to grayscale may also be employed for imaging application(s) and for considering imaging quality and related data in one or more embodiments.

As shown diagrammatically in FIG. 1A, one or more embodiments for visualizing, emphasizing and/or controlling one or more imaging modalities for performing image/video synchronization, for performing delay (e.g., angio delay) measurement(s), and/or performing coregistration of the present disclosure may be involved with one or more predetermined or desired procedures, such as, but not limited to, medical procedure planning and performance (e.g., Percutaneous coronary intervention (PCI), other vascular diagnosis and intervention procedures, etc.). For example, the system 2 may communicate with the image scanner 5 (e.g., a CT scanner, an X-ray machine, etc.) to request information for use in the medical procedure (e.g., PCI) planning and/or performance, such as, but not limited to, bed positions, and the image scanner 5 may send the requested information along with the images to the system 2 once a clinician uses the image scanner 5 to obtain the information via scans of the patient. In some embodiments, one or more angiograms 3 taken concurrently or from an earlier session are provided for further planning and visualization. The system 2 may further communicate with a workstation such as a Picture Archiving and Communication System (PACS) 4 to send and receive images of a patient to facilitate and aid in the medical procedure planning and/or performance. Once the plan is formed, a clinician may use the system 2 along with a medical procedure/imaging device 1 (e.g., an imaging device, an OCT device, an IVUS device, a PCI device, an ablation device, an image/video synchronization and/or delay measurement device, etc.) to consult a medical procedure chart or plan to understand the shape and/or size of the targeted biological object to undergo the imaging and/or medical procedure. Each of the medical procedure/imaging device 1, the system 2, the locator device 3, the PACS 4 and the scanning device 5 may communicate in any way known to those skilled in the art, including, but not limited to, directly (via a communication network) or indirectly (via one or more of the other devices such as 1 or 5, or additional flush and/or contrast delivery devices; via one or more of the PACS 4 and the system 2; via clinician interaction; etc.).

In medical procedures, improvement or optimization of physiological assessment is preferable to decide a course of treatment for a particular patient. By way of at least one example, physiological assessment is very useful for deciding treatment for cardiovascular disease patients. In a catheterization lab, for example, physiological assessment may be used as a decision-making tool—e.g., whether a patient should undergo a PCI procedure, whether a PCI procedure is successful, etc. While the concept of using physiological assessment is theoretically sound, physiological assessment still waits for more adaption and improvement for use in the clinical setting(s). This situation may be because physiological assessment may involve adding another device and medication to be prepared, and/or because a measurement result may vary between physicians due to technical difficulties. Such approaches add complexities and lack consistency. Therefore, one or more embodiments of the present disclosure may employ computational fluid dynamics based (CFD-based) physiological assessment that may be performed from imaging data to eliminate or minimize technical difficulties, complexities and inconsistencies during the measurement procedure. To obtain accurate physiological assessment, an accurate 3D structure of the vessel may be reconstructed from the imaging data as disclosed in U.S. Provisional Pat. App. No. 62/901,472, filed on Sep. 17, 2019, the disclosure of which is incorporated by reference herein in its entirety.

One or more embodiments of the present disclosure may achieve the efficient image/video synchronization, efficient delay (e.g., angio delay) measurement(s), and/or efficient coregistration result(s) from image(s) and/or video frame(s). In one or more embodiments, the image and/or video data may be acquired during intravascular imaging pullback using a catheter (or other imaging device) that may be visualized in an image or video frame(s).

Figure 1B:
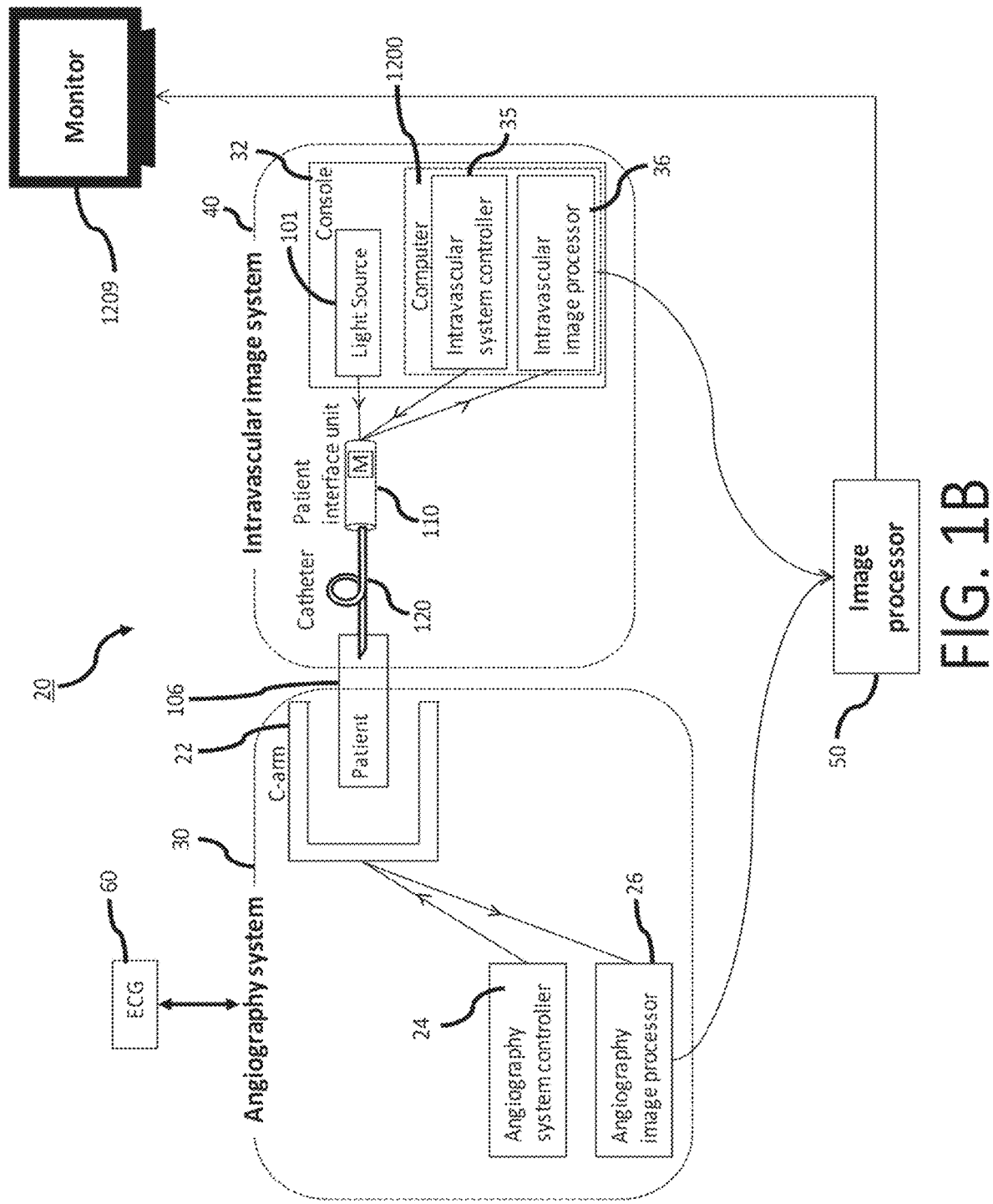
FIG. 1B is a schematic diagram illustrating an imaging system for executing one or more steps to process image data, and/or to perform angio delay determination and/or synchronization technique(s), in accordance with one or more aspects of the present disclosure.

Referring now to FIG. 1B, shown is a schematic diagram of at least one embodiment of an imaging system 20 for generating an imaging catheter path based on a detected location of an imaging catheter, e.g., based on a regression line representing the imaging catheter path by using an image/video frame that is acquired (e.g., simultaneously, independently, etc.) during intravascular imaging pullback. The embodiment of FIG. 1B may be used with one or more of the synchronization and/or delay measurement feature(s) discussed herein. While not limited thereto, the imaging system 20 may include an angiography system 30, an intravascular imaging system 40, an image processor 50, a display or monitor 1209, and an electrocardiography (ECG) device 60 (or any combination or sub-combination of these features). The angiography system 30 may include an X-ray imaging device such as a C-arm 22 that is connected to an angiography system controller 24 and an angiography image processor 26 for acquiring angiography image frames of an object (e.g., any object that may be imaged using the size and shape of the imaging device, a sample, a vessel, a target specimen or object, etc.) or patient 106. In one or more embodiments, the features of the angiography system controller 24 and the angiography image processor 26 may be performed by one processor.

While not limited thereto, the intravascular imaging system 40 of the imaging system 20 may include a console 32, a catheter 120, and a patient interface unit or PIU 110 that connects between the catheter 120 and the console 32 for acquiring intravascular image/video frames. The catheter 120 may be inserted into a blood vessel of the patient 106 (or inside a specimen or other target object). The catheter 120 may function as a light irradiator and a data collection probe that is disposed in a lumen of a particular blood vessel, such as, for example, a coronary artery. The catheter 120 may include a probe tip, one or more markers or radiopaque markers, an optical fiber, and a torque wire. The probe tip may include one or more data collection systems. The catheter 120 may be threaded in an artery of the patient 106 to obtain images and/or video frames of the coronary artery. The patient interface unit 110 may include a motor M inside to enable pullback of imaging/video optics during the acquisition of intravascular image and/or video frames. The imaging pullback procedure may obtain images and/or video frames of the blood vessel. The imaging pullback path may represent the co-registration path, which may be a region of interest or a targeted region of the vessel (or another target or object).

The console 32 may include a light source(s) 101 and a computer 1200. The computer 1200 may include features as discussed herein and below (see e.g., FIG. 1B, FIGS. 12A-12C, FIG. 14, etc.), or alternatively may be a computer 1200' (see e.g., FIG. 15, etc.) or any other computer or processor discussed herein. In one or more embodiments, the computer 1200 may include an intravascular system controller 35 and an intravascular image processor 36 (or one processor that operates to perform the features of the intravascular system controller 35 and the intravascular image processor 36). The intravascular system controller 35 and/or the intravascular image processor 36 may operate to control the motor M in the patient interface unit 110. The intravascular image processor 36 may also perform various steps for image processing and control the information to be displayed.

Various types of intravascular imaging systems may be used within the imaging system 20. The intravascular imaging system 40 is merely one example of an intravascular imaging system that may be used within the imaging system 20. Various types of intravascular imaging systems may be used, including, but not limited to, an OCT system, a multi-modality OCT system or an IVUS system, by way of non-limiting, non-exhaustive examples. One or more imaging modalities may be used (such as, but not limited to, angiography, Optical Coherence Tomography (OCT), Multi-modality OCT (MM-OCT), near-infrared auto-fluorescence (NIRAF), near-infrared fluorescence (NIRF), OCT-NIRAF, OCT-NIRF, etc.). One or more embodiments of synchronization and/or delay measurements techniques and/or one or more imaging techniques discussed herein may be used with optical probe applications in accordance with one or more aspects of the present disclosure.

The imaging system 20 may also connect to an electrocardiography (ECG) device 60 for recording the electrical activity of a heart over a period of time using electrodes placed on the skin of the patient 106. The imaging system 20 may also include an image processor 40 for receiving angiography data, intravascular imaging data, and data from the ECG device 60 to execute various image-processing steps to transmit to a display 1209 for displaying an angiography image/video frame with a co-registration path. Although the image processor 50 associated with the imaging system 20 appears external to both the angiography system 30 and the intravascular imaging system 40 in FIG. 1B, the image processor 50 may be included within the angiography system 30, the intravascular imaging system 40, the display 1209, or a stand-alone device. Alternatively, the image processor 50 may not be required if the various image processing steps are executed using one or more of the angiography image processor 26, the intravascular image processor 36 of the imaging system 20, or any other processor discussed herein (e.g., computer 1200, computer 1200', computer or processor 2, etc.).

Figure 2:
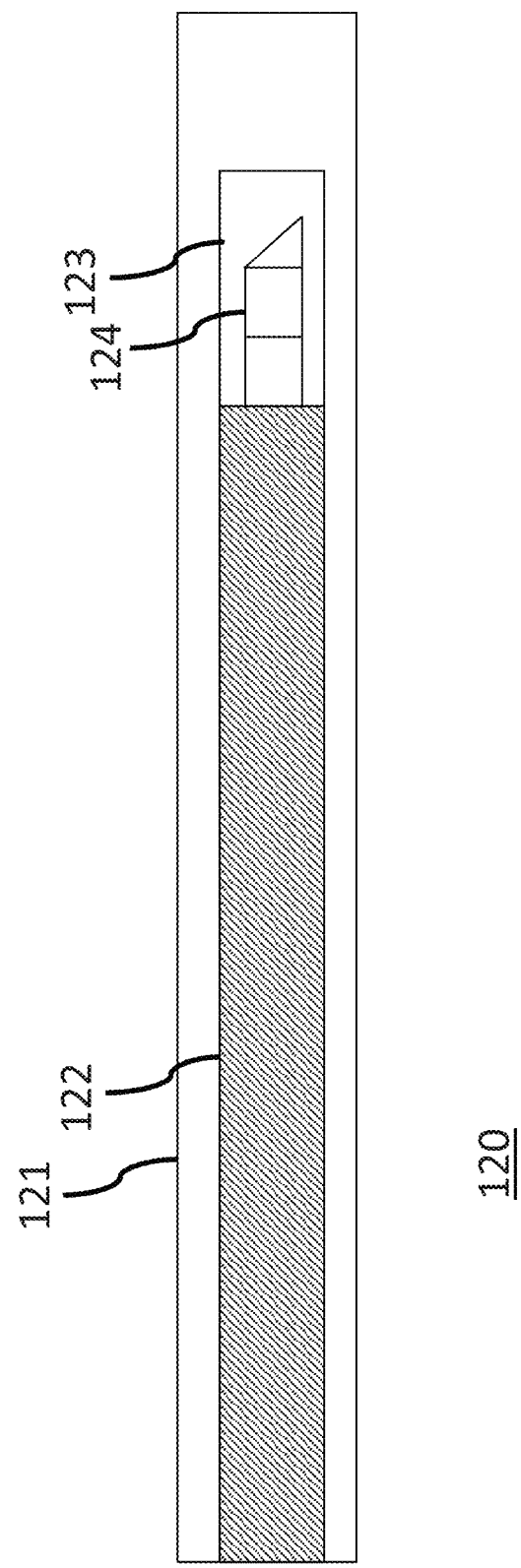
FIG. 2 is a diagram of at least one embodiment of a catheter that may be used with one or more embodiments for performing image and/or video synchronization and/or delay determination in accordance with one or more aspects of the present disclosure.

FIG. 2 shows at least one embodiment of a catheter 120 that may be used in one or more embodiments of the present disclosure to obtain images, perform synchronization, and/or determine, measure, or calculate delay (or angio delay). FIG. 2 shows an embodiment of the catheter 120 including a sheath 121, a coil 122, a protector 123 and an optical probe 124. As shown schematically in FIGS. 12A-12C (discussed further below), the catheter 120 may be connected to a patient interface unit (PIU) 110 to spin the coil 122 with pullback (e.g., at least one embodiment of the PIU 110 operates to spin the coil 122 with pullback). The coil 122 delivers torque from a proximal end to a distal end thereof (e.g., via or by a rotational motor in the PIU 110). In one or more embodiments, the coil 122 is fixed with/to the optical probe 124 so that a distal tip of the optical probe 124 also spins to see an omnidirectional view of the object (e.g., a biological organ, sample or material being evaluated, such as, but not limited to, hollow organs such as vessels, a heart, a coronary artery, etc.). For example, fiber optic catheters and endoscopes may reside in the sample arm (such as the sample arm 103 as shown in one or more of FIGS. 12A-12C discussed below) of an OCT interferometer in order to provide access to internal organs, such as intravascular images, gastro-intestinal tract or any other narrow area, that are difficult to access. As the beam of light through the optical probe 124 inside of the catheter 120 or endoscope is rotated across the surface of interest, cross-sectional images of one or more objects are obtained. In order to acquire three-dimensional data, the optical probe 124 is simultaneously translated longitudinally during the rotational spin resulting in a helical scanning pattern. This translation is most commonly performed by pulling the tip of the probe 124 back towards the proximal end and therefore referred to as a pullback.

The catheter 120, which, in one or more embodiments, comprises the sheath 121, the coil 122, the protector 123 and the optical probe 124 as aforementioned (and as shown in FIG. 2), may be connected to the PIU 110. In one or more embodiments, the optical probe 124 may comprise an optical fiber connector, an optical fiber and a distal lens. The optical fiber connector may be used to engage with the PIU 110. The optical fiber may operate to deliver light to the distal lens. The distal lens may operate to shape the optical beam and to illuminate light to the object (e.g., the object 106 (e.g., a vessel) discussed herein), and to collect light from the sample (e.g., the object 106 (e.g., a vessel) discussed herein) efficiently.

As aforementioned, in one or more embodiments, the coil 122 delivers torque from a proximal end to a distal end thereof (e.g., via or by a rotational motor in the PIU 110). There may be a mirror at the distal end so that the light beam is deflected outward. In one or more embodiments, the coil 122 is fixed with/to the optical probe 124 so that a distal tip of the optical probe 124 also spins to see an omnidirectional view of an object (e.g., a biological organ, sample or material being evaluated, such as, but not limited to, hollow organs such as vessels, a heart, a coronary artery, etc.). In one or more embodiments, the optical probe 124 may include a fiber connector at a proximal end, a double clad fiber and a lens at distal end. The fiber connector operates to be connected with the PIU 110. The double clad fiber may operate to transmit & collect OCT light through the core and, in one or more embodiments, to collect Raman and/or fluorescence from an object (e.g., the object 106 (e.g., a vessel) discussed herein, an object and/or a patient (e.g., a vessel in the patient), etc.) through the clad. The lens may be used for focusing and collecting light to and/or from the object (e.g., the object 106 (e.g., a vessel) discussed herein). In one or more embodiments, the scattered light through the clad is relatively higher than that through the core because the size of the core is much smaller than the size of the clad.

Figure 3:
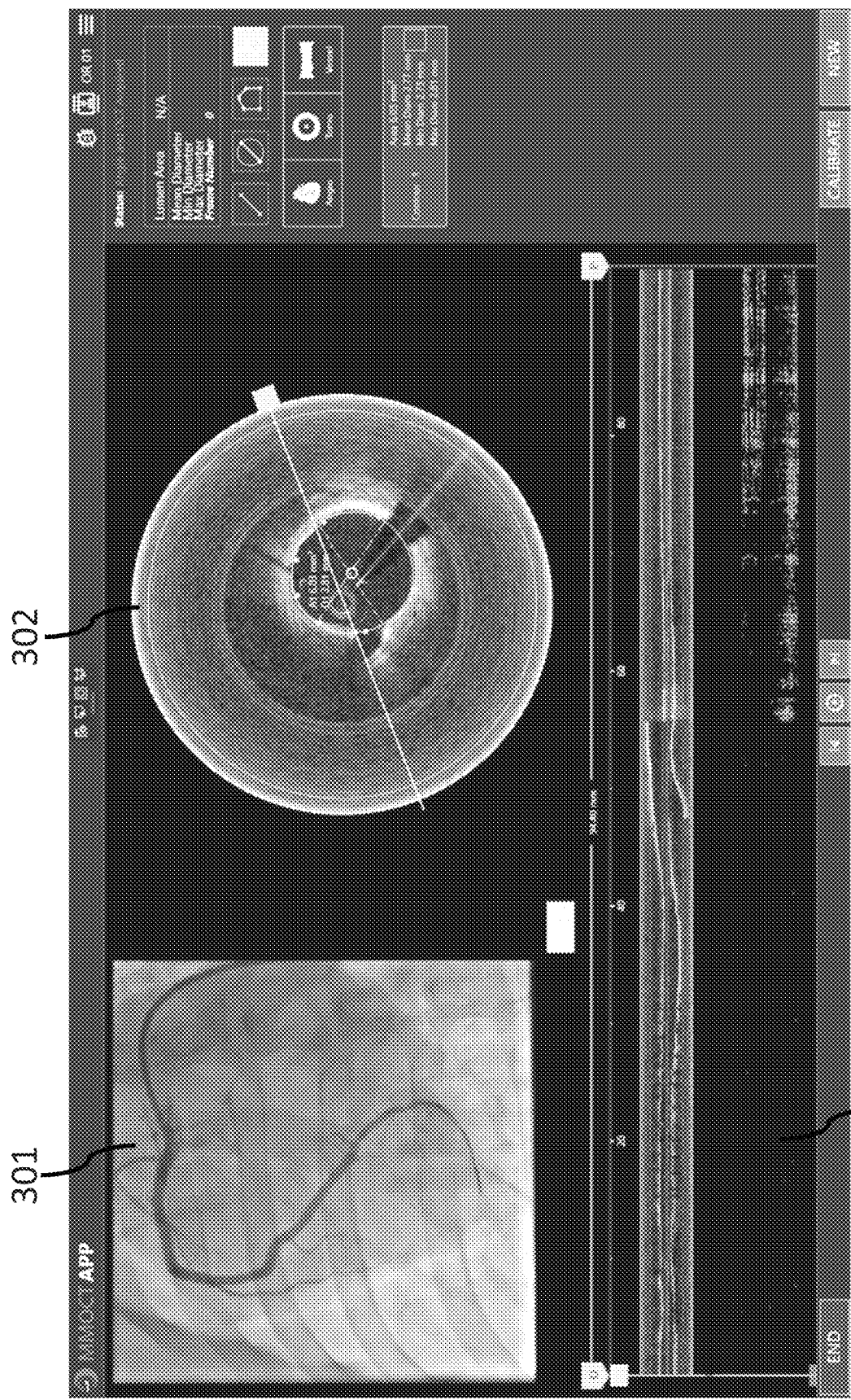
FIG. 3 illustrates at least one embodiment of a Graphical User Interface (GUI) to display an intravascular image or video along with an angiography image or video that may be used in accordance with one or more aspects of the present disclosure.

FIG. 3 illustrates at least one embodiment of a Graphical User Interface (GUI) to display an intravascular image or video 302 along with an angiography image or video 301 that may be used in accordance with one or more aspects of the present disclosure. For example, a user may review a pullback in a mode, such as, but not limited to, a Review Mode.

In FIG. 3, there are two images showing side-by-side for angiography video frame 301 and intravascular image frame 302, respectively. On the left side of FIG. 3, an angiography frame 301 captured from the video signal is presented; and on the right side of FIG. 3, an intravascular tomo image 302 is displayed, which shows a cross-sectional plane of the blood vessel. Below these images along a bottom portion of FIG. 3, there is a horizontal view 303 showing the whole pullback, with each vertical line represent a frame, which is cut by a plane at a certain angle passing through the center of the cross-sectional image. The angiography image 301 shown on the left side of FIG. 3 is an X-ray image of a heart (or partial heart depending on a zoom factor), which comes from the angiography video showing both motions of the heart and of the radiopaque marker on the tip of an MM-OCT catheter (e.g., such as a catheter/probe 120) during the pullback. While the views discussed herein may be angiography frame(s) 301 and intravascular image frame(s) 302, the embodiments of the present disclosure are not limited thereto such that one or more embodiments may use one or more other imaging modalities in place of the angiography frame(s) 301 and/or the intravascular frame(s) 302.

In one or more embodiments, the side-by-side views (e.g., an angiography image frame(s) 301 and an intravascular image frame(s) 302, an image frame(s) of one imaging modality discussed herein and an image frame(s) of another imaging modality discussed herein, image frames of the same imaging modality, etc.) may be showing synchronized images coming from two independent sources. For example, the first image(s) (e.g., an angiography image frame(s) 301, an image frame(s) of another imaging modality, etc.) may be obtained from a first independent source, and the second image(s) (e.g., an intravascular image frame(s) 302, an image frame(s) of another imaging modality, etc.) may be obtained from a second independent source such that the first and second sources are independent and/or different from each other. In an embodiment using an angiography image frame(s) 301 and an intravascular image frame(s) 302, a difference in latency between the two independent data sources is defined as "angio delay time", or delay time, that is used to display synchronized images and any corresponding overlay drawing objects (such as, but not limited to, a location indicator, measurement values, etc.) displayed on the angiography image(s) 301. One or more embodiments operate to avoid computationally intensive process (es) and/or any process(es) that lead to any error-prone result(s). For example, applying one or more co-registration methods over an existing pullback may be a computational intensive process and may be error-prone. One or more processes of the embodiments of the present disclosure may operate independently from one or more pullbacks of one or more catheters/probes (e.g., such as the probe 120), and may obtain results that are not affected by anatomy of a target, object, or sample (e.g., such as the target, object, or sample 106 discussed herein). In one or more embodiments, the target, object, or sample may be a blood vessel.

One or more processes or methods of the present disclosure may operate to measure an angio delay or a delay time in a particular mode (e.g., a Service Mode) before an acquisition of any pullback or pullbacks. One or more measurements may be designed with an accuracy tolerance in mind to achieve a desired, set, or predetermined accuracy for the angio delay values, or delay time values, in any embodiment, especially in consideration of one or more usage settings (e.g., fixed settings) of an apparatus or system used in any embodiment of the present disclosure.

In one or more embodiments, a GUI (Graphical User Interface) of the particular mode (e.g., the Service Mode) may operate to provide interactive and intuitive visualization for a user to conduct the measurements and save results in a data table as part of the apparatus or system configuration. When new pullbacks are acquired and subsequently reviewed in another particular mode (e.g., a Review Mode), such information may be used to properly synchronize data from angiography and intravascular images (e.g., without the need to conduct additional co-registration process(es) in one or more embodiments). In one or more embodiments, one or more additional co-registration processes may be used by a user if desired in a way such that any error may be avoided and any intensive computations may be avoided.

In one or more embodiments, the angiography delay time (or the delay time) relative to the intravascular pullback images may be an independent characteristic from any individual pullback. The angiography delay time (or the delay time) may be determined by one or more components (e.g., one or more hardware components) of an imaging apparatus or system (e.g., an MM-OCT apparatus or system, an MM-OCT cart apparatus or system, an OCT apparatus or system, an OCT cart apparatus or system, a system or apparatus using one or more imaging modalities, etc.) and/or by one or more connections to an angiography apparatus or system of a particular Operating Room(s) (OR). In one or more embodiments, in a case where an angio delay time or a delay time is determined for a particular imaging apparatus or system (e.g., an MM-OCT apparatus or system, an MM-OCT cart apparatus or system, an OCT apparatus or system, an OCT cart apparatus or system, a system or apparatus using one or more imaging modalities, etc.) configuration within an OR, the angio delay or the delay time will stay the same for all pullbacks acquired in or under the same settings, until the imaging apparatus or system is moved to a different OR. As such, the embodiment(s) of the present disclosure avoid any error(s) that may be caused due to any data dependency on one or more pullbacks.

One or more embodiments may address angio delay latency (or delay time latency), or may consider angio delay latency (or delay time latency), where or when displaying images are targeting a same target, object, or sample (e.g., the target, object, or sample 106), even where or when the displayed images are acquired from two different or independent sources/modalities.

In one or more embodiments, detection of any marker on or in an angiography image may be performed independently of any motion and/or anatomy of a target, object, or sample (e.g., the target, object, or sample 106). For example, one or more embodiments may detect marker location(s) independently of any motion and/or anatomy of a heart (or independently from any motion and/or anatomy of a coronary vessel). As such, one or more embodiments of the present disclosure may achieve greater or improved accuracy in finding the marker location(s) of corresponding frame(s) (accuracy is greater or improved as compared with any apparatus, system, process, etc. that does not use the one or more features or techniques discussed herein).

One or more embodiments obtains or determines the angio delay (or the delay time) to adjust the angio delay or the delay time to perform synchronization using one or more processes or techniques that are straight forward and/or that avoid user confusion.

One or more embodiments of the present disclosure operate to synchronize the two images (e.g., the intravascular images and the angiography images, images of two imaging modalities, images of different imaging modalities, images of one or more imaging modalities, etc.) on a display (e.g., on an MM-OCT or OCT screen or display), such as, but not limited to the display 1209 discussed further below, during a pullback. For example, the two images may be synchronized on the display at a review time (e.g., in a Review Mode).

In one or more embodiments, the intravascular images may be OCT images, MM-OCT, images, Tomo images, and a tomography view of a cross-section of a vessel (which may or may not include NIRF and/or NIRAF signals or data if available). Discussion(s) of one or more embodiments herein may refer to "angiography images" as being interchangeable with the term "angio images".

While not limited to only one apparatus or system environment/conditions, FIG. 1B illustrates one embodiment example where angio images and intravascular images (e.g., MM-OCT images, OCT images, etc.) are captured through two independent paths, which have different intrinsic time delay characteristics. In FIG. 1B, the image processor 50, the processor 1200, or any other processor discussed herein may receive both images from the intravascular image system 40 and the angiography system 30 to perform synchronization of the images on a display (e.g., side-by-side synchronization as shown, for example, in FIG. 3). For the synchronization processing, one or more defined terms are discussed herein to make the correct calculations for the synchronized visualization.

Figure 4A:
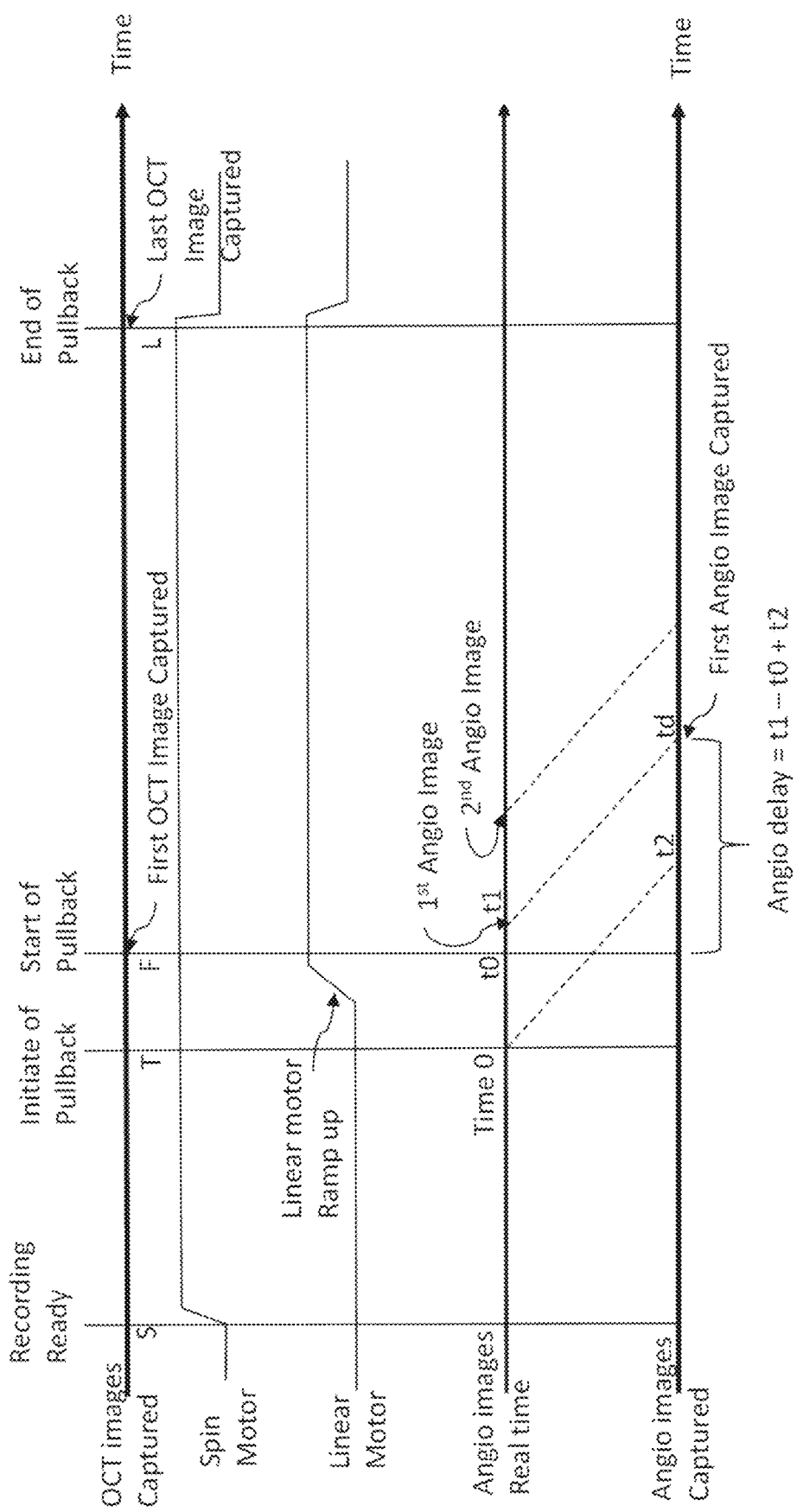
FIG. 4A is a diagram of at least one embodiment of timeline that may be used to define delay times for two or more independent paths or image or video sources in accordance with one or more aspects of the present disclosure.

One or more embodiments of the present disclosure establish a common starting time point as a reference at first to define delay times for two independent paths. The reference or the common starting time point may be the time when a user has clicked an icon or button (e.g., a play icon or button, a start icon or button, another set or predetermined icon or button, etc.) on a GUI and an event is triggered in the system or apparatus to start a pullback. This is illustrated in FIG. 4A as time point T (Initiate pullback). At this time, a Patient Interface Unit (PIU) (e.g., PIU 110 of the present disclosure, such as shown in any of FIGS. 1B, 5A, 8B, 12A-12C, etc.) and/or a catheter/probe (e.g., the catheter/probe 120) controlled by an imaging system or apparatus (e.g., an MM-OCT apparatus or system, an MM-OCT cart apparatus or system, an OCT apparatus or system, an OCT cart apparatus or system, a system or apparatus using one or more imaging modalities, etc.) is revolving at a constant speed and is ready for image acquisition. The time point S (as shown in FIG. 4A) indicates at some earlier time that the PIU started the spin motor. The pullback-initiating event at time point T operates to trigger the linear motor to reach (e.g., quickly or efficiently reach) a constant pullback speed and start to acquire pullback frames at the same time in one or more embodiments. In one or more embodiments, the pullback frames may be acquired at a later time, such as, but not limited to, at or near time point F discussed below (e.g., such that the pullback frames and image acquisition start simultaneously or contemporaneously in one or more embodiments). Although triggered by the same event and although the acceleration of the linear motor is very fast, there may be some short time for the linear motor to speed up from zero to the full speed. Meanwhile, the image (e.g., MM-OCT, OCT, other imaging modality, etc.) acquisition process may operate to start simultaneously at time (F) as shown in FIG. 4A such that the time point F is the "Start of Pullback" line which is later than time point T for the "Initiation of the Pullback" by an amount of time, to, as shown in FIG. 4A. In one or more embodiments, the first OCT/MM-OCT/other imaging modality image may be captured at the time, to. The linear motor speed-up path and the first OCT or MM-OCT (or other imaging modality) acquisition may go through different software and/or hardware paths. In one or more embodiments, the linear motor speed-up path and the first OCT or MM-OCT (or other imaging modality) acquisition may both reach the same time point of Start of Pullback, where the linear motor reaches full speed and the first OCT/MM-OCT/imaging modality image acquisition has completed. This is reflected in FIG. 4A as there is an interval between T and F. In one or more embodiments, time L may be used to indicate a time where the last OCT/MM-OCT/other imaging modality image(s) is/are acquired. In one or more embodiments, time F may be used as a reference point for a first OCT/MM-OCT/other imaging modality frame and use that time to calculate angio delay time.

In one or more embodiments, at the same time T, the acquisition of the angio frame started from the frame grabber component, which is the source of the angio frames in the imaging apparatus or system (e.g., an MM-OCT apparatus or system, an MM-OCT cart apparatus or system, an OCT apparatus or system, an OCT cart apparatus or system, a system or apparatus using one or more imaging modalities, etc.). In one or more embodiments, the OCT/MM-OCT software and/or one or more methods or processes is/are using multiple threads to control the event response at the same time. Hence, there is no delay to start angio acquisition at time T when an initial start of a pullback event is triggered. As soon as a first angio frame arrives, the first angio frame may be considered as the first available angio frame in the pullback in one or more embodiments. When considering the first acquired angio image, especially noticing its relatively slow sample rate of about 30 fps, the arrival of the first angio image may be several OCT frames away from the first pullback frame, which may be time point F. The location of the radio-opaque or radiopaque marker may reflect the static position when pullback has not started; this may be the case in one or more embodiments as the time delay through the angio path is often more than the delay that happened for image (e.g., MM-OCT, OCT, another imaging modality, etc.) acquisition. As shown in the bottom time line of FIG. 4A, for one or more embodiments, the first angio image is captured in real time at time t1 (t1 being the time between time 0 and the time t1 at which the first angio image is captured), which is later than the time to, which may be the same as time point F, when the first OCT image is captured in one or more embodiments. However, due to the system data transfer delay t2 (t2 being the time between time 0 and the time t2 as diagrammatically represented by the dashed line from time 0 to time t2), the Angio image actually corresponding to the Start of Pullback may be captured at td (as shown on the "Angio images Captured" line), which may be later than the first angio image capture time, which is t1 by an additional delay interval of t2, where such additional delay (e.g., data transfer delay, other types of delay, etc.) exists. Using the pullback starts at time T ("Initiation of Pullback") as the origin of time reference (which corresponds to Time 0 as shown in FIG. 4A), given the transfer path delay of the angio frame being t2, the total delay time is (t1−t0+t2), where time to is the system action trigger time between the button trigger to the first pullback image acquisition time mentioned above.

In one or more embodiments, the MM-OCT, OCT, or other intravascular imaging modality image intrinsic delay time is the time from when each MM-OCT, OCT, or other intravascular imaging modality frame acquisition is complete (which may have a hardware, digital, or analog signal associated with it from a processor or other component (e.g., an OCB (Optical Control Board)), to the time the frame is registered with a processor (e.g., processor or computer 1200, 1200', 2, image processor 50, any other processor discussed herein, etc.), or with a software component, as an image frame with a time stamp. The MM-OCT, OCT, or other intravascular imaging modality frame acquisition may have a constant rate of ($F_{OCT}$) frame(s) per second (FPS), e.g., $F_{OCT}$=200 FPS or another predetermined or set amount during the pullback. Given the pullback in at least one embodiment, length may be 80 mm and the total duration may be 2.0 secs, and the average frame resolution on horizontal pullback distance may be about 0.2 mm per frame. One or more embodiments may have one or more different parameters, such as, but not limited to, a shorter length coverage. Another possible pullback for one or more embodiments is a slower pullback, which may cover the 50 mm pullback length in the same duration of 2.0 seconds. Preferably, the rotation speed is still set or maintained at 200 FPS for one or more embodiments to yield a higher special frame resolution of about 0.125 mm/frame.

Figure 5A:
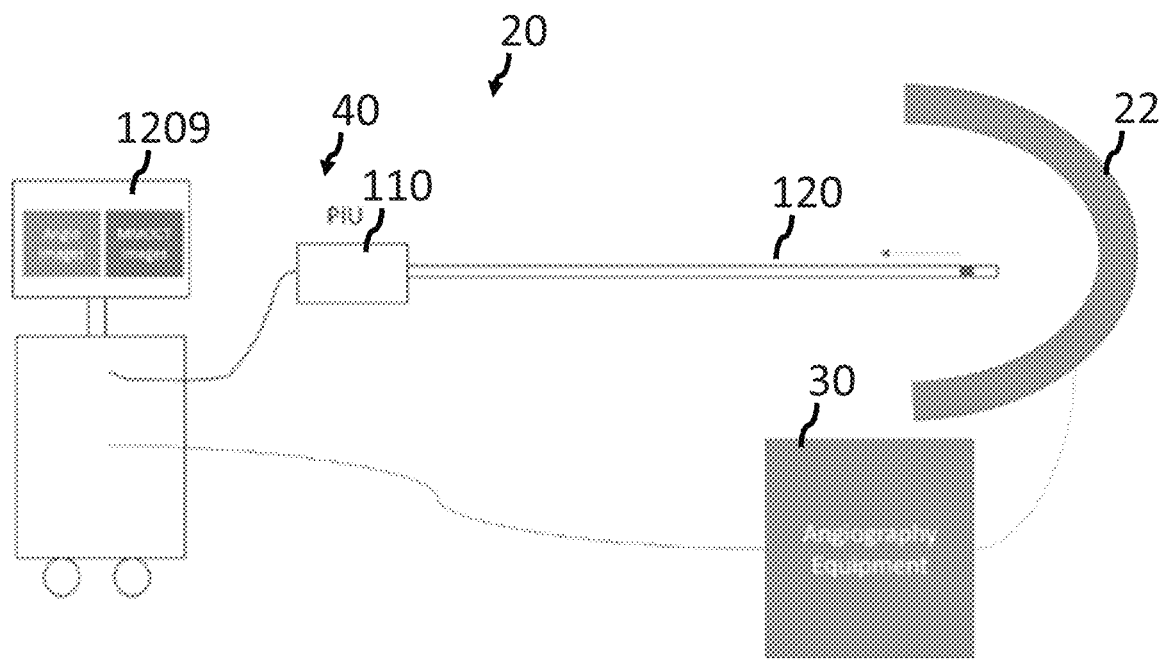
FIGS. 5A-5B illustrate at least one embodiment of an apparatus or system and a pullback for same that may be used in accordance with one or more aspects of the present disclosure.
Figure 8A:
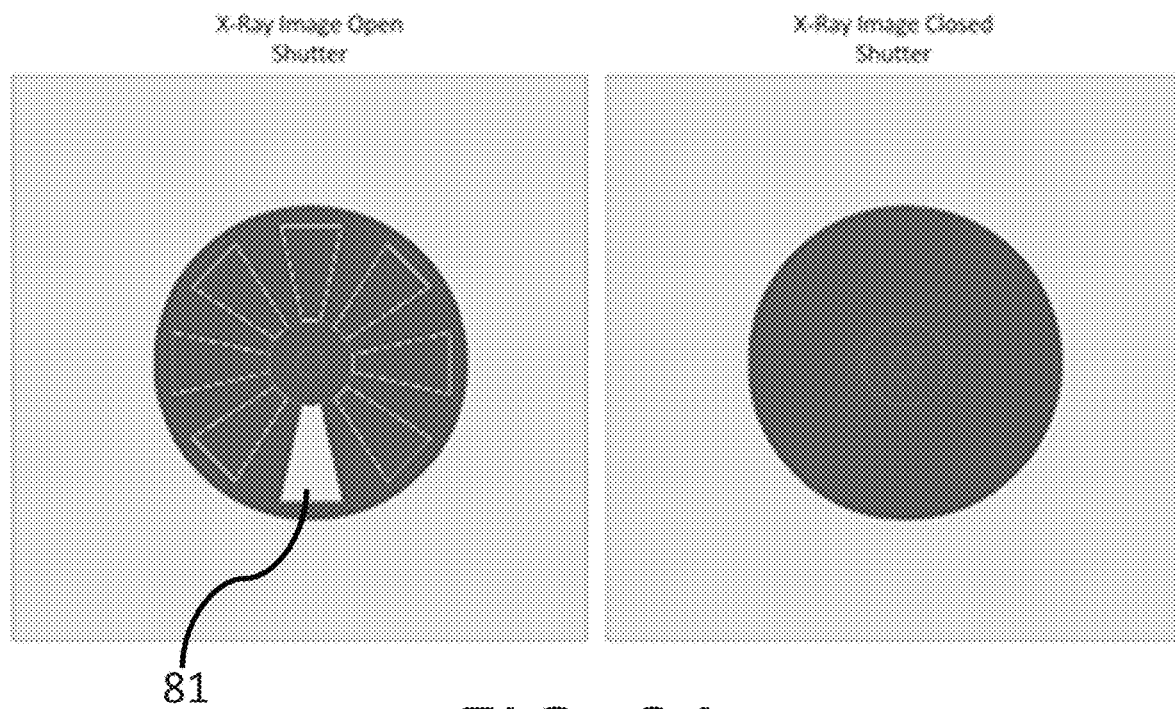
FIG. 8A illustrates at least one embodiment of angiography images used to evaluate synchronization and/or delay time in accordance with one or more aspects of the present disclosure.
Figure 8B:
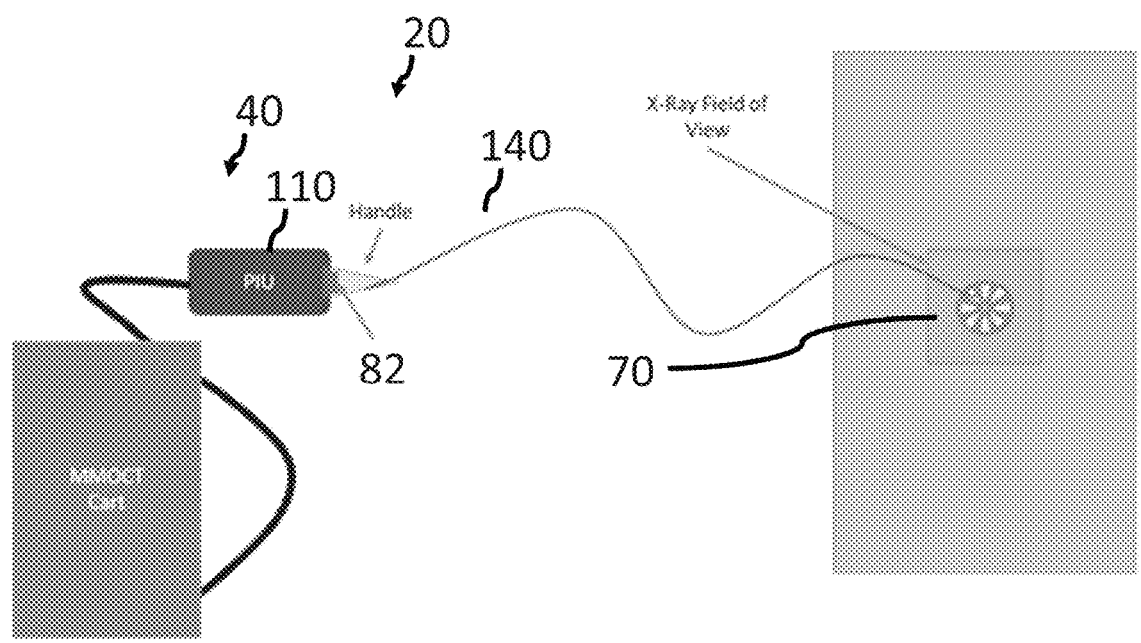
FIG. 8B illustrates at least one embodiment of a catheter or probe using a Light Emitting Diode (LED) and a usage setting in accordance with one or more aspects of the present disclosure.

While not limited to the following examples, the angio image delay time may be determined by one or more components mostly outside of the MM-OCT, OCT, intravascular imaging, or other imaging modality apparatus or system (e.g., the intravascular image system 40 as shown in at least FIGS. 1B, 5A, and 8B; the imaging apparatus or system 20 as shown in FIGS. 1B, 5A, and 8B; etc.) in one or more embodiments. Additionally or alternatively, the angio image delay time may be determined by one or more components that are part of the MM-OCT, OCT, intravascular imaging, or other imaging modality apparatus or system (e.g., the intravascular image system 40 as shown in at least FIGS. 1B, 5A, and 8B; the imaging apparatus or system 20 as shown in FIGS. 1B, 5A, and 8B; the angio system 30 as shown in at least FIGS. 1B and 5A; any combination or portion(s) thereof; any other system or apparatus discussed herein; etc.).

In one or more embodiments, the angio video frame rate may be slower than MM-OCT image, OCT image, intravascular image, or other imaging modality frames, which, for example, may be at the standard 30 FPS for either VGA (Video Graphics Array) or HDMI (High Definition Multimedia Interface) video signals. High frame rate may be supported up to 120 Hz in HDMI in one or more embodiments. The video signal may then pass through an Operating Room's central Booms or equipment management apparatuses/systems and long cables to reach into a video acquisition board (frame grabber) of an MM-OCT, OCT, intravascular imaging, or other imaging modality cart apparatus or system (e.g., the intravascular image system 40 as shown in at least FIGS. 1B, 5A, and 8B; the imaging apparatus or system 20 as shown in FIGS. 1B, 5A, and 8B; any combination or portion(s) thereof (such as another subsystem or system of the apparatus or system 20 or any other component or feature discussed herein; etc.); the video acquisition board or frame grabber may operate to capture the video signal into digital frames and register the digital frames with software or a processor (e.g., processor or computer 1200, 1200', 2, image processor 50, any other processor discussed herein, etc.) with a time stamp from a clock of the apparatus/system. In one or more embodiments, it may still take additional time to display the image on the screen or display. That said, the time stamp is a parameter that may be used to in order to adjust the relative relevance or order with the MM-OCT image, OCT image, intravascular image, or other imaging modality frames when displaying the frames together on the GUI.

In one or more embodiments, the relative delay time between the MM-OCT image, OCT image, intravascular image, or other imaging modality frame image available delay time and the angio frame image available delay time (e.g., MM-OCT image, OCT image, intravascular image, or other imaging modality image available delay time minus the angio frame image available delay time) may be calculated, determined, or obtained to perform angiography image synchronization. In one or more embodiments, since sampling rates may be different for the angiography image frame acquisition and the MM-OCT image, OCT image, intravascular image, or other imaging modality frame acquisition, accuracy may be affected by the sampling rate difference, and the slower sample rate may determine the possible or potential accuracy of the result(s). As such, in one or more embodiments, delay time may consider the sample rate difference as well. In one or more embodiments, a target time to synchronize for each frame may be set as a time at a middle of each frame acquisition. In one or more embodiments, for each angio frame, the time resolution may be half of 1/30 FPS, which is roughly 16.7 ms time wise, corresponding to 0.67 mm distance along the pullback direction. In one or more embodiments, the 30 FPS for angio images may cover about 71° C.T pullback frames.

Figure 4B:
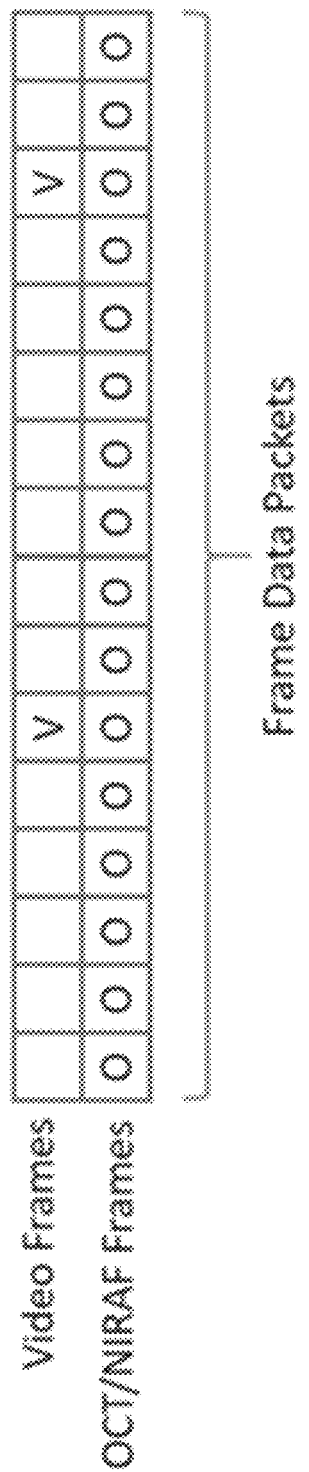
FIG. 4B is a diagram illustrating at least one embodiment of an image frame-mapping pattern that may occur between intravascular OCT/NIRF/NIRAF images and angiography images or video frames due to different sampling frequency in accordance with one or more aspects of the present disclosure.

Byway of at least one embodiment example, FIG. 4B illustrates a natural image frame-mapping pattern between intravascular OCT/NIRAF images and angiography video frames due to possible different sampling frequencies. Although the relative delay time shift may be much longer than a single angio video frame interval, the registration accuracy may be acceptable within a high frequency frame interval of the OCT/NIRAF frame(s), which is about 5 ms, in one or more embodiments. As shown in FIG. 4B, every frame data packet may contain one OCT/NIRAF frame while not all frame data packets may contain video frames. For example, while not limited hereto, the first five frame data packets may include an OCT/NIRAF frame each while the sixth data packet may include a video frame and an OCT/NIRAF frame (as shown in FIG. 4B).

In summary, the relative angio delay time may be dictated/affected by, and/or determined using, a number of factors involving the usage environment of the MM-OCT, OCT, intravascular imaging, or other imaging modality apparatus or system (e.g., the intravascular image system 40 as shown in at least FIGS. 1B, 5A, and 8B; the imaging apparatus or system 20 as shown in FIGS. 1B, 5A, and 8B; the angio system 30 as shown in at least FIGS. 1B and 5A; any combination or portion(s) thereof; etc.) in an OR (Operating Room). In one or more embodiments, the factors outside the apparatus/system, such as the angiography-imaging path, have posted larger delay comparing to the factors inside the MM-OCT, OCT, intravascular imaging, or other imaging modality apparatus/system (e.g., the intravascular image system 40 as shown in at least FIGS. 1B, 5A, and 8B; the imaging apparatus or system 20 as shown in FIG. 1B, 5A, and 8B; any combination or portion(s) thereof; etc.). Given a fixed setting, at least one dominant factor may be the OR/room environment, and each OR/room may be different. Based on the above discussion, the present disclosure provides the following methods to estimate the relative angio delay time (or delay time) and apply the relative angio delay time (or delay time) to synchronize between MM-OCT, OCT, intravascular, or other imaging modality images and the angio frame(s).

In one or more embodiments, angio delay (or delay time) may be measured with a controlled pullback. Since the angio delay time (or the delay time) is a relative value, pullback settings of an MM-OCT, OCT, intravascular, or other imaging modality apparatus/system (e.g., the intravascular image system 40 as shown in at least FIGS. 1B, 5A, and 8B; the imaging apparatus or system 20 as shown in FIGS. 1B, 5A, and 8B; any combination or portion(s) thereof; etc.) may be used to measure the delay time given the following conditions or settings. In one or more embodiments, a first MM-OCT, OCT, intravascular, or other imaging modality image acquisition may happen or occur within a single MM-OCT, OCT, intravascular, or other imaging modality image acquisition cycle when the pullback is started, and the full pullback speed may be reached during this time. In one or more embodiments, since the acquisition of the angio image process may be continuous at the same time, the first angio image registered by the apparatus or system may be an image when the pullback movement has not started yet. In one or more embodiments, the angio delay (or the delay time) may be a value larger than a few angio frames time interval such that the subsequent angio images may show a marker location(s) at the exact same spot, which may confirm that the pullback has not started yet.

In a case where the pullback is started, the acceleration phase may be very short in one or more embodiments, and may be covered inside an angio sample interval. In one or more embodiments, the acceleration phase will be very short and will be covered inside the angio sample interval. Comparing the first two adjacent angio frames, a distance moved within this period of time may be determined. In a case where the pullback continues at the constant speed for the next sample interval, the traveled distance may be (Vp*Cta), which is 0.67 mm as calculated above, where Vp is the speed of pullback, i.e., 20 mm/s, and the Cta is the inverse of the angio sampling rate, i.e., 1/30 seconds, which equals 2/3 mm.

In a case where one or more settings are considered for a FOV (Field of View) of an angio image being about 100 mm depending on zoom factor (which corresponds to about 1024 pixels on an image), the resolution for each pixel on the angio image is about 0.1 mm. Therefore, the movement on the two angio images may be readily apparent. In a case where the first two angio images demonstrate a distance smaller than 0.67 mm, the starting time of the pullback may be interpolated into a sub angio interval level, which may match the first MM-OCT, OCT, intravascular, or other imaging modality frames with a time stamp between the two adjacent angio images with higher or greater accuracy.

Figure 5B:
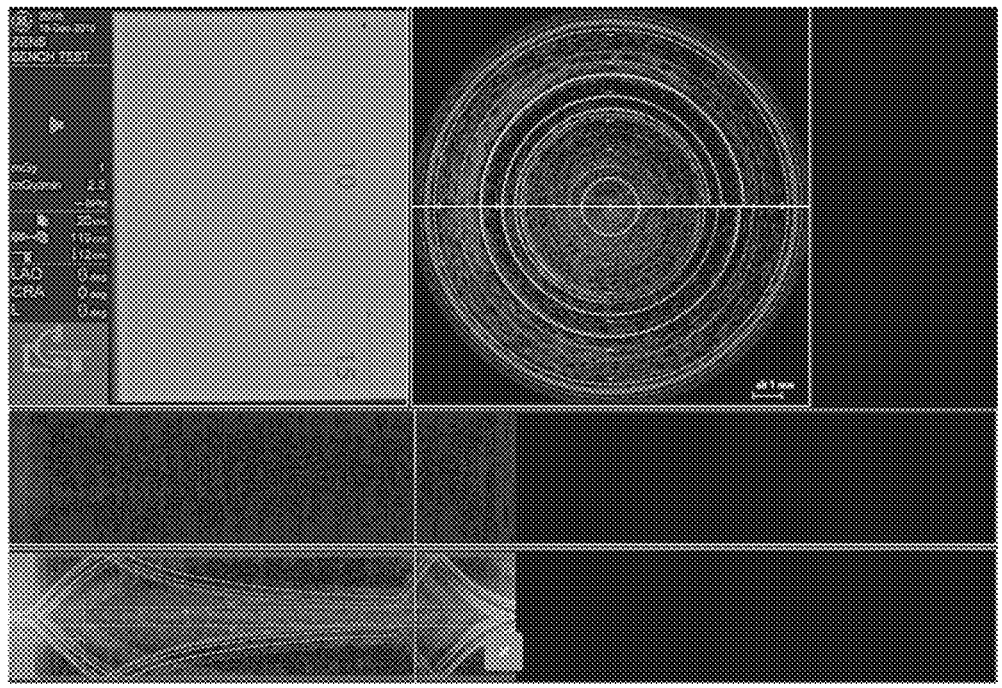
Figure 6:
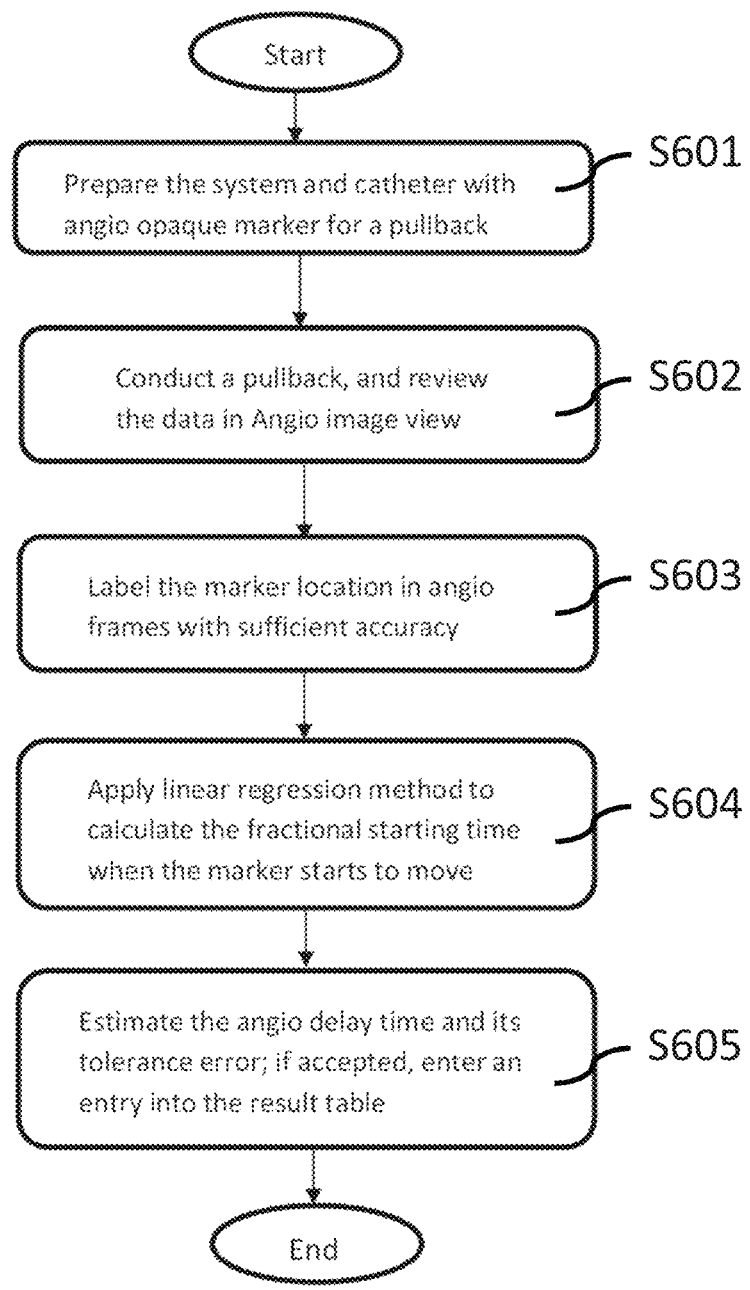
FIG. 6 is a flowchart of at least one method that may be used for measuring or determining delay time or angio delay time in accordance with one or more aspects of the present disclosure.
Figure 11:
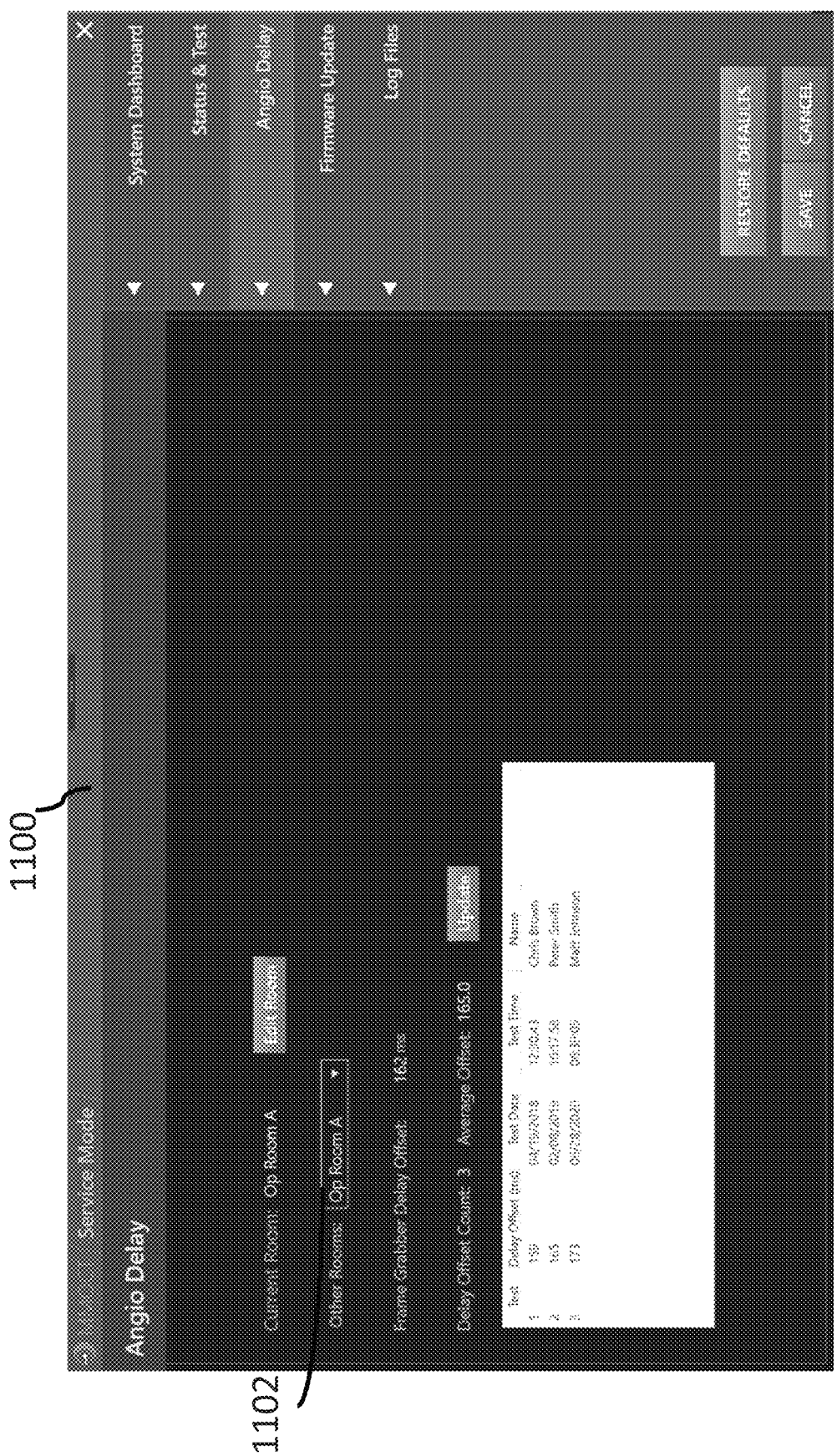
FIG. 11 illustrates at least one embodiment of a GUI showing at least one example of a group of delay or angio delay measurements in accordance with one or more aspects of the present disclosure.

Since there are more or multiple angio frames available in each pullback, multiple frames may be used to identify the marker location(s) and then simple linear regression may be used to calculate the starting point (e.g., where the marker starts to move). In one or more embodiments of a process for estimating or determining the angio delay time (or the delay time) may include one or more of the following steps (see e.g., FIG. 6):

a) Preparing a test catheter/probe (e.g., the catheter/probe 120, any other probe/catheter discussed herein, etc.) with a radio marker (e.g., an angio opaque marker, a marker, any radio marker known to those skilled in the art, any other marker discussed herein, etc.), which is visible by or via angio image (see e.g., step S601 in FIG. 6). Set a straight or predetermined path for pullback. In FIGS. 5A-5B, the angio image displayed (in FIG. 5B) shows an example of a straight pullback (e.g., using the apparatus or system shown in FIG. 5A; any other embodiment examples discussed herein may be used as the apparatus or system; any one or more features discussed herein (whether discussed individually or together) may be used as, and/or along with, the apparatus or system; etc.) along the Y-axis with a visible ruler next to the visible marker in the angiography image. In addition, one or more embodiments may employ another setup for a straight pullback diagonally, i.e., in a 45-degree angle to the X, Y coordinates of the angio image. This alternative embodiment may maximize the spatial resolution and may achieve a slightly higher special resolution (as compared with the embodiment using a pullback along the Y-axis). In addition, one or more embodiments may adjust a FOV of an angio image to its minimal limit, i.e., maximize the zoom factor and hence the pixel resolution. The ruler along the path is optional in one or more embodiments. The ruler operates to confirm the actual pullback length, and/or to calibrate the special resolution of the angio image. This may be useful in a case or cases where the parameters associated with the MM-OCT, OCT, intravascular imaging, or other imaging modality apparatus or system (e.g., the intravascular image system 40 as shown in at least FIGS. 1B, 5A, and 8B; the imaging apparatus or system 20 as shown in FIGS. 1B, 5A, and 8B; any combination or portion(s) thereof; etc.) have not been calibrated yet or may be recalibrated. However, one or more embodiments may not employ an angio delay calculation in a case where the distance on the angio image is proportional to the frame time interval. While various features of one or more imaging apparatuses or systems are discussed herein, such imaging apparatuses or systems are not limited thereto, and may be modified as desired to use any feature discussed in the present disclosure or to use any combination of the features of the present disclosure.

b) Conducting a pullback and review the data (see e.g., step S602 in FIG. 6), to evaluate whether there are options for a shorter pullback. In one or more embodiments, using a 2 mm or 0.5 sec pullback with a total of 100 frames may be sufficient. There may be roughly or about 15 angio images associated with the example pullback for one or more embodiments.

c) Identifying and/or labeling the marker location(s) in angio frames with sufficient accuracy (see e.g., step S603 in FIG. 6). For example, in one or more embodiments, the method may further include one or more of the following: starting with special review mode in Service Mode; going through each of the angio images; and marking, or using a label tool to mark, the location(s) of the radiopaque maker(s). In one or more embodiments, the location may be a predetermined or set location of the radiopaque marker(s), such as, but not limited to, a center location of each of the radiopaque marker(s). The radiopaque marker(s) are identified and/or marked accurately using a processor (e.g., processor 1200, 1200', 2, etc.; image processor 50; any other processor discussed herein; etc.). The image viewer and/or processor (e.g., processor 1200, 1200', 2, etc.; image processor 50; any other processor discussed herein; etc.) operates to further zoom in to the angio image such that the marked center location may reach a subpixel level of accuracy.

d) Applying linear regression to calculate the fractional starting time when the marker starts to move (see e.g., step S604 in FIG. 6). Based on the processor labeled locations or user labeled locations, one or more linear regression method embodiments may further include running a simple linear regression analysis and figuring out the starting frame location in terms of time stamps. In addition, the result may have, and one or more method embodiments may further include, error metrics calculation, such as, but not limited to, RMSE (Root Mean Square Error).

e) Estimating the angio delay time (see e.g., step S605 in FIG. 6). For example, in one or more embodiments, the estimating step may include estimating the angio delay time (or the delay time) and a related tolerance error, and, in a case where the estimated angio delay time and/or the related tolerance error are accepted or within acceptable threshold limits, then the angio delay time (or the delay time) and/or the related tolerance error is/are entered into a result table (at least one embodiment example of a result table is shown in FIG. 11 discussed further below). In one or more embodiments, the angio delay time (or the delay time) may be estimated as the interpolated start frame time stamp calculated above minus the time stamp of the first MM-OCT image, OCT image, intravascular image, or other imaging modality image in the pullback.

While not limited hereto, one or more embodiments of methods measuring angio delay (or the delay time) with a controlled pullback may operate using the condition that the horizontal speed of the pullback is reached as quickly as a first frame is complete. Otherwise, the error may be larger than an interval of one MM-OCT image, OCT image, intravascular image, or other imaging modality image. Given the much lower sample rate of an angio frame, such error is still acceptable within a tolerance range for a practical or useful range. In one or more embodiments, MM-OCT images may not be used at all. Again, in a case where a direct synchronization signal may be established between an MM-OCT, OCT, intravascular, or other imaging modality frame and an angio frame, the angio delay (or the delay time) estimate may be determined much easier and is simple to calculate.

Figure 7A:
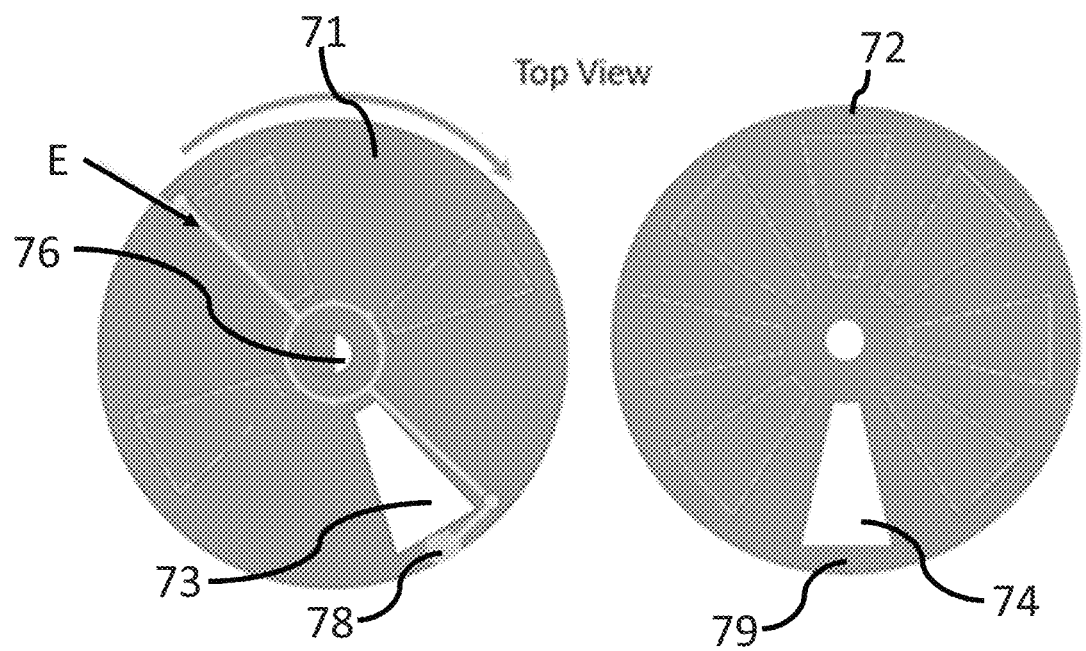
FIG. 7A is at least one embodiment of a top view of a rotating apparatus or system that operates to measure delay or angio delay in accordance with one or more aspects of the present disclosure.
Figure 7B:
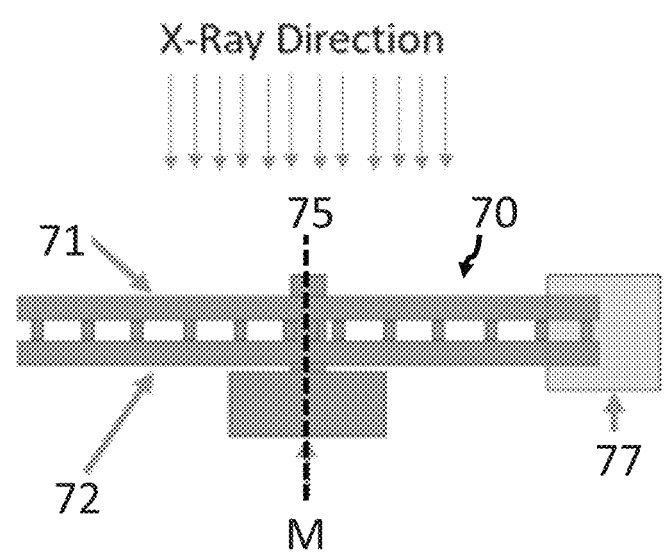
FIG. 7B is at least one embodiment of a side view of a rotating apparatus or system that operates to measure delay or angio delay in accordance with one or more aspects of the present disclosure.

In one or more embodiments, the angio delay (or the delay time) may be measured with synchronized signals on both of the MM-OCT, OCT, intravascular, or other imaging modality image and the angio image streams. For example, one or more embodiments may use or include a rotating device that operates to measure the angio delay interval, such as, but not limited to, the device and other features discussed in U.S. patent application Ser. No. 17/831,018, filed Jun. 2, 2022, which is incorporated by reference herein in its entirety. Using synchronized signals, the angio delay may be measured by comparing the time interval observed by pullback (e.g., MM-OCT pullback, OCT pullback, etc.) for the same event. At least one embodiment of the rotating device may be made of two round metal plates with a same-shaped (e.g., triangular, trapezoidal, or other geometric shape) hole on both of the two metal plates. The first plate is fixed on the base (or other location of the rotating device), and the second plate operates to rotate around an axis (see e.g., axis 75 shown in FIG. 7B) over, or adjacent to, the second plate. FIG. 7A shows at least one embodiment of a top-view of each of two disks or plates 71, 72 of a rotating device 70, and FIG. 7B shows a side-view of the rotating device 70. The angio image operates to look at a combined top-view of the rotating device 70 in one or more embodiments. The plate 71 operates as a shutter body that rotates around an axis 75 (see e.g., FIG. 7B) extending through the hole 76, and the plate 71 includes a hole 73. The rotating device 70 may include a motor M that operates to rotate the rotating plate 71. The plate 72 includes a hole 74, and the plate 72 operates as a stationary body. In one or more embodiments, the holes 73, 74 have the same size and shape. In a case where the plate 71 rotates to other angles and the holes 73, 74 are not overlapping at all, a completely dark circle appears in an angio image as the X-ray is blocked by the metal plates 71, 72 (see e.g., the right image of FIG. 8A). When the two holes 73, 74 on the plates 71, 72 overlap with each other, the holes 73, 74 form a shaped (e.g., triangular, trapezoidal, or other geometric shape) hole that the X-ray may pass through directly. Therefore, the angio image will show a shaped (e.g., triangular, trapezoidal, or other geometric shape) area of brightness 81 inside the dark circle (see e.g., left image of FIG. 8A). The area will reach a maximum area (also referred to as a maximum overlapping area) when the two holes 73, 74 overlapping completely such that the area will be similarly shaped (e.g., triangular, trapezoidal, or other geometric shape) as compared with the holes 73, 74. In cases where the two holes 73, 74 overlap (partially or completely) such that an area of brightness appears in an angio image, a shutter is considered to be open such that X-rays pass through the holes 73, 74. In cases where the two holes 73, 74 do not overlap at all such that a completely dark circle appears (see e.g., right image of FIG. 8A), then the shutter is considered to be closed such that X-rays do not pass through the holes 73, 74. As mentioned above, the rotating plate 71 may be driven by a motor M using the connector 76. In one or more embodiments, the rotating speed of the motor M does not need to be very fast. For example, the plate 71 may rotate at about or less than 20 rounds per second in order to have sufficient time interval for the angio delay measurement. In one or more embodiments, the plate 71 of the rotating device 70 may be manually driven and may reach a speed of about 5-10 rounds per second and may gradually slow down due to any friction(s). Since the opening may be ⅛ of the circle (or other geometric shape) in one or more embodiments, the peak signal in an angio video may be about 1/80 to about 1/40 in second between repetitive peaks, which is about half of the frame rate and, therefore, the angio video peak signal(s) may be easily visible. Such kinds or types of speed may allow angio delay measurement to be calculated within the period of neighboring peak signals. The rotating device 70 may further include a switch connector component 77 (see FIG. 7B). The switch connector component 77 may be an electrical switch that operates to be connected briefly at a time or in a case where the shutter opens to a predetermined size. In one or more embodiments, the predetermined size may be the maximum size of the shutter. The expected angio images, in a case where the shutter opens at the predetermined size being a maximum size for at least one embodiment, are illustrated in FIG. 8A where the left image of FIG. 8A shows an angio image where the two holes 73, 74 overlap (e.g., completely) with each other such that the shutter is open and where the right image of FIG. 8A shows an angio image where the two holes 73, 74 do not overlap at all such that the shutter is closed. In one or more embodiments, the plates 71, 72 may be reversed in orientation such that one or more of the following: (i) the motor is located on the side of the plate 71 that is positioned, or facing, away from the plate 72; and/or (ii) the X-Ray Direction approaches the device 70 towards a side having the stationary plate 72 (e.g., from the opposite side of the device 70).

In a case where the maximum overlapping area is reached, the rotating device 70 may further include a switch 78 that interacts with both plates 71, 72 such that the switch 78 operates to connect the plates 71, 72 briefly at the peak time. As mentioned above, a switch connector component 77 may be a stationary component fixed on the plate 72, and the switch connector component 77 may have established an electrical connection to a lump 79 disposed on or at the plate 72 towards or facing the plate 71. There is a lump 78 disposed on or at the movable plate 71 towards or facing plate 72, and the lump 78 operates to touch the lump 79 to form a closed switch when or in a case where the lumps 78, 79 meet during the rotation. The switch connector component 77 may have another fixed electrical connector which operates to touch both of the lumps 78 and 79 at the same time when or in a case where the lumps 78, 79 meet. The locations of the lumps 78 and 79 are both shown in FIG. 7A. The switch is at a connected state when or in a case where the lump 78 touches the fixed connector lump 79 on the plate 72 at the same or similar spot. Otherwise, the switch state may be unconnected. The switch connector component 77 may then have one or more (e.g., two) wires extend out as an electrical switch which are connected to a circuit to light a special Light Emitting Diode (LED) 82 (see e.g., FIG. 8B) to emit near-infrared (NIRF) fluorescence light or near-infrared auto-fluorescence (NIRAF) light that may be picked up by a sensor in a component (e.g., a NIRF/NIRAF subsystem; one or more components as shown in FIG. 8B; etc.) of, or in communication with or used with, the MM-OCT, OCT, intravascular, or other imaging modality apparatus/system (e.g., the intravascular image system 40 as shown in at least FIGS. 1B, 5A, and 8B; the imaging apparatus or system 20 as shown in FIGS. 1B, 5A, and 8B; any combination or portion(s) thereof; etc.). In one or more embodiments, the electrical circuit may be etched (see e.g., etching E shown in plate 71 on the left side of FIG. 7A). The NIRF/NIRAF signal may be sampled at high frequency and may be encoded into the data captured by one or more sensors (or other hardware component(s), such as, but not limited to, an Alazar digitizer) of the MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; any combination or portion(s) thereof; etc.). The LED 82 that operates to emit NIRF/NIRAF light may be located anywhere in, on, or near the MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; any combination or portion(s) thereof; etc.). For example, while not limited to this configuration, the LED 82 may be located on a side, or on a handle, of the PIU 110 as shown in FIG. 8B. Eventually, the NIRF/NIRAF signal is saved as part of MM-OCT, OCT, intravascular, or another imaging modality as frame data. In one or more embodiments, the LED light 82 turns or is on and the area peak physically happened at the same time given a steady rotating speed of the device 70. As such, any existing time delay may be detected by checking a difference of the time stamps of the peak of the NIRF/NIRAF signal and of the corresponding NIRF/NIRAF light signal on the MM-OCT, OCT, intravascular, or other imaging modality image in the MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; any combination or portion(s) thereof; etc.). The NIRF/NIRAF LED 82 may be contained or included in a special catheter 140 with an electrical circuit connection with the device 70, and the usage setting as illustrated in FIG. 8B. In one or more embodiments, one or more windows or openings 81 may be used where the disk 71 may have multiple holes 73 and the disk 72 may have multiple holes 74 and respective holes 73, 74 overlap with each other to create multiple windows or openings 81 (see e.g., FIG. 8B). Such an embodiment may allow the use of more X-Ray data and/or more NIRF/NIRAF data to improve accuracy.

Figure 9:
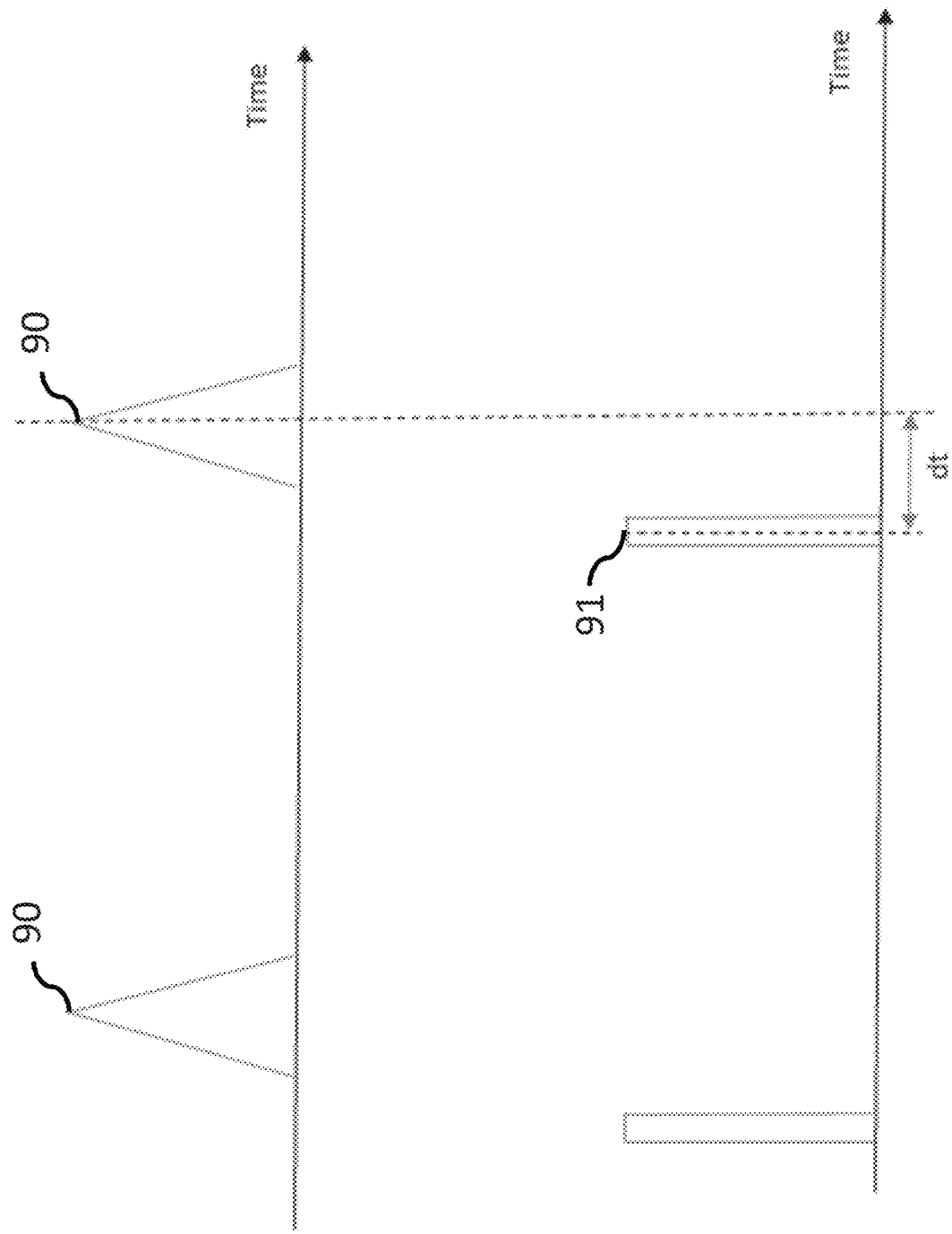
FIG. 9 illustrates at least one embodiment of results that may be obtained while using a method, device, system, or storage medium for measuring delay or angio delay in accordance with one or more aspects of the present disclosure.
Figure 10:
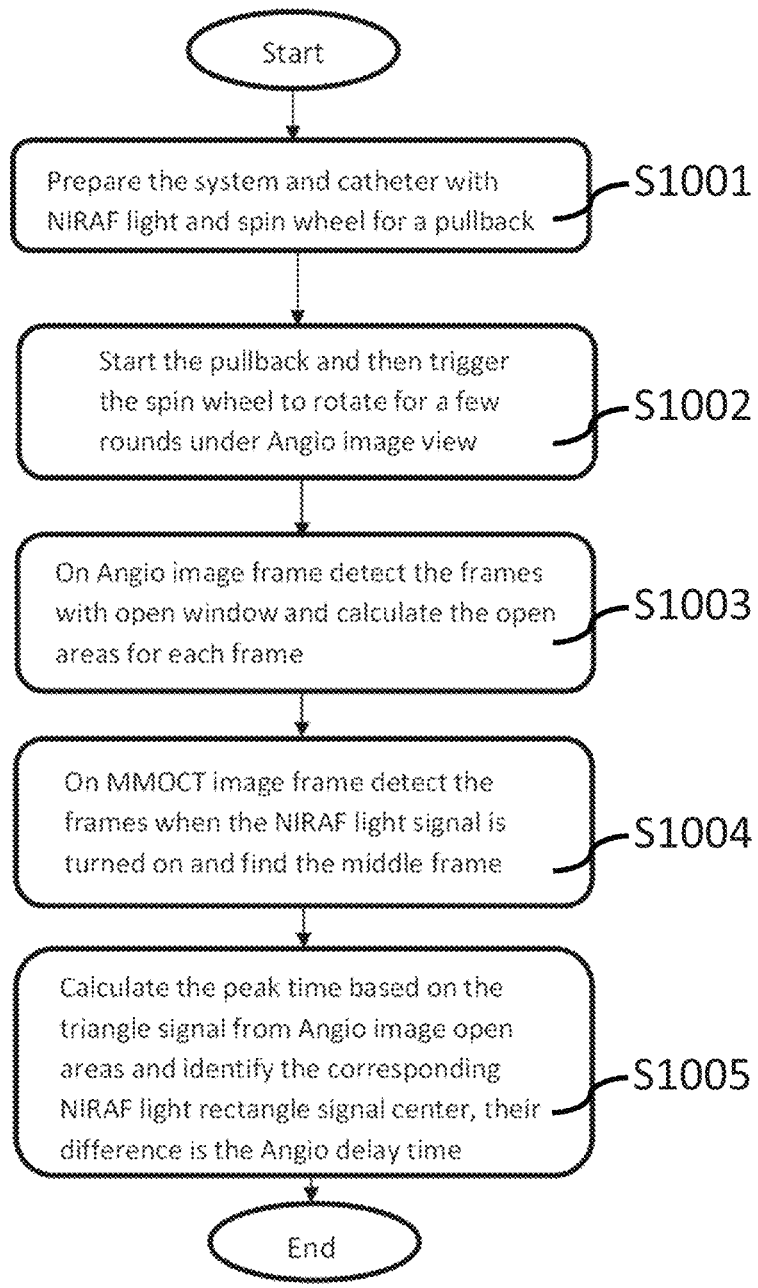
FIG. 10 is a flowchart of at least one further method that may be used for measuring or determining delay time or angio delay time in accordance with one or more aspects of the present disclosure.

At least one embodiment of a process for using the rotating device 70 to measure the angio delay (or the delay time) is shown in the flowchart of FIG. 10. The signal analysis part of the at least one process embodiment is explained further as the following. In a case where the plate 71 of the device 70 spins at a certain, predetermined, or set speed, the angio video images captured by one or more processors (e.g., the processor 1200, 1200', 2, the image processor 50, etc.) and/or a frame grabber operate to display or show the overlapping holes 73, 74 from closed or shutter-closed condition (see e.g., the right image of FIG. 8A) to fully overlapped maximum area with at least one opening or area 81 (see e.g., open shutter configuration in the left image of FIG. 8A), and then close down to zero at each rotation. One or more image processes, methods, or algorithms may be used to measure an area(s) of the window or opening 81 in each consecutive image frame, and the results should be a signal with a triangle shaped pulse for each rotation as illustrated in FIG. 9. The peak 90 of the triangle corresponds to the maximum window area at the time when two of the holes 73, 74 are fully overlapping. In one or more embodiments, an area sum value inside a disk or plate 71, 72 for angiography images in terms of time may be a triangular-shaped signal. At the same time, the NIRF/NIRAF LED light 82 also may be turned on by the switch mechanism mentioned above for the switch connector component 77 and the lumps 78, 79. In one or more embodiments, a corresponding NIRF/NIRAF light signal on an image may be a rectangular-shaped signal, such as the rectangular signals shown in FIG. 9 (in one or more embodiments, the NIRF/NIRAF signal may have a square shape or other geometric shape). In one or more embodiments, the peak time (or the time when the maximum window area is achieved such that the peak 90 exists for the triangular signal) may match a center (or other predetermined portion) 91 of a rectangular-shaped NIRF/NIRAF signal, for example, as shown in FIG. 9. From a point of view of one or more MM-OCT, OCT, intravascular, or other imaging modality images, the rectangular signal may be composed of multiple frames where the NIRF/NIRAF signal is available. For example, in one or more embodiments, the NIRF/NIRAF signal may show up on an outer skirt of a FOV (e.g., a round FOV) of a Tomo image. Since the on/off nature of the light 82 is more like a binary signal, the light 82 may operate to indicate whether the NIRF/NIRAF signal is available, and such information may be used to determine the start and the end frames of the rectangle signal with the accuracy of a single MM-OCT, OCT, intravascular, or other imaging modality frame interval. Additionally, as illustrated in FIG. 9, in a case where both the triangular-shaped signal and the rectangular-shaped signal are obtained from the MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70; any combination or portion(s) thereof; etc.) on two timelines, the angio delay time may be calculated from the two timelines by using, for example, the values or difference in time, dt, between the respective center 91 and peak 90.

On or for angiography images, the peak of the maximum area (e.g., the peak 90 of the triangular or other shaped signal) may not be on an exact frame in one or more embodiments. As such, in one or more embodiments, neighboring triangle area values may be used to interpolate the peak 90 to achieve higher accuracy of a location of the peak 90. On the other hand, since the MM-OCT, OCT, intravascular, or other imaging modality frames may have a higher resolution than a resolution of an angiography frame or frames, a location of the center of the rectangle or rectangular-shaped signal may be accurately determined, in one or more embodiments, by determining a start frame and an end frame of the MM-OCT, OCT, intravascular, or other imaging modality frames. Then, a determination as to whether the NIRF/NIRAF light is present on the frame(s) may be performed such that the center location (or center frame) or the middle location (or middle frame) of the NIRF/NIRAF signal (or the rectangular-shaped NIRF/NIRAF signal) may be determined accordingly. The time difference between the middle frame's time stamp and the time stamp corresponding to the triangle signal's peak will the estimated angio delay we are looking for.

By way of at least one example as shown in FIG. 10, one or more methods of determining angio delay (or delay time) may include one or more of the following: (i) preparing the apparatus or system (e.g., the intravascular, OCT, MM-OCT, or other imaging modality image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70 (see e.g., FIGS. 7A-8B); any combination thereof; etc.) and the catheter (e.g., the catheter or probe 140 as shown in FIG. 8B, any other catheter or probe discussed herein, etc.) with NIRF/NIRAF light and/or preparing the wheel or disk (e.g., the wheel or disk 71) of a rotating device (e.g., device 70) to be spun or rotated for a pullback (see e.g., step S1001 in FIG. 10); (ii) starting the pullback, turning on the NIRF/NIRAF light, and triggering the rotation of the spin wheel or disk (e.g., the wheel or disk 71) to rotate for one or more rounds under an angio image view (see e.g., step S1002 in FIG. 10); (iii) on or using the angio frames, detecting the frames with an open window or area (e.g., the open area(s) 81) and calculating the open areas (e.g., the open area(s) 81) for each frame (see e.g., step S1003 in FIG. 10); (iv) on or using one or more MM-OCT, OCT, intravascular, or other imaging modality images or frames, detecting the frames where the NIRF/NIRAF light signal is turned on by detecting a signal for the NIRF/NIRAF light and finding a center or middle (e.g., a middle frame) (or other predetermined portion) of the NIRF/NIRAF signal (see e.g., step S1004 in FIG. 10); and/or (v) calculating angio delay time (or the delay time) by determining a peak time (e.g., which may occur when the holes 73, 74 of the device 70 overlap completely; which may occur when the open area(s) 81 is at its maximum size; etc.) based on a signal (e.g., corresponding to an area sum value in or on an angio image or images in terms of time; corresponding to the size of the open area(s) 81; corresponding to the size of an open area(s) 81 represented by an amount of overlap between at least the holes 73, 74 of the device 70; etc.) from one or more open areas in one or more angio images (e.g., the signal may be obtained or received based on data from the rotating device (e.g., the rotating device 70)), by determining or identifying a corresponding time value for a corresponding portion/location (e.g., a middle frame, a center value or position, etc.) of the NIRF/NIRAF light signal (e.g., the portion/location of the NIRF/NIRAF light signal corresponds to the peak of the signal obtained from the one or more angio images), and calculating a time difference between the peak time and the determined or identified time of the corresponding portion/location of the NIRF/NIRAF light signal (see e.g., step S1005 of FIG. 10).

One or more embodiments of the present disclosure may use delay time measurement and configuration management features, such as, but not limited to, using such features along with a user interface or GUI (e.g., a GUI, such as the GUI 1100 shown in FIG. 11). In one or more embodiments, a GUI component has been designed to manage the angio delay time information for multiple ORs (Operating Rooms) so that an MM-OCT, OCT, intravascular, or other imaging modality cart apparatus or system may be used in different locations whenever needed. In a case where a service team delivers the MM-OCT, OCT, intravascular, or other imaging modality apparatus or system at a particular site, the initialization process may request that all rooms (including ORs) to be used with the apparatus or system be added or included. The procedure of measuring the angio delay time is performed or employed for each room for all of the rooms being evaluated to allow the correct angio delay compensation to be applied for all pullbacks done in each room of all of the rooms being evaluated. When adding an OR into the apparatus or system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70; any combination or portion(s) thereof; any other system or apparatus discussed herein; etc.), multiple angio delay measurements may be conducted and their differences are preferably within a tolerant range of about 0.02 seconds or of f 0.02 seconds, which is corresponding to one MM-OCT, OCT, intravascular, or other imaging modality frame in a pullback in one or more embodiments.

In one or more embodiments, the angio delay time may be considered as part of the configuration information in an MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70; any combination or portion(s) thereof; etc.). To create such a record, an operator or user of the MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70; any combination or portion(s) thereof; etc.) may follow a procedure on the software and/or hardware. First, the user or operator may move the cart in an OR and have all equipment connected in the same settings for acquiring a pullback for MM-OCT, OCT, intravascular, or other imaging modality. Second, a corresponding catheter or device (e.g., the catheter 120, the catheter 140, the device 70, etc.) may be properly connected to the MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70; any combination or portion(s) thereof; etc.). Then, the operator or user may conduct a pullback with angio video and may display the angio images/frames and/or the MM-OCT, OCT, intravascular, or other imaging modality images/frames on screen side by side. In one or more embodiments using the aforementioned process(es) of measuring angio delay with a controlled pullback, the user or controller may label the radiopaque marker(s) on multiple angio images. Then, the software and/or the one or more processors (e.g., the processor 1200, 1200', 2, etc.; imaging processor 50; any other processor discussed herein; etc.) may operate to calculate the angio delay (or delay time) measurement result(s) and enter the information in a table with test related information. In one or more embodiments using the aforementioned process(es) of measuring angio delay (or delay time) with synchronized signals, the user or controller may confirm the aforementioned center/middle (or other predetermined or set location) of MM-OCT, OCT, intravascular, or other imaging modality apparatus/system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70; any combination or portion(s) thereof; etc.) frame(s) where the NIRF/NIRAF signal is available and the area measurements curve or signal shows a peak occurring (which may be calculated from angio images with triangular, trapezoidal, or other geometrically desired holes). Then, the software and/or the one or more processors (e.g., the processor 1200, 1200', 2, etc.; imaging processor 50; any other processor discussed herein; etc.) may record the calculated angio delay value in the same table. Finally, multiple pullback and measurement process(es) may be done, and the average values may be calculated as the accepted delay used in this particular OR. At the same time, the variation of the results may also be checked and confirmed by the user or operator and/or the one or more processors (e.g., the processor 1200, 1200', 2, etc.; imaging processor 50; any other processor discussed herein; etc.) may operate to automatically check and confirm that the results are within acceptable, set ranges or limits. In a case where the differences on some tests are too big from others or exceed predetermined/set limits/ranges, the one or more processors (e.g., the processor 1200, 1200', 2, etc.; imaging processor 50; any other processor discussed herein; etc.) and/or the user or operator may remove the differences that are too large and repeat similar tests to ensure that a desired average value is obtained.

As aforementioned, FIG. 11 shows at least one embodiment example of a GUI 1100 showing an example of a group of angio delay measurements associated with a particular OR having the name "Op Room A". In this GUI 1100, a user may have the capability to add, edit, and remove a room from a list of rooms (which may be viewed or changed using a drop down menu icon 1102). Each room is preferably associated with a group of the one or more angio delay measurements. Once the measurement process is done, the average value may be accepted by the user or operator by clicking the "Update" button or may be accepted by one or more processors (e.g., the processor 1200, 1200', 2, etc.; imaging processor 50; any other processor discussed herein; etc.) automatically. Such value may be used by a configuration manager to make an adjustment or adjustments for future pullbacks acquired by the apparatus or system (e.g., the intravascular image system 40 as shown in at least FIGS. 1B, 5A, and 8B; the angio system 30 as shown in at least FIGS. 1B and 5A; the imaging apparatus or system 20 as shown in FIGS. 1B, 5A, and 8B; the NIRF/NIRAF device, system or sub-system 70; any combination or portion(s) thereof; etc.) in this OR. As shown in the "Angio Delay" tab, the current room is "Op Room A" as aforementioned; the Frame Grabber Delay Offset is shown as 162 ms (but may be changed by the one or more processors discussed herein automatically or may be changed manually by the user or operator as desired); and the Delay Offset Count is "3" while the Average Offset is 165.0. The data being shown includes data for three Tests, 1, 2, and 3. The Delay Offset (ms) is shown as 159 ms, 165 ms, and 173 ms, respectively. While one or more embodiments may not use or require such information, Test Dates and Times are also recorded for the three tests as shown in FIG. 11. Each test may list who performed the test as well. The GUI 1100 also includes an apparatus or system dashboard, a status and test page, a firmware update page, and log files page as shown on the right side of FIG. 11. A user or controller may also restore default values or save data as shown via the icons on the bottom right of FIG. 11. While the GUI 1100 may operate in a Service Mode as discussed herein, the GUI 100 may also operate outside of Service Mode such that the user or controller may also check the angio delay value associated with the pullback in Review Mode, or may switch to a different OR which has already been configured.

One or more embodiments of synchronization and/or delay measurements techniques and/or one or more imaging techniques discussed herein may be used with optical probe applications in accordance with one or more aspects of the present disclosure. The system 100 comprises a light source 101, a reference arm 102, a sample arm 103, a splitter 104 (also referred to herein as a "beam splitter"), a reference mirror (also referred to herein as a "reference reflection") 105, and one or more detectors 107. The system 100 may include a phase shift device or unit 130, and, in one or more embodiments, the phase shift device or unit may be omitted. In one or more embodiments, the system 100 may include a patient interface device or unit ("PIU") 110 and a catheter or probe 120 (as diagrammatically shown in at least FIGS. 1B-2, 5A, and 12A), and the system 100 may interact with a sample or target 106 (e.g., via the catheter/probe 120 and/or the PIU 110). In one or more embodiments, the system 100 includes an interferometer, or an interferometer is defined by one or more components of the system 100, such as, but not limited to, at least the light source 101, the reference arm 102, the sample arm 103, the splitter 104, and the reference mirror 105.

The light source 101 operates to produce a light to the splitter 104, which splits the light from the light source 101 into a reference beam passing into the reference arm 102 and a sample beam passing into the sample arm 103. The beam splitter 104 is positioned or disposed at an angle to the reference mirror 105, the one or more detectors 107, and the sample, object, or target 106. The reference beam goes through the phase shift unit 130 (when included in a system, as shown in the system 100), and the reference beam is reflected from the reference mirror 105 in the reference arm 102 while the sample beam is reflected or scattered from a sample, object, or target 106 through the PIU (patient interface unit; also referred to herein as a patient interface component (PIC)) 110 and the catheter 120 in the sample arm 103. In one or more embodiments, the phase shift unit 130 may be omitted from a device or system as desired. Both of the reference and sample beams combine (or recombine) at the splitter 104 and generate interference patterns. The output of the system 100 and/or the interferometer thereof is continuously acquired with the one or more detectors 107, e.g., such as, but not limited to, photodiodes, cameras, multi-array cameras, etc. The one or more detectors 107 measure the interference or interference patterns between the two radiation or light beams that are combined or recombined. In one or more embodiments, the reference and sample beams have traveled different optical path lengths such that a fringe effect is created and is measurable by the one or more detectors 107. Electrical analog signals obtained from the output of the system 100 and/or the interferometer thereof are converted to digital signals to be analyzed with a computer, such as, but not limited to, the computer 1200, 1200' (shown in FIG. 14 or FIG. 15, respectively, discussed further below). In one or more embodiments, the light source 101 may be a radiation source or a broadband light source that radiates in a broad band of wavelengths. In one or more embodiments, a Fourier analyzer including software and electronics may be used to convert the electrical analog signals into an optical spectrum. In one or more embodiments also including the rotating device 70 and the catheter 140 connecting to the PIU 110 (see e.g., FIG. 8B), the one or more detectors 107 and the one or more processors or computers (e.g., 1200, 1200', 2, image processor 50, any other processor or computer discussed herein, etc.) further operate to receive the signals/data from the rotating device 70 via the PIU 110.

The light source 101 and/or the LED 82 may include a plurality of light sources or may be a single light source. The light source 101 generates broadband laser lights in one or more embodiments. The light source 101 may include any light emitting component, such as, but not limited to, one or more of a laser, an organic Light-Emitting Diode (OLED), a Light-Emitting Diode (LED), a halogen lamp, an incandescent lamp, supercontinuum light source pumped by a laser, and/or a fluorescent lamp. The light source 101 may be any light source that provides light which may then be split up into at least three bands in which each band is further dispersed to provide light which is then used to for spectral encoding of spatial information. The light source 101 may be any light source that provides light which may then be dispersed to provide light which is then used for imaging, performing control, viewing, changing, emphasizing methods for imaging modalities, constructing or reconstructing 3D structure(s), and/or any other method discussed herein. The light source 101 may be fiber coupled or may be free space coupled to the other components of the system or systems discussed herein, such as, but not limited to, the system 100, the system 100', the system 100", the system 100''', etc. The light source 101 may be a swept-source (SS) light source. The LED 82 may include any one or more of the features of the light source 101 discussed herein.

In accordance with at least one aspect of the present disclosure, a feature of OCT devices or systems is implemented using fiber optics. As aforementioned, one application of an OCT technique of the present disclosure is to use OCT with a catheter or probe 120 as schematically shown in FIGS. 1A-2.

Figure 12A:
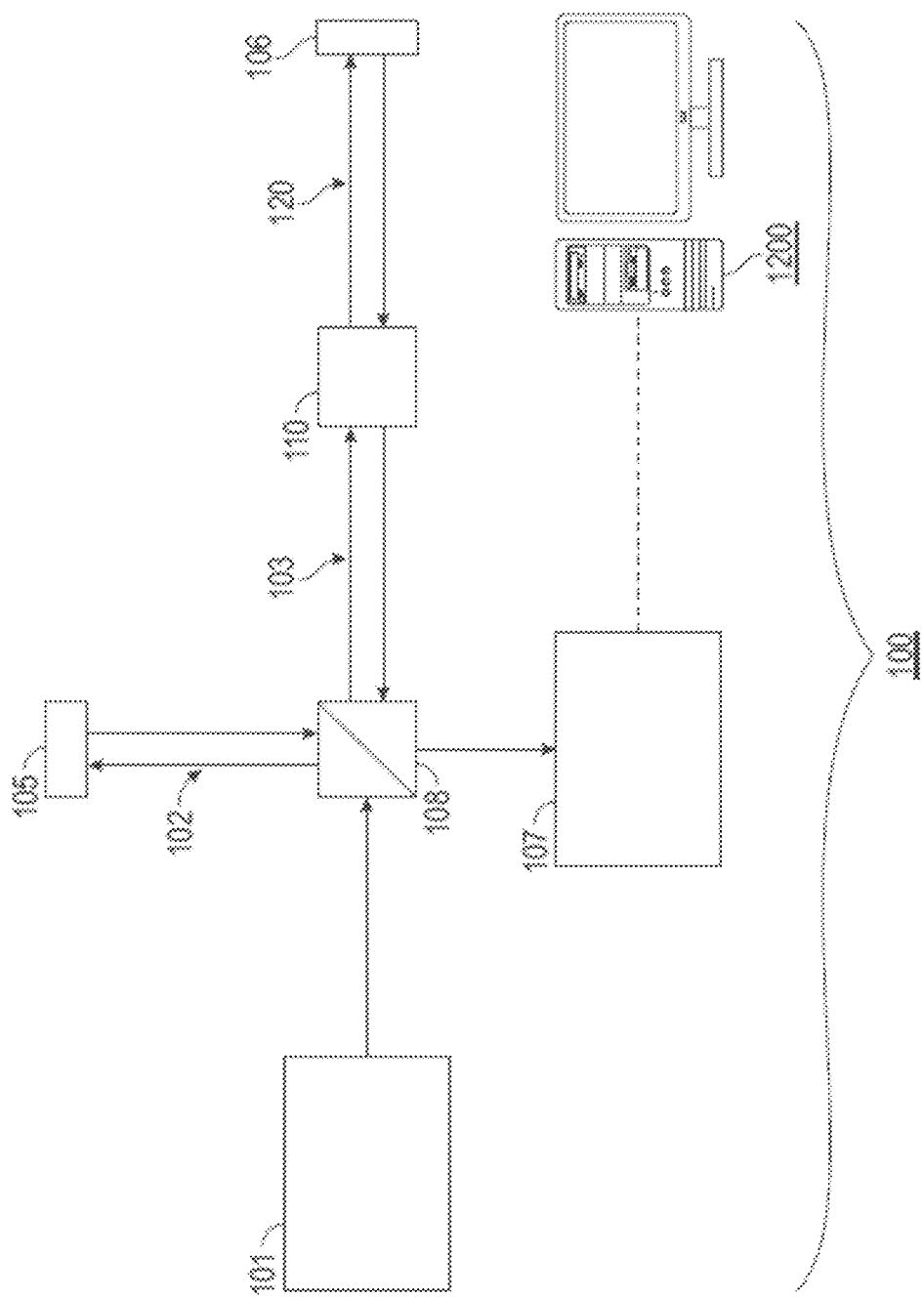
FIG. 12A shows at least one embodiment of an OCT apparatus or system for utilizing one or more imaging modalities for performing image and/or video synchronization and/or measuring or determining delay or angio delay in accordance with one or more aspects of the present disclosure.
Figure 12B:
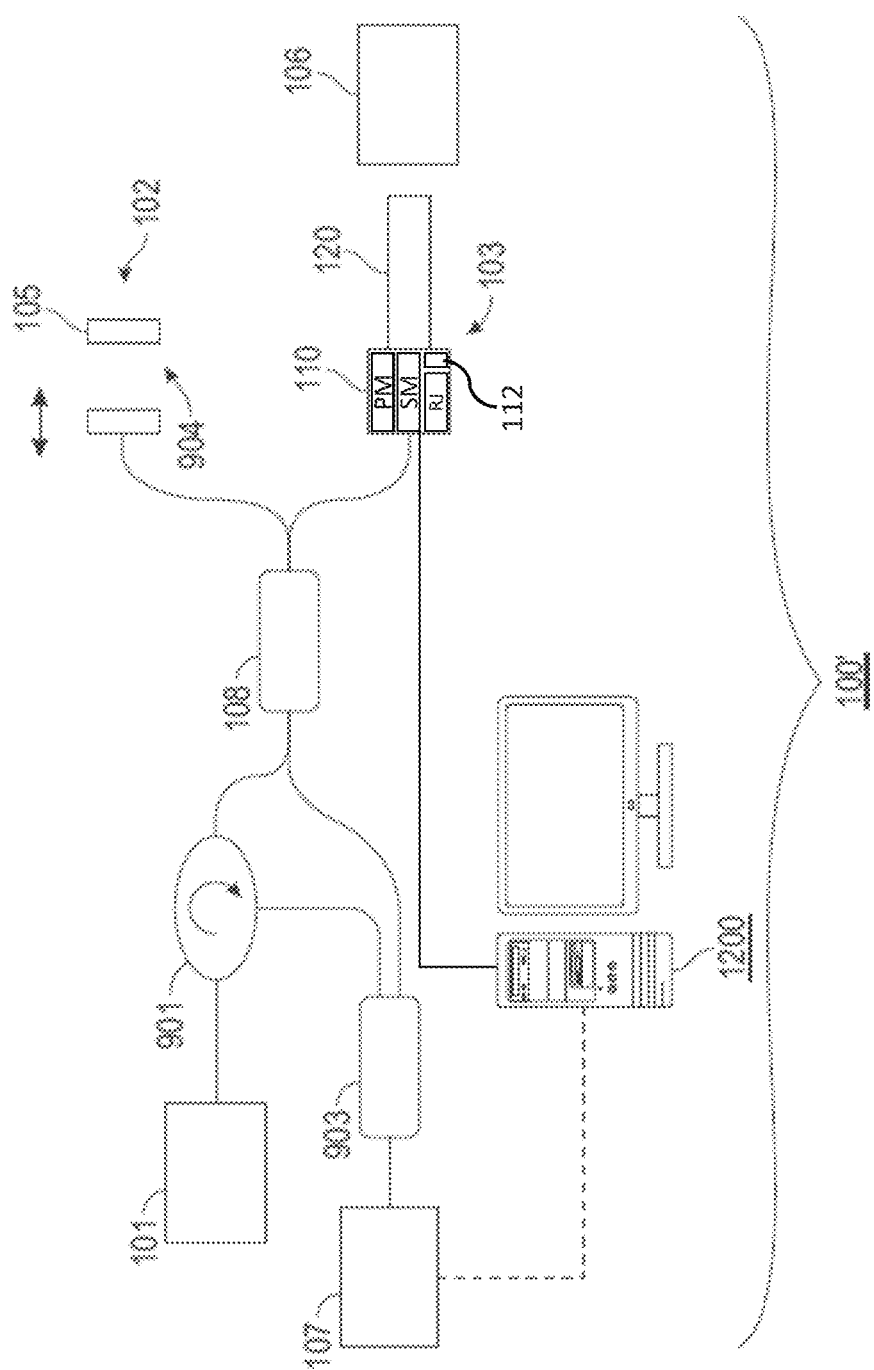
FIG. 12B shows at least another embodiment of an OCT apparatus or system for utilizing one or more imaging modalities for performing image and/or video synchronization and/or measuring or determining delay or angio delay in accordance with one or more aspects of the present disclosure.
Figure 12C:
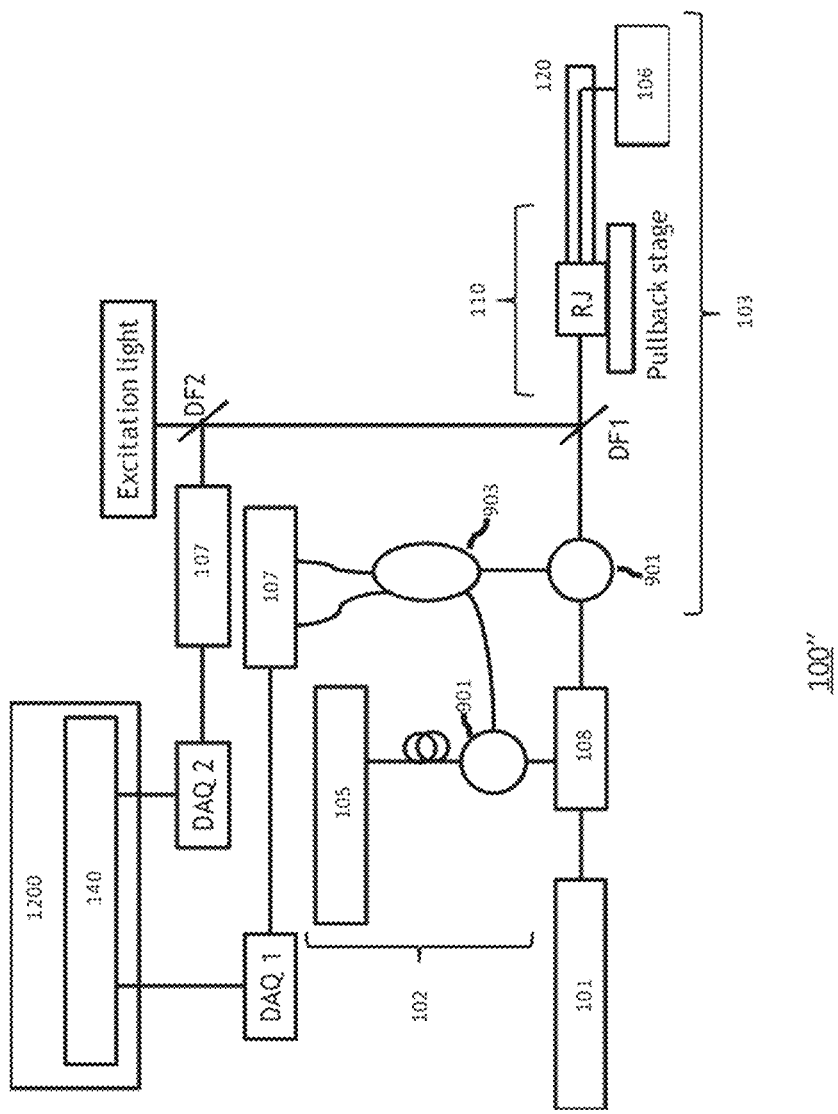
FIG. 12C shows at least a further embodiment of an OCT and NIRF/NIRAF apparatus or system for utilizing one or more imaging modalities for performing image and/or video synchronization and/or measuring or determining delay or angio delay in accordance with one or more aspects of the present disclosure.

FIG. 2 shows an embodiment of the catheter or probe 120 including a sheath 121, a coil 122, a protector 123, and an optical probe 124. As shown schematically in FIGS. 1A-2, the catheter 120 preferably is connected to the PIU 110 to spin the coil 122 with pullback (e.g., at least one embodiment of the PIU 110 operates to spin the coil 122 with pullback). The coil 122 delivers torque from a proximal end to a distal end thereof (e.g., via or by a rotational motor in the PIU 110). In one or more embodiments, the coil 122 is fixed with/to the optical probe 124 so that a distal tip of the optical probe 124 also spins to see an omnidirectional view of a biological organ, sample, target, or material being evaluated, such as, but not limited to, hollow organs, such as, but not limited to, vessels, a heart, a lung or lungs, etc. For example, fiber optic catheters and endoscopes may reside in the sample arm (such as the sample arm 103 as shown in FIGS. 12A-12C) of an OCT interferometer in order to provide access to internal organs (which may be displayed using one or more imaging modalities such as, but not limited to, intravascular images), gastro-intestinal tract, or any other narrow area, that are difficult to access. As the beam of light through the optical probe 124 inside of the catheter 120 or endoscope is rotated across the surface of interest, cross-sectional images of one or more targets, objects, or samples are obtained. In order to acquire three-dimensional data, the optical probe 124 is simultaneously translated longitudinally during the rotational spin resulting in a helical scanning pattern. This translation may be performed by pulling the tip of the probe 124 back towards the proximal end and therefore referred to as a pullback. In one or more embodiments, the catheter 140 (e.g., as shown in FIG. 8B) may have the same or similar structure as the catheter 120 as desired.

In one or more embodiments, the patient user interface 110 may comprise or include a connection component (or interface module), such as a rotary junction, to connect one or more components, such as one or more components of a probe (e.g., a catheter 120 (see e.g., FIGS. 1B-2, 12A-12C, etc.)), a needle, a capsule, a patient interface unit or component (e.g., the patient interface unit or component 110), etc., to one or more other components, such as, an optical component, a light source (e.g., the light source 101), a deflection section (e.g., such as a deflection or deflected section, which is a component that operates to deflect the light from the light source to the interference optical system (e.g., to the reference arm 102 and/or the sample arm 103), and then send light received from the interference optical system towards the at least one detector (see e.g., the one or more detectors 107); a deflection or deflected section that includes at least one of: one or more interferometers, a circulator, a beam splitter, an isolator, a coupler, a fusion fiber coupler, a partially severed mirror with holes therein, and a partially severed mirror with a tap; a splitter 104; a deflection or deflected section 108; etc.), the sample arm 102, a motor that operates to power the connection component and/or the patient user interface or patient interface unit 110, the motor M for the rotary device 70, the rotary device 70, etc. For example, when the connection member or interface module is a rotary junction, preferably the rotary junction operates as discussed below). In one or more other embodiments, the rotary junction may be at least one of: a contact rotary junction, a lenseless rotary junction, a lens-based rotary junction, or other rotary junction known to those skilled in the art. In one or more embodiments, the interferometer or the optical interference system may include one or more components of the system 100 (or any other system discussed herein) such as, but not limited to, one or more of the light source 101, the deflected section 108, the rotary junction RJ, a PIU 110, a catheter 120, etc. One or more features of the configurations of any of at least FIGS. 1A-15 (and/or any other configurations discussed herein) may be incorporated into one or more of the systems, including, but not limited to, the system 10, the apparatus or system 20, the system 100, 100', 100", any other system, etc. discussed herein.

In at least one embodiment, the PIU 110 may include a Fiber Optic Rotary Junction (FORJ), a rotational motor and translation motorized stage (e.g., a portion of the PIU 110), and a catheter connector or connectors (e.g., a portion of the PIU 110). The FORJ allows uninterrupted transmission of an optical signal or signals while rotating a fiber along the fiber axis. The FORJ may have a free space optical beam combiner including a rotor and stator.

Descriptions of like-numbered elements present in the system 100' and already described above, such as for the system 100, the system 2, the system 20, etc., shall not be repeated, and are incorporated by reference herein in their entireties.

In at least one embodiment, the console/processor/computer 1200, 1200' (or any other processor discussed herein) operates to control motions of a motor and translation motorized stage (hereinafter referred to as "motor" or "motor and stage"), acquires intensity data from the at least one detector(s) 107, and displays the scanned image (e.g., on a monitor or screen such as a display, screen or monitor 1209 as shown in the console 1200 of FIG. 14 and/or the console 1200' of FIG. 15 as further discussed below). In one or more embodiments, the console 1200, 1200' operates to change a speed of the motor and/or to stop the motor. In at least one embodiment, a console or computer 1200, 1200', any other computer or processor discussed herein, etc. further operates to control motions of the RJ via the motion control unit (MCU) 112 or a motor M. In one or more embodiments, the MCU 112 or the motor M operates to change a speed of a motor of the RJ and/or of the RJ. The motor may be a stepping or a DC servo motor to control the speed and increase position accuracy (e.g., compared to when not using a motor, compared to when not using an automated or controlled speed and/or position change device, compared to a manual control, etc.). In a case where the rotating device 70 having another motor M as discussed above is used in one or more embodiments, the console or computer 1200, 1200', any other computer or processor discussed herein, etc. further operate to control the motor M of the rotating device 70.

In one or more embodiments, the console or computer 1200, 1200' operates to control the system 100 (and other systems, such as, but not limited to, the system 10, the system 20, system 100', the system 100", any other apparatus or system discussed herein, etc. as discussed herein), the catheter 120 and/or one or more other above-described components of the system 100 (or any component or components of the other system or systems discussed herein). In at least one embodiment, the console or computer 1200, 1200' operates to acquire intensity data from the one or more detectors 107 of any system/device/apparatus discussed herein, and displays the image(s) (e.g., on a monitor or screen such as, but not limited to, a display, screen, or monitor 1209 as shown in the console 1200 of FIG. 14 and/or the console 1200' of FIG. 15 as further discussed below). The output of the one or more components of the system 100 (and other systems, such as, but not limited to, the system 10, the system 20, the system 100', the system 100", any other system, etc. as discussed herein) is acquired with the one or more detectors 107 of the system/device/apparatus, e.g., such as, but not limited to, photodiodes, Photomultiplier tube(s) (PMTs), line scan camera(s), or multi-array camera(s). Electrical analog signals obtained from the output of the system 100 (and/or other systems, such as, but not limited to, the system 10, the system 20 (or any subsystem or system thereof), the system 100', the system 100", any other system or apparatus, etc. as discussed herein) or one or more components thereof are converted to digital signals to be analyzed with a computer, such as, but not limited to, the computer 1200, 1200', 2, the image processor 50, any other processor discussed herein, etc. (e.g., as shown in at least FIGS. 1A-1B, 5A, 8B, 12A-12C, and 14-15). In one or more embodiments, the light source 101 may be a radiation source or a broadband light source that radiates in a broad band of wavelengths. In one or more embodiments, a Fourier analyzer including software and electronics may be used to convert the electrical analog signals into an optical spectrum. In some embodiments, the one or more detectors 107 comprise three detectors configured to detect three different bands of light. The output of an interferometer (e.g., an OCT interferometer, an interferometer of another imaging modality, etc.) may be detected with a first detector(s) 107, wherein the first detector(s) 107 may be photodiodes or multi-array cameras (or other type of detector discussed herein or known to those skilled in the art), and then may be recorded to a computer (e.g., to the computer 1200 as shown in FIGS. 1A-1B, 5A, 8B, 12A-12C, and 14, the computer 1200' as shown in FIG. 15, or any other computer or processor (e.g., the image processor 50 as shown in at least FIG. 1B) discussed herein).

Additionally or alternatively, the one or more detectors 107 may be a linear array, a charge-coupled device (CCD), a plurality of photodiodes or some other method of converting the light into an electrical signal. The one or more detectors 107 may transmit the digital or analog signals to a processor or a computer such as, but not limited to, an image processor, a processor or computer 1200, 1200' (see e.g., FIGS. 1A-1B, 5A, 8B, 12A-12C, and 14-15), any other processor or computer discussed herein, a combination thereof, etc. The image processor may be a dedicated image processor or a general purpose processor that is configured to process images. In at least one embodiment, the computer 1200, 1200', or any other processor or computer discussed herein may be used in place of, or in addition to, the image processor. In an alternative embodiment, the image processor may include an ADC and receive analog signals from the one or more detectors 107. The detector(s) 107 may include an analog to digital converter (ADC) in one or more embodiments. The image processor may include one or more of a CPU, DSP, FPGA, ASIC, or some other processing circuitry. The image processor may include memory for storing image, data, and instructions. The image processor may generate one or more images based on the information provided by the one or more detectors 107. A computer or processor discussed herein, such as, but not limited to, a processor of the devices, apparatuses or systems of FIGS. 1-15, the computer 1200, the computer 1200', the image processor, may also include one or more components further discussed herein (see e.g., FIGS. 14-15).

In one or more embodiments, one or more imaging techniques may be used, such as, but not limited to, various OCT imaging techniques, lumen edge detection, stent strut detection, and/or artifact detection techniques, and other techniques as discussed in at least U.S. Pat. App. No. 62/901,472, which is incorporated by reference herein in its entirety, and as discussed in U.S. patent application Ser. No. 16/990,800, filed on Aug. 11, 2020, which is incorporated by reference herein in its entirety. In one or more embodiments of the present disclosure, an OCT image is formed in a polar coordinate system from A-lines. Each A-line includes much information about the imaged object, such as, but not limited to: clear indications of artifacts from metal objects (e.g., stents, stent struts, guide wires, PIU reflection, catheter/probe reflection, noise artifacts, etc.) like narrow signal width and/or sharp rising and falling edges; significant difference in signal intensity and shape for unobstructed soft tissue compared to the sheath reflection and other artifacts like wide signal width and a gentle falling edge. Each A-line may represent a cross-sectional 1D sampling of a target, sample, object, etc., such as, but not limited to, a vessel, along a certain view angle. As an imaging probe or device rotates (e.g., rotates about 0 to about 360 degrees, about 180 degrees to about 360 degrees, about 360 degrees, etc.), the corresponding A-lines form the complete two-dimensional (2D) cross-section of the target, sample, object, etc. (e.g., the vessel) in polar coordinates, which is then converted into Cartesian coordinates to form the tomographical-view (tomo-view) image of the cross-section of the target, sample, object, etc. (e.g., the vessel).

In accordance with at least one aspect of the present disclosure and as aforementioned, one or more additional methods for lumen, stent, and/or artifacts detection of OCT images may be used with one or more embodiments of device(s), system(s), method(s), and/or storage medium(s) discussed herein, including, but not limited to, technique(s) as discussed in U.S. patent application Ser. No. 16/414,222, filed on May 16, 2019, the entire disclosure of which is incorporated by reference herein in its entirety, and in U.S. Pat. Pub. No. 2019/0374109, which was published on Dec. 12, 2019, the disclosure of which is incorporated by reference herein in its entirety.

Regardless of the approach, a predetermined or determined threshold may be used to detect the most significant pulse that may be corresponding to the lumen edge (in one or more embodiments, the most significant pulse denotes the maximum peak and its associated front edge also named as "major peak/edge"; such data may contain or include artifact edge pixels) in a specific A-line in one or more embodiments. Any pulse above the threshold is an edge pulse of an object candidate. The largest pulse among all the candidates in terms of area under the pulse is considered to be the maximum peak (also referred to herein as the "most significant pulse", or the "major peak/edge", etc.).

One or more embodiments of the present disclosure may be used with one or more devices, systems, methods, and/or storage mediums for performing engagement and/or disengagement status determination and/or engagement and/or disengagement guidance techniques, such as, but not limited to, as discussed in U.S. Pat. Pub. No. 2022/0042783 A1, published on Feb. 10, 2022, the disclosure of which is incorporated by reference herein in its entirety.

By way of at least one embodiment example, the values (e.g., of the angio delay (or the delay time), the peak value, the middle or center value, or any other values being stored for use of the apparatus or system, etc.) may be stored in a memory (e.g., a non-volatile memory or any other type of memory discussed herein) in the apparatus or system (e.g., in the patient interface unit PIU 110, or in any other component or location of the apparatus or system, etc.). In another example, the values may be stored in a solid state drive (SSD), in a storage drive (e.g., such as, but not limited to, a hard drive (HD), a hybrid hard drive (HHD), a solid state hybrid drive (SSHD), etc.), any other storage device discussed herein, or any other type of storage device known to those skilled in the art, such as those discussed further below.

In one or more embodiments, any missing portion of a lumen edge may be interpolated to fill in missing data as discussed in U.S. Pat. App. No. 62/944,064, filed on Dec. 5, 2019, the disclosure of which is incorporated by reference herein in its entirety, and as discussed in U.S. patent application Ser. No. 17/098,042, filed on Nov. 13, 2020, the disclosure of which is incorporated by reference herein in its entirety. For example, for each confirmed stent location, any gap between or in the lumen edge may be filled using linear interpolation. Both lumen peak and edge information are kept and interpolated in one or more embodiments. After the process, the whole lumen circle may be processed and may form a closed circle-like curve for the lumen edge.

In one or more embodiments of embedded stent detection as discussed in U.S. Pat. App. No. 62/944,064, filed on Dec. 5, 2019, the disclosure of which is incorporated by reference herein in its entirety, and as discussed in U.S. patent application Ser. No. 17/098,042, filed on Nov. 13, 2020, the disclosure of which is incorporated by reference herein in its entirety, the peak curve may be similar and may be used to calculate a shadow accumulation profile or a shadow profile for the whole image. In one or more embodiments, finding an embedded stent and/or stent strut center may be based on the lumen peak curve or may be based on any other method or technique as discussed in U.S. Pat. App. No. 62/944,064, filed on Dec. 5, 2019, the disclosure of which is incorporated by reference herein in its entirety, and as discussed in U.S. patent application Ser. No. 17/098,042, filed on Nov. 13, 2020, the disclosure of which is incorporated by reference herein in its entirety. For example, in one or more embodiments of embedded stent detection, a stent peak and/or edge behind the lumen edge may be found, a peak width and/or thickness may be calculated, the stent region may be merged and extended, an embedded stent(s) may be confirmed and extracted, and strust location information may be determined/identified, etc. Following the above discussed steps, for example, to identify and confirm the stent struts, valid embedded stents may be extracted and confirmed, with its location information (such as, but not limited to, strut center location) identified as well.

In one or more embodiments, the lumen edge may be output and/or the stent strut center location (and/or other stent strut location information) may be output as discussed, for example, in U.S. Pat. App. No. 62/944,064, filed on Dec. 5, 2019, the disclosure of which is incorporated by reference herein in its entirety, and in U.S. patent application Ser. No. 17/098,042, filed on Nov. 13, 2020, the disclosure of which is incorporated by reference herein in its entirety. A 1D smoothing filter may be applied to or used on the lumen edge results. The lumen edge and/or stent strut center location information (and/or other stent strut location information) may be output to a desired format, may be stored in a memory, may be printed, may be displayed on a display, etc.

As discussed in U.S. Pat. App. No. 62/944,064, filed on Dec. 5, 2019, the disclosure of which is incorporated by reference herein in its entirety, and as discussed in U.S. patent application Ser. No. 17/098,042, filed on Nov. 13, 2020, the disclosure of which is incorporated by reference herein in its entirety, the OCT image in polar coordinates (e.g., of a vessel or other object or target) may be displayed vertically (rather than, or in addition to, horizontally), and/or may be displayed with a corresponding OCT image in Cartesian Coordinates using at least one apparatus or system and/or angio delay and/or synchronization techniques in accordance with one or more aspects of the present disclosure.

In one or more method embodiments, a lumen edge may be converted into Cartesian coordinates as discussed in U.S. patent application Ser. No. 16/414,222, filed on May 16, 2019, the entire disclosure of which is incorporated by reference herein in its entirety, and in U.S. Pat. Pub. No. 2019/0374109, which was published on Dec. 12, 2019, the disclosure of which is incorporated by reference herein in its entirety.

A computer, such as the console or computer 1200, 1200', the image processor 50, the console or computer 2, any other processor or computer discussed herein, etc., may perform any of the steps, processes, and/or techniques discussed herein for any apparatus and/or system being manufactured or used, including, but not limited to, the apparatus or system 10, the apparatus or system 20, the apparatus or system 100, the apparatus or system 100', the apparatus or system 100", any other apparatus or system discussed herein, etc.

In accordance with one or more further aspects of the present disclosure, bench top systems may be utilized with one or more imaging modalities (such as, but not limited to, angiography, Optical Coherence Tomography (OCT), Multi-modality OCT (MM-OCT), near-infrared auto-fluorescence (NIRAF), near-infrared fluorescence (NIRF), OCT-NIRAF, OCT-NIRF, etc.) for the techniques, such as, but not limited to, the imaging techniques, the angio delay (or time delay) determination techniques, and/or the synchronization techniques disclosed herein.

FIG. 12A shows an OCT system 100 (as referred to herein as "system 100" or "the system 100") which may be used for one or more imaging modalities, and may be used with the angio delay (or delay time) determination and/or synchronization features, in accordance with one or more aspects of the present disclosure. The system 100 comprises a light source 101, a reference arm 102, a sample arm 103, a deflected or deflecting section 108, a reference mirror (also referred to as a "reference reflection", "reference reflector", "partially reflecting mirror" and a "partial reflector") 105, and one or more detectors 107 (which may be connected to a computer 1200 or any other computer or processor discussed herein). In one or more embodiments, the system 100 may include a patient interface device or unit ("PIU") 110 and a catheter 120 (see e.g., embodiment examples of a PIU and a catheter as shown in FIG. 1B, FIG. 2, FIG. 5A, and/or FIGS. 12A-12C), and the system 100 may interact with an object 106, a patient (e.g., a blood vessel of a patient) 106, etc. (e.g., via the catheter 120 and/or the PIU 110). In one or more embodiments, the system 100 includes an interferometer or an interferometer is defined by one or more components of the system 100, such as, but not limited to, at least the light source 101, the reference arm 102, the sample arm 103, the deflecting section 108, and the reference mirror 105.

In accordance with one or more further aspects of the present disclosure, bench top systems may be utilized with one or more imaging modalities, and may be used with the angio delay (or delay time) determination and/or synchronization features, as disclosed herein. FIG. 12B shows an example of a system that can utilize the one or more imaging modalities and related methods discussed herein for a benchtop such as for ophthalmic applications. A light from a light source 101 delivers and splits into a reference arm 102 and a sample arm 103 with a deflecting section 108. A reference beam goes through a length adjustment section 904 and is reflected from a reference mirror (such as or similar to the reference mirror or reference reflection 105 shown in FIG. 12A) in the reference arm 102 while a sample beam is reflected or scattered from an object, a patient (e.g., blood vessel of a patient), etc. 106 in the sample arm 103 (e.g., via the PIU 110 and the catheter 120). In one embodiment, both beams combine at the deflecting section 108 and generate interference patterns. In one or more embodiments, the beams go to the combiner 903, and the combiner 903 combines both beams via the circulator 901 and the deflecting section 108, and the combined beams are delivered to one or more detectors (such as the one or more detectors 107). The output of the interferometer is continuously acquired with one or more detectors, such as the one or more detectors 107. The electrical analog signals are converted to the digital signals to analyze them with a computer, such as, but not limited to, the computer 1200 (see FIGS. 12A-12C; also shown in FIG. 14 discussed further below), the computer 1200' (see e.g., FIG. 15 discussed further below), the computer 2 (see FIG. 1A), the image processor 50 (see FIG. 1B), any other computer or processor discussed herein, etc. Additionally or alternatively, one or more of the computers, CPUs, processors, etc. discussed herein may be used to process, control, update, emphasize, and/or change one or more of imaging modalities, and/or process the related techniques, functions or methods, or may process the electrical signals as discussed above.

The electrical analog signals may be converted to the digital signals to be analyzed by or with a computer, such as, but not limited to, the computer 1200 (see FIGS. 1B and 12A-12C; also shown in FIG. 14 discussed further below), the computer 1200' (see e.g., FIG. 15 discussed further below), the computer 2 (see FIG. 1A), the image processor 50 (see FIG. 1B), any other processor or computer discussed herein, etc. Additionally or alternatively, one or more of the computers, CPUs, processors, etc. discussed herein may be used to process, control, update, emphasize, and/or change one or more imaging modalities, and/or process the related techniques, functions or methods, or may process the electrical signals as discussed above. In one or more embodiments (see e.g., FIG. 12B), the sample arm 103 includes the PIU 110 and the catheter 120 so that the sample beam is reflected or scattered from the object, patient (e.g., blood vessel of a patient), etc. 106 as discussed herein. In one or more embodiments, the PIU 110 may include one or more motors to control the pullback operation of the catheter 120 (or one or more components thereof) and/or to control the rotation or spin of the catheter 120 (or one or more components thereof) (see e.g., the motor M of FIG. 1B). For example, as best seen in FIG. 12B, the PIU 110 may include a pullback motor (PM) and a spin motor (SM), and/or may include a motion control unit 112 that operates to perform the pullback and/or rotation features using the pullback motor PM and/or the spin motor SM. As discussed herein, the PIU 110 may include a rotary junction (e.g., rotary junction RJ as shown in FIGS. 12B and 12C). The rotary junction RJ may be connected to the spin motor SM so that the catheter 120 may obtain one or more views or images of the object, patient (e.g., blood vessel of a patient), etc. 106. The computer 1200 (or the computer 1200', the computer 2, the image processor 50, any other computer or processor discussed herein, etc.) may be used to control one or more of the pullback motor PM, the spin motor SM and/or the motion control unit 112 (and/or the one or more processors discussed herein may control the motor M for the rotary device 70 as aforementioned). An OCT system may include one or more of a computer (e.g., the computer 1200, the computer 1200', the computer 2, the image processor 50, any other computer or processor discussed herein, etc.), the PIU 110, the catheter 120, a monitor (such as the display 1209), etc. One or more embodiments of an imaging (OCT, IVUS, MM-OCT, intravascular, any imaging modality or modalities discussed herein or known to those skilled in the art, etc.) apparatus or system may interact with one or more external systems, such as, but not limited to, an angio system, external displays, one or more hospital networks, external storage media, a power supply, a bedside controller (e.g., which may be connected to the OCT system using Bluetooth technology or other methods known for wireless communication), one or more ORs, etc.

In one or more embodiments including the deflecting or deflected section 108 (best seen in FIGS. 12A-12C), the deflected section 108 may operate to deflect the light from the light source 101 to the reference arm 102 and/or the sample arm 103, and then send light received from the reference arm 102 and/or the sample arm 103 towards the at least one detector 107 (e.g., a spectrometer, one or more components of the spectrometer, another type of detector, etc.). In one or more embodiments, the deflected section (e.g., the deflected section 108 of the system 100, 100', 100", any other system discussed herein, etc.) may include or may comprise one or more interferometers or optical interference systems that operate as described herein, including, but not limited to, a circulator, a beam splitter, an isolator, a coupler (e.g., fusion fiber coupler), a partially severed mirror with holes therein, a partially severed mirror with a tap, etc. In one or more embodiments, the interferometer or the optical interference system may include one or more components of the system 100 (or any other system discussed herein) such as, but not limited to, one or more of the light source 101, the deflected section 108, the rotary junction RJ, a PIU 110, a catheter 120, etc. One or more features (or any combination of such features) of the configurations of at least FIGS. 1A-15 discussed herein may be incorporated into one or more of the systems, including, but not limited to, the system 10, 20, 100, 100', 100", discussed herein.

In accordance with one or more further aspects of the present disclosure, one or more other systems may be utilized with one or more of the one or more imaging modalities and related method(s), and may be used with the angio delay (or delay time) determination and/or synchronization features, as disclosed herein. FIG. 12C shows an example of a system 100" that may utilize the one or more imaging modalities and/or related technique(s) or method(s), and may be used with the angio delay (or delay time) determination and/or synchronization features, such as for ophthalmic applications. FIG. 12C shows an exemplary schematic of an OCT-fluorescence imaging system 100", according to one or more embodiments of the present disclosure. An OCT light source 101 (e.g., with a 1.3 µm) is delivered and split into a reference arm 102 and a sample arm 103 with a deflector or deflected section (e.g., a splitter) 108, creating a reference beam and sample beam, respectively. The reference beam from the OCT light source 101 is reflected by a reference mirror 105 while a sample beam is reflected or scattered from an object (e.g., an object to be examined, an object, a patient, etc.) 106 through a circulator 901, a rotary junction ("RJ") and a catheter 120. In one or more embodiments, the fiber between the circulator 901 and the reference mirror or reference reflection 105 may be coiled to adjust the length of the reference arm 102 (best seen in FIG. 12C). Optical fibers in the sample arm 103 may be made of double clad fiber ("DCF"). Excitation light for the fluorescence may be directed to the RJ and the catheter 120, and illuminate the object (e.g., an object to be examined, an object, a patient, etc.) 106. The light from the OCT light source 101 may be delivered through the core of DCF while the fluorescence light emitted from the object (e.g., an object to be examined, an object, a patient, etc.) 106 may be collected through the cladding of the DCF. For pullback imaging, the RJ may be moved with a linear stage to achieve helical scanning of the object (e.g., an object to be examined, an object, a patient, etc.) 106. In one or more embodiments, the RJ may include any one or more features of a rotary joint as discussed herein. Dichroic filters DF1, DF2 may be used to separate excitation light and the rest of fluorescence and OCT lights. For example (and while not limited to this example), in one or more embodiments, DF1 may be a long pass dichroic filter with a cutoff wavelength of ~1000 nm, and the OCT light, which may be longer than a cutoff wavelength of DF1, may go through the DF1 while fluorescence excitation and emission, which are a shorter wavelength than the cut off, reflect at DF1. In one or more embodiments, for example (and while not limited to this example), DF2 may be a short pass dichroic filter; the excitation wavelength may be shorter than fluorescence emission light such that the excitation light, which has a wavelength shorter than a cutoff wavelength of DF2, may pass through the DF2, and the fluorescence emission light reflect with DF2. In one embodiment, both beams combine at the deflecting section 108 and generate interference patterns. In one or more embodiments, the beams go to the coupler or combiner 903, and the coupler or combiner 903 combines both beams via the circulator 901 and the deflecting section 108, and the combined beams are delivered to one or more detectors (such as the one or more detectors 107; see e.g., the first detector 107 connected to the coupler or combiner 903 in FIG. 12C).

In one or more embodiments, the optical fiber in the catheter 120 operates to rotate inside the catheter 120, and the OCT light and excitation light may be emitted from a side angle of a tip of the catheter 120. After interacting with the object or patient 106, the OCT light may be delivered back to an OCT interferometer (e.g., via the circulator 901 of the sample arm 103), which may include the coupler or combiner 903, and combined with the reference beam (e.g., via the coupler or combiner 903) to generate interference patterns. The output of the interferometer is detected with a first detector 107, wherein the first detector 107 may be made of or include photodiodes or multi-array cameras, and then may be recorded to a computer (e.g., to the computer 2, the computer 1200 as shown in FIG. 12C, the computer 1200', or any other computer discussed herein) through a first data-acquisition unit or board ("DAQ1").

Simultaneously or at a different time, the fluorescence intensity may be recorded through a second detector 107 (e.g., a photomultiplier) through a second data-acquisition unit or board ("DAQ2"). The OCT signal and fluorescence signal may be then processed by the computer (e.g., to the computer 2, the computer 1200 as shown in FIG. 12C, the computer 1200', or any other computer discussed herein) to generate an OCT-fluorescence dataset 140, which includes or is made of multiple frames of helically scanned data. Each set of frames includes or is made of multiple data elements of co-registered OCT and fluorescence data, which correspond to the rotational angle and pullback position.

Detected fluorescence or auto-fluorescence signals may be processed or further processed as discussed in U.S. Pat. App. No. 62/861,888, filed on Jun. 14, 2019, the disclosure of which is incorporated herein by reference in its entirety, and/or as discussed in U.S. patent application Ser. No. 16/368,510, filed Mar. 28, 2019, and published as U.S. Pat. Pub. No. 2019/0298174 on Oct. 3, 2019, the disclosure of which is incorporated herein by reference herein in its entirety.

While not limited to such arrangements, configurations, devices or systems, one or more embodiments of the devices, apparatuses, systems, methods, storage mediums, GUI's, etc. discussed herein may be used with an apparatus or system as aforementioned, such as, but not limited to, for example, the system 100, the system 100', the system 100", the devices, apparatuses, or systems of FIGS. 1A-15, any other device, apparatus or system discussed herein, etc. In one or more embodiments, one user may perform the method(s) discussed herein. In one or more embodiments, one or more users may perform the method(s) discussed herein. In one or more embodiments, one or more of the computers, CPUs, processors, etc. discussed herein may be used to process, control, update, emphasize, and/or change one or more of the imaging modalities, and/or process the related techniques, functions or methods, or may process the electrical signals as discussed above.

There are many ways to compute rotation, intensity, or any other measurement discussed herein, and/or to control and/or manufacture a device/apparatus, system and/or storage medium, digital as well as analog. In at least one embodiment, a computer, such as the console or computer 1200, 1200' (or any other processor or computer discussed herein), may be dedicated to control and/or use devices, systems, methods and/or storage mediums for use therewith described herein. In one or more embodiments, the device/apparatus, system, method, and/or storage medium may be for MM-OCT or OCT (or any other imaging modality discussed herein or known to those skilled in the art).

Unless otherwise discussed herein, like numerals indicate like elements. For example, while variations or differences exist between the systems/apparatuses, such as, but not limited to, the system 10, the system 20, the system 100, the system 100', the system 100", any other systems/apparatuses discussed herein, etc., one or more features thereof may be the same or similar to each other, such as, but not limited to, the light source 101, the deflecting section 108 or other component(s) thereof (e.g., the console/computer/processor 1200, the console/computer/processor 1200', etc.). Those skilled in the art will appreciate that the light source 101, the at least one detector 107 and/or one or more other elements of the system 100, may operate in the same or similar fashion to those like-numbered elements of one or more other systems, such as, but not limited to, the system 10, the system 20, the system 100', the system 100", any other apparatus or system, etc. as discussed herein. Those skilled in the art will appreciate that alternative embodiments of the system 10, the system 20, the system 100, the system 100', the system 100", any other apparatus or system discussed herein, and/or one or more like-numbered elements of one of such systems, while having other variations as discussed herein, may operate in the same or similar fashion to the like-numbered elements of any of the other systems (or component(s) thereof) discussed herein. Indeed, while certain differences exist between the system 10, the system 20, the system 100, the system 100', the system 100", etc. as discussed herein, there are similarities between the apparatuses/systems discussed herein. Likewise, while the console or computer 1200 may be used in one or more systems (e.g., the system 20, the system 100, the system 100', the system 100", any other apparatuses/systems discussed herein, etc.), one or more other consoles or computers, such as the console or computer 1200', the console or computer 2, the image processor 50, or any other processor or computer discussed herein, may be used additionally or alternatively.

Figure 13:
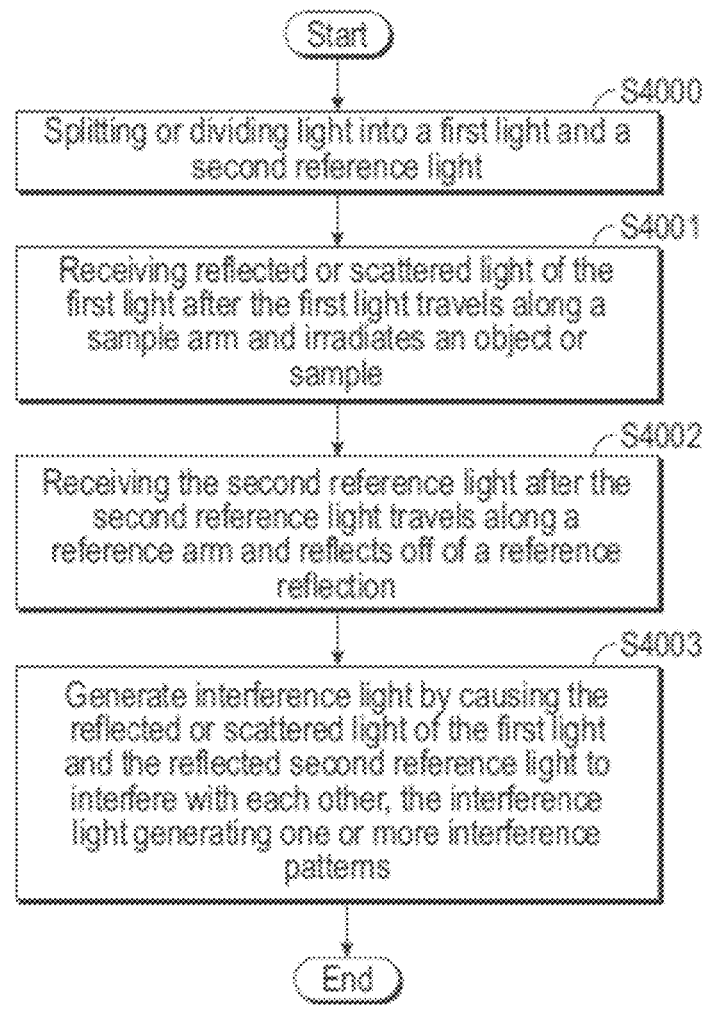
FIG. 13 is a flow diagram showing a method of performing an imaging feature, function, or technique in accordance with one or more aspects of the present disclosure.

In accordance with one or more aspects of the present disclosure, one or more methods for detecting and guiding optical connections are provided herein, and one or more methods for performing imaging are provided herein. FIG. 13 illustrates a flow chart of at least one embodiment of a method for performing imaging. Preferably, the method(s) may include one or more of the following: (i) splitting or dividing light into a first light and a second reference light (see step S4000 in FIG. 13); (ii) receiving reflected or scattered light of the first light after the first light travels along a sample arm and irradiates an object or a sample (see step S4001 in FIG. 13); (iii) receiving the second reference light after the second reference light travels along a reference arm and reflects off of a reference reflection (see step S4002 in FIG. 13); and (iv) generating interference light by causing the reflected or scattered light of the first light and the reflected second reference light to interfere with each other (for example, by combining or recombining and then interfering, by interfering, etc.), the interference light generating one or more interference patterns (see step S4003 in FIG. 13). One or more methods may further include using low frequency monitors to update or control high frequency content to improve image quality. For example, one or more embodiments may use balanced detection, polarization diversity, automated polarization control, etc. to achieve improved image quality. In one or more embodiments, an imaging probe may be connected to one or more systems (e.g., the system 10, the system 20, the system 100, the system 100', the system 100", the rotating device 70, any other system or apparatus discussed herein, etc.) with a connection member or interface module. For example, when the connection member or interface module is a rotary junction (or rotary joint) for an imaging probe, the rotary junction may be at least one of: a contact rotary junction, a lenseless rotary junction, a lens-based rotary junction, or other rotary junction known to those skilled in the art. The rotary junction may be a one channel rotary junction or a two channel rotary junction. In one or more embodiments, the illumination portion of the imaging probe may be separate from the detection portion of the imaging probe. For example, in one or more applications, a probe may refer to the illumination assembly, which includes an illumination fiber (e.g., single mode fiber, a GRIN lens, a spacer and the grating on the polished surface of the spacer, etc.). In one or more embodiments, a scope may refer to the illumination portion which, for example, may be enclosed and protected by a drive cable, a sheath, and detection fibers (e.g., multimode fibers (MMFs)) around the sheath. Grating coverage is optional on the detection fibers (e.g., MMFs) for one or more applications. The illumination portion may be connected to a rotary joint and may be rotating continuously at video rate. In one or more embodiments, the detection portion may include one or more of: a detection fiber, a detector (e.g., the one or more detectors 107, a spectrometer, etc.), the computer 1200, the computer 1200', any other processor discussed herein, etc. The detection fibers may surround the illumination fiber, and the detection fibers may or may not be covered by a grating, a spacer, a lens, an end of a probe or catheter, etc.

There are many ways to compute power and/or perform one or more of the techniques, such as, but not limited to, the angio delay (or delay time) determination and/or synchronization features or techniques, discussed herein, digital as well as analog. In at least one embodiment, a computer, such as the console or computer 1200, 1200', may be dedicated to the control and the monitoring of the imaging (e.g., intravascular, OCT, MM-OCT, other imaging modality or modalities discussed herein or known to those skilled in the art, etc.) devices, systems, methods, and/or storage mediums described herein.

The electric signals used for imaging may be sent to one or more processors, such as, but not limited to, a computer 1200 (see e.g., FIGS. 1B, 5A, 8B, 12A-12C, and 14), a computer 1200' (see e.g., FIG. 15), a computer 2 (see e.g., FIG. 1A), the image processor 50 (see e.g., FIG. 1B), etc. as discussed further below, via cable(s) or wire(s), such as, but not limited to, the cable(s) or wire(s) 113 (see FIG. 14). The computer or processor 1200, 1200' may be used instead of any other computer or processor discussed herein (e.g., the processor 1200 may be used instead of the processor 1200', the processor 1200' may be used instead of the processor 2, the processors 1200 and 1200' may be used together, any processor discussed herein may be used alone or with any other processor discussed herein, etc.). The processor 2, the image processor 50, or any other processor discussed herein may have the same or similar structure to the processor 1200 as shown in FIG. 14 or the processor 1200' as shown in FIG. 15. In other words, the computers or processors discussed herein are interchangeable, and may operate to perform any of the one or more imaging modalities feature(s) and method(s) or any of the other techniques or methods, such as, but not limited to, the angio delay (or delay time) determination and/or synchronization features or techniques, discussed herein. The communication interface of the computer 1200 may connect to other components discussed herein via line 113 (as diagrammatically shown in FIG. 12).

Figure 14:
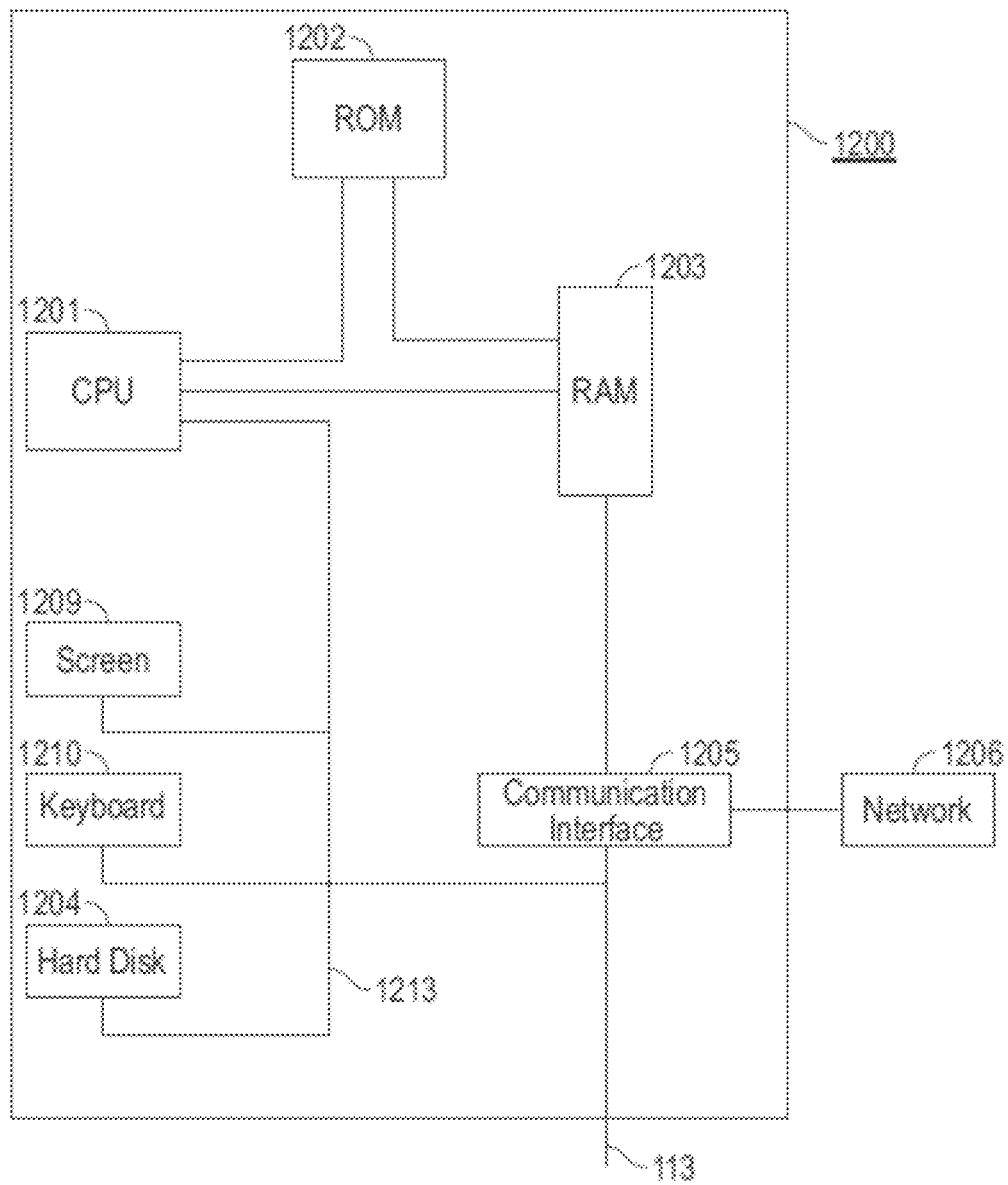
FIG. 14 shows a schematic diagram of an embodiment of a computer that may be used with one or more embodiments of an apparatus or system or one or more methods discussed herein in accordance with one or more aspects of the present disclosure.

Various components of a computer system 1200 (see e.g., the console or computer 1200 as shown in FIGS. 1B, 5A, 8B, and 12A-12C) are provided in FIG. 14. A computer system 1200 may include a central processing unit ("CPU") 1201, a ROM 1202, a RAM 1203, a communication interface 1205, a hard disk (and/or other storage device) 1204, a screen (or monitor interface) 1209, a keyboard (or input interface; may also include a mouse or other input device in addition to the keyboard) 1210 and a BUS or other connection lines (e.g., connection line 1213) between one or more of the aforementioned components (e.g., as shown in FIG. 14). In addition, the computer system 1200 may comprise one or more of the aforementioned components. For example, a computer system 1200 may include a CPU 1201, a RAM 1203, an input/output (I/O) interface (such as the communication interface 1205) and a bus (which may include one or more lines 1213 as a communication system between components of the computer system 1200; in one or more embodiments, the computer system 1200 and at least the CPU 1201 thereof may communicate with the one or more aforementioned components of a FORJ or a device or system using same, such as, but not limited to, the system 100, the system 100', the system 100", and/or any other apparatus or system, discussed herein above, via one or more lines 1213), and one or more other computers or processors 1200 may include one or more combinations of the other aforementioned components. The CPU 1201 is configured to read and perform computer-executable instructions stored in a storage medium. The computer-executable instructions may include those for the performance of the methods and/or calculations described herein. The computer system 1200 may include one or more additional processors in addition to CPU 1201, and such processors, including the CPU 1201, may be used for controlling and/or manufacturing a device, system, or storage medium for use with same or for use with any imaging technique(s) and/or angio delay (or delay time) determination and/or synchronization feature(s) or technique(s) discussed herein. The system 1200 may further include one or more processors connected via a network connection (e.g., via network 1206). The CPU 1201 and any additional processor being used by the system 1200 may be located in the same telecom network or in different telecom networks (e.g., performing, manufacturing, controlling, and/or using technique(s) may be controlled remotely).

Figure 15:
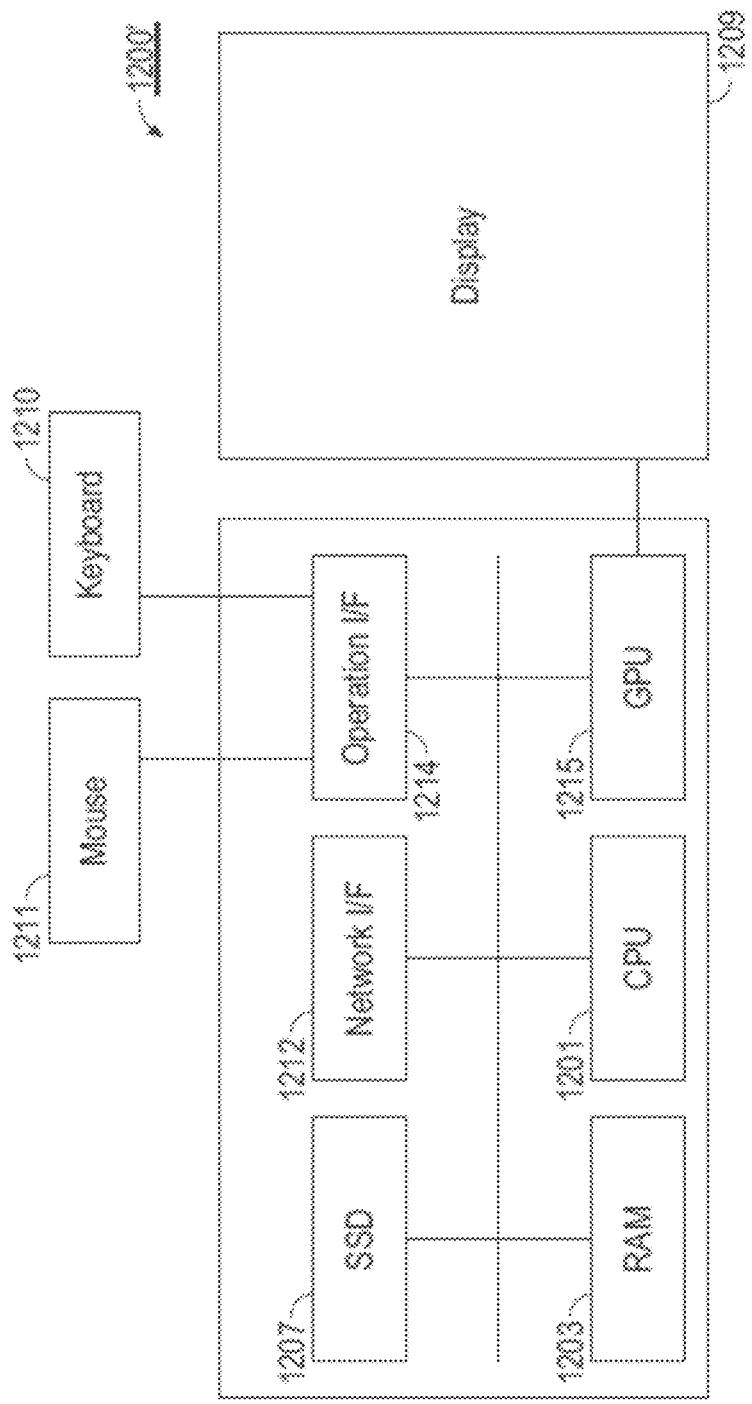
FIG. 15 shows a schematic diagram of another embodiment of a computer that may be used with one or more embodiments of an imaging apparatus or system or methods discussed herein in accordance with one or more aspects of the present disclosure.

The I/O or communication interface 1205 provides communication interfaces to input and output devices, which may include the light source 101, a RJ, a PM, an SM, unit 150, unit 112, the rotating device 70, a microphone, a communication cable and a network (either wired or wireless), a keyboard 1210, a mouse (see e.g., the mouse 1211 as shown in FIG. 15), a touch screen or screen 1209, a light pen, and so on. The Monitor interface or screen 1209 provides communication interfaces thereto.

Any methods and/or data of the present disclosure, such as the methods for using and/or manufacturing a device, system, or storage medium for use with same and/or method(s) for imaging, and/or for angio delay (or delay time) determination and/or synchronization feature(s) or technique(s) as discussed herein, may be stored on a computer-readable storage medium. A computer-readable and/or writable storage medium used commonly, such as, but not limited to, one or more of a hard disk (e.g., the hard disk 1204, a magnetic disk, etc.), a flash memory, a CD, an optical disc (e.g., a compact disc ("CD") a digital versatile disc ("DVD"), a Blu-Ray™ disc, etc.), a magneto-optical disk, a random-access memory ("RAM") (such as the RAM 1203), a DRAM, a read only memory ("ROM"), a storage of distributed computing systems, a memory card, or the like (e.g., other semiconductor memory, such as, but not limited to, a non-volatile memory card, a solid state drive (SSD) (see SSD 1207 in FIG. 15), SRAM, etc.), an optional combination thereof, a server/database, etc. may be used to cause a processor, such as, the processor or CPU 1201 of the aforementioned computer system 1200 to perform the steps of the one or more methods disclosed herein. The computer-readable storage medium may be a non-transitory computer-readable medium, and/or the computer-readable medium may comprise all computer-readable media, with the sole exception being a transitory, propagating signal. The computer-readable storage medium may include media that store information for predetermined, limited, or short period(s) of time and/or only in the presence of power, such as, but not limited to Random Access Memory (RAM), register memory, processor cache(s), etc. Embodiment(s) of the present disclosure may also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

In accordance with at least one aspect of the present disclosure, the methods, devices, systems, and computer-readable storage mediums related to the processors, such as, but not limited to, the processor or computer 2, the processor of the aforementioned computer 1200, the processor of computer 1200', image processor 50, any other processor discussed herein, etc., as described above may be achieved utilizing suitable hardware, such as that illustrated in the figures. Functionality of one or more aspects of the present disclosure may be achieved utilizing suitable hardware, such as that illustrated in FIG. 14. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. The CPU 1201 (as shown in FIG. 14 or FIG. 15) may also include and/or be made of one or more microprocessors, nanoprocessors, one or more graphics processing units ("GPUs"; also called a visual processing unit ("VPU")), one or more Field Programmable Gate Arrays ("FPGAs"), or other types of processing components (e.g., application specific integrated circuit(s) (ASIC)). Still further, the various aspects of the present disclosure may be implemented by way of software and/or firmware program(s) that may be stored on suitable storage medium (e.g., computer-readable storage medium, hard drive, solid state drive, hybrid hard drive, etc.) or media (such as floppy disk(s), memory chip(s), etc.) for transportability and/or distribution. The computer may include a network of separate computers or separate processors to read out and execute the computer executable instructions. The computer executable instructions may be provided to the computer, for example, from a network or the storage medium. The computers or processors (e.g., 2, 1200, 1200', 50, any other computers or processors discussed herein, etc.) may include the aforementioned CPU structure, or may be connected to such CPU structure for communication therewith.

As aforementioned, hardware structure of an alternative embodiment of a computer or console 1200' is shown in FIG. 15. The computer 1200' includes a central processing unit (CPU) 1201, a graphical processing unit (GPU) 1215, a random access memory (RAM) 1203, a network interface device 1212, an operation interface 1214 such as a universal serial bus (USB) and a memory such as a hard disk drive or a solid-state drive (SSD) 1207. Preferably, the computer or console 1200' includes a display 1209. The computer 1200' may connect with a rotary junction (e.g., RJ of FIG. 12B, RJ of FIG. 12C, etc.), the motor PM, the motor SM, and/or one or more other components of a system (e.g., the system 10, the system 20, the system 100, the system 100', the system 100", any other system/apparatus discussed herein, etc.) via the operation interface 1214 or the network interface 1212. A computer, such as the computer 1200, 1200', may include the RJ, the PM, and/or the SM in one or more embodiments. The computer 1200' may connect with a motor, a console, or any other component of the device(s) or system(s) discussed herein via the operation interface 1214 or the network interface 1212 (e.g., via a cable or fiber, such as the cable or fiber 113 as similarly shown in FIG. 14). A computer, such as the computer 1200', may include a motor or motion control unit (MCU) in one or more embodiments. The operation interface 1214 is connected with an operation unit such as a mouse device 1211, a keyboard 1210 or a touch panel device. The computer 1200' may include two or more of each component. Alternatively, the CPU 1201 or the GPU 1215 may be replaced by the field-programmable gate array (FPGA), the application-specific integrated circuit (ASIC) or other processing unit depending on the design of a computer, such as the computer 1200, the computer 1200', any other computer or processor discussed herein, etc.

A computer program is stored in the SSD 1207, and the CPU 1201 loads the program onto the RAM 1203, and executes the instructions in the program to perform one or more processes described herein, as well as the basic input, output, calculation, memory writing and memory reading processes.

The computer, such as the computer 1200, 1200', communicates with the PIU 110, the rotary junction (e.g., the RJ, etc.), the motor PM, the motor SM, the catheter 120 and/or one or more other components of a system, such as the system 10, 20, 100, 100', 100", etc., to perform imaging, and reconstructs an image from the acquired intensity data. The monitor or display 1209 displays the reconstructed image, and may display other information about the imaging condition or about an object to be imaged. The monitor 1209 also provides a graphical user interface for a user to operate an apparatus or system (e.g., the system 10, the system 20, the system 100, the system 100', the system 100", any other apparatus or system discussed herein, etc.), for example when performing OCT or other imaging technique, including, but not limited to, angio delay (or delay time) determination and/or synchronization feature(s) or technique(s), etc. An operation signal is input from the operation unit (e.g., such as, but not limited to, a mouse device 1211, a keyboard 1210, a touch panel device, etc.) into the operation interface 1214 in the computer 1200', and corresponding to the operation signal the computer 1200' instructs the apparatus or system (e.g., the system 10, the system 20, the system 100, the system 100', the system 100", any other apparatus or system discussed herein, etc.) to set or change the imaging condition, and to start or end the imaging, and/or to start or end the angio delay (or delay time) determination and/or synchronization feature(s) or technique(s). The laser source 101 of an OCT system as aforementioned may have interfaces to communicate with the computers 1200, 1200' to send and receive the status information and the control signals.

While not limited to such arrangements, configurations, devices or systems, one or more embodiments of the devices, apparatuses, systems, methods, storage mediums, etc. discussed herein may be used with an apparatus or system as aforementioned, such as, but not limited to, for example, the system 10, the system 20, the system 100, the system 100', the system 100", the devices, apparatuses, or systems of FIGS. 1-15, any other device, apparatus or system discussed herein, etc. In one or more embodiments, one user may perform the method(s) discussed herein. In one or more embodiments, one or more users may perform the method(s) discussed herein. In one or more embodiments, one or more of the computers, CPUs, processors, etc. discussed herein may be used to process, control, update, emphasize, and/or change one or more of the imaging modalities, and/or process the related techniques, functions or methods, or may process the electrical signals as discussed above.

Additionally, unless otherwise specified, the term "subset" of a corresponding set does not necessarily represent a proper subset and may be equal to the corresponding set.

The present disclosure and/or one or more components of devices, systems and storage mediums, and/or methods, thereof also may be used in conjunction with optical coherence tomography probes. Such probes include, but are not limited to, the OCT imaging systems disclosed in U.S. Pat. Nos. 6,763,261; 7,366,376; 7,843,572; 7,872,759; 8,289,522; 8,676,013; 8,928,889; 9,087,368; 9,557,154; 10,912,462; 9,795,301; and 9,332,942 to Tearney et al. and arrangements and methods of facilitating photoluminescence imaging, such as those disclosed in U.S. Pat. No. 7,889,348 to Tearney et al., as well as the disclosures directed to multimodality imaging disclosed in U.S. Pat. No. 9,332,942 and U.S. Patent Publication Nos. 2010/0092389, 2011/0292400, 2012/0101374, 2014/0276011, 2017/0135584, 2016/0228097, 2018/0045501 and 2018/0003481, WO 2016/015052 to Tearney et al. and WO 2016/144878, each of which patents, patent publications and patent application(s) are incorporated by reference herein in their entireties. As aforementioned, any feature or aspect of the present disclosure may be used with OCT imaging systems, apparatuses, methods, storage mediums or other aspects or features as discussed in U.S. patent application Ser. No. 16/414,222, filed on May 16, 2019, the entire disclosure of which is incorporated by reference herein in its entirety, as discussed in U.S. Pat. Pub. No. 2019/0374109, which was published on Dec. 12, 2019, the disclosure of which is incorporated by reference herein in its entirety, as discussed in U.S. Pat. App. No. 62/944,064, filed on Dec. 5, 2019, the disclosure of which is incorporated by reference herein in its entirety, as discussed in U.S. Pat. Pub. No. 2021/0077037, published on Mar. 18, 2021, as discussed in U.S. Pat. Pub. No. 2021/0174125, published on Jun. 10, 2021, and as discussed in U.S. patent application Ser. No. 17/098,042, filed on Nov. 13, 2020, the disclosure of which is incorporated by reference herein in its entirety.

The present disclosure and/or one or more components of devices, systems, and storage mediums, and/or methods, thereof also may be used in conjunction with OCT imaging systems and/or catheters and catheter systems, such as, but not limited to, those disclosed in U.S. Pat. Nos. 9,869,828; 10,323,926; 10,558,001; 10,601,173; 10,606,064; 10,743,749; 10,884,199; 10,895,692; and 11,175,126 as well as U.S. Patent Publication Nos. 2019/0254506; 2020/0390323; 2021/0121132; 2021/0174125; 2022/0040454; 2022/0044428; and WO2021/055837, each of which patents and patent publications are incorporated by reference herein in their entireties.

Although the disclosure herein has been described with reference to particular embodiments, it is to be understood that these embodiments are merely illustrative of the principles and applications of the present disclosure (and are not limited thereto). It is therefore to be understood that numerous modifications may be made to the illustrative embodiments and that other arrangements may be devised without departing from the spirit and scope of the present disclosure. The scope of the following claims is to be accorded the broadest interpretation so as to encompass all such modifications, equivalent structures and functions.

What is claimed is:

1. An image processing apparatus comprising:
a catheter or probe including one or more markers or radiopaque markers, the catheter or probe operating to be used by the image processing apparatus to obtain one or more angiography images of an object and operating to obtain one or more intravascular images of the object; and one or more processors that operate to:

obtain the one or more angiography images of the object;

obtain the one or more intravascular images at an acquisition location that is within at least a portion of the object, wherein the one or more angiography images are obtained before the obtaining of the one or more intravascular images, after the obtaining of the one or more intravascular images, or simultaneously with the obtaining of the one or more intravascular images, and wherein the one or more angiography images are obtained from a first data source and the one or more intravascular images are obtained independently from a second data source;

estimate or determine one or more angio delay times or one or more delay times each being a latency difference between the first data source and the second data source by measuring the one or more angio delay times or the one or more delay times with synchronized signals or a controlled pullback; and in a case where the controlled pullback is used to measure the one or more angio delay times or the one or more delay times, conduct the controlled pullback and review data in the one or more angiography images, determine or label a location or locations of the one or more markers or radiopaque markers, apply linear regression processing to calculate a fractional starting time or a time where the one or more markers or radiopaque markers move or start to move, estimate or determine the one or more angio delay times or the one or more delay times or the one or more angio delay times or the one or more delay times and a tolerance error(s) for the one or more angio delay times or the one or more delay times based on the fractional starting time or the time where the one or more markers or radiopaque markers move or start to move, and, in a case where the estimated or determined one or more angio delay times or the one or more delay times or the estimated or determined one or more angio delay times or the one or more delay times and the tolerance error(s) is/are within a predetermined or set respective threshold, the one or more processors further operate to one or more of the following: accept the estimated or determined one or more angio delay times or the one or more delay times or the one or more angio delay times or the one or more delay times and the tolerance error(s), synchronize the one or more angiography images with the one or more intravascular images using the estimated or determined one or more angio delay times or the one or more delay times, and/or enter the estimated or determined one or more angio delay times or the one or more delay times or the one or more angio delay times or the one or more delay times and the tolerance error(s) in a result data table.

2. The apparatus of claim 1, wherein the one or more processors further operate to estimate or determine the one or more angio delay times or the one or more delay times by calculating a difference between the fractional starting time or the time where the one or more markers or radiopaque markers move or start to move and a time of a first intravascular image of the one or more intravascular images obtained in, during, or near the controlled pullback.

3. The apparatus of claim 1, further comprising a spin motor and a linear pullback motor, wherein:

(i) the one or more processors further operate to find each of the estimated or determined one or more angio delay times or the one or more delay times as a difference in time between a time where a recording is ready after the spin motor starts and achieves a steady, predetermined, or target speed and a time where the one or more angiography images are starting to be obtained;

(ii) the one or more processors further operate to determine an initiation time for the controlled pullback and an image capturing start time for the controlled pullback, a difference between the initiation time and the image capturing start time representing a time that the linear pullback motor takes to go from a default or rest state to a pullback-ready state during which the linear pullback motor starts the controlled pullback and captures the one or more intravascular images and/or the linear pullback motor starts the controlled pullback and then captures the one or more angiography images;

(iii) the one or more processors further operate to calculate a total delay time or times by adding each of the estimated or determined one or more angio delay times or the one or more delay times, a data transfer delay time, or other delay time to a respective difference between the initiation time and the image capturing start time of the controlled pullback or by adding a data transfer or other delay time to a difference between a time a first angiography image is captured and the image capturing start time of the controlled pullback, and/or the one or more processors further operate to interpolate the start time of the controlled pullback into a sub angio interval level, which operates to match the first intravascular image of the one or more intravascular images with a time stamp between two adjacent angio images; and (iv) the one or more processors further operate to determine a time period during which the one or more angiography images and/or the one or more intravascular images are obtained for the pullback, the time period starting at a first time which is after the start time of the controlled pullback by an amount equal to the respective angio delay time or the delay time of the one or more angio delay times or the one or more delay times, and the time period ending at a second time which is after an end time of the pullback by an amount equal to the respective angio delay time or the delay time of the one or more angio delay times or the one or more delay times.

4. The apparatus of claim 1, wherein one or more of the following:

(i) data for the controlled pullback includes one or more data packets, where each of the one or more data packets includes intravascular image frames and one or more of the data packets include video frames;

(ii) a frame acquisition rate for the one or more intravascular images is 200 frames per second (FPS), a length of the controlled pullback is 80 mm, the duration of the controlled pullback is 2.0 seconds, and an average frame resolution on a horizontal pullback distance is about 0.2 mm per frame; and/or (iii) the apparatus further includes a clock and a video acquisition board or frame grabber that operates to capture the video frames into digital frames and register the digital frames with the one or more processors with a time stamp from the clock, where the time stamp operates to adjust, order, or rank a relative relevance, order, or display of the one or more angiography images and/or the one or more intravascular images.

5. The apparatus of claim 4, wherein:
(i) the intravascular image frames of the one or more data packets include Optical Coherence Tomography (OCT) image frame(s), Multi-Modal OCT (MM-OCT) images, near-infrared fluorescence (NIRF) image frame (s), near-infrared auto-fluorescence (NIRAF) image frame(s), other intravascular image frame(s), and/or a combination of OCT, MM-OCT, NIRF, NIRAF, and/or other intravascular image frames;
(ii) the one or more processors further operate to obtain, calculate, or determine a relative delay time between a time for the one or more MM-OCT images, OCT images, intravascular images, or other imaging modality images and the respective angio delay time or the delay time of the one or more angio delay times or the one or more delay times to perform angiography image synchronization;
(iii) the one or more processors operate to set a target time to synchronize for each of the one or more intravascular images and each of the one or more angiography images as a time at a middle or other predetermined location of each image acquisition; and/or
(iv) the one or more processors further operate to evaluate a sample rate for the one or more intravascular images and a sample rate for the one or more angiography images to determine an accuracy of the image, delay, or synchronization result(s).

6. The apparatus of claim 1, wherein the one or more processors further operate to:
(i) display a graphical user interface (GUI) on a display, where the GUI operates to manage delay time information or angio delay time information for multiple Operating Rooms (ORs) or other locations so that the apparatus operates to be used in different locations;
(ii) perform an initialization process that operates to add or include data for all of the ORs or other locations to the apparatus; and
(iii) perform the estimation or determination of the one or more angio delay times or the delay times for each location among all of the ORs and the other locations having data added or included in to the apparatus to allow for angio delay compensation to be applied for all pullbacks done in each location among all of the ORs and the other locations.

7. The apparatus of claim 1, further comprising:
a rotating device having a stationary portion and a rotating portion, the stationary portion and the rotating portion each having a window or area where the window or area of the rotating portion operates to overlap with the window or area of the stationary portion at one or more times during the rotation of the rotating portion,
wherein, in the case where the synchronized signals are used to measure the one or more angio delay times or the one or more delay times, the one or more processors further operate to:
(i) prepare the apparatus and the catheter or probe with near-infrared fluorescence (NIRF) light and/or near-infrared auto-fluorescence (NIRAF) light and/or prepare the rotating portion of the rotating device to be spun or rotated for a pullback;
(ii) start the pullback, turn on the NIRF and/or NIRAF light, and trigger the rotation of the rotating portion of the rotating device to rotate for one or more rounds under an angio image view;
(iii) on or using the angio frames, detect the frames with a partially or completely open window or area and calculate the open windows or areas for each image frame;
(iv) on or using the one or more intravascular images, detect the frames where the NIRF and/or NIRAF light is turned on by detecting a signal for the NIRF and/or NIRAF light and finding a center, middle, or other predetermined portion of the NIRF and/or NIRAF signal; and/or
(v) calculate the one or more angio delay times or the one or more delay times by determining a peak time where the calculated open windows or areas are at a maximum and/or based on a signal represented by an amount of overlap between at least the open windows or areas of the rotating device from one or more open areas in one or more angio images, by determining or identifying a corresponding time value for a corresponding portion or location of the NIRF and/or NIRAF light, and calculate a time difference between the peak time and the determined or identified corresponding time value for the corresponding portion or location of the NIRF and/or NIRAF light.

8. The apparatus of claim 7, wherein:
(i) the rotating portion and the stationary portion of the rotating device each comprise a plate having the same size and/or shape and each plate having the windows or areas of the same size and/or shape; or the rotating portion and the stationary portion of the rotating device each comprise a plate having the same size and/or shape and each plate having the windows or areas of the same size and/or shape, and the shape is one of: triangular, trapezoidal, square, rectangular, trapezoidal, or circular;
(ii) the stationary portion is fixed on a base or other location of the rotating device, and the rotating portion operates to rotate around an axis over, or adjacent to, the stationary portion such that the rotating portion acts as a shutter where the shutter is open in a case where the windows or areas of the rotating portion and the stationary portion are partially or completely overlapping, and where the shutter is otherwise closed;
(iii) the rotating device uses X-rays that operate to pass through or be blocked by the windows or areas that are detectable in the one or more angiography images to evaluate and confirm whether the windows or areas are partially or completely overlapping or not; and
(iv) the rotating device includes a switch and a light emitting diode (LED), where the switch operates to connect both of the rotating portion and the stationary portion at a point where the windows or areas are at the peak time such that the switch turns on the LED at the peak time and turns off the LED during other times.

9. The apparatus of claim 8, wherein the one or more processors further operate to:
(i) display or show the overlapping windows or areas from the closed position or condition for the shutter to the fully overlapped, maximum area for the windows or areas at the peak time;
(ii) measure a size of the windows or areas in each image frame of the one or more intravascular images and/or in each frame of the one or more angiography images; and
(iii) in a case where a peak time is in between frames, use two adjacent frames to interpolate the peak time to achieve an improved accuracy of a location of the peak time.

10. The apparatus of claim 7, wherein the one or more processors further operate to:
(i) display a graphical user interface (GUI) on a display, where the GUI operates to manage delay time information or angio delay time information for multiple Operating Rooms (ORs) or other locations so that the apparatus operates to be used in different locations;
(ii) perform an initialization process that operates to add or include data for all of the ORs or other locations to the apparatus; and
(iii) perform the estimation or determination of the one or more angio delay times or the delay times for each location among all of the ORs and the other locations having data added or included in to the apparatus to allow for angio delay compensation to be applied for all pullbacks done in each location among all of the ORs and the other locations, and/or record the estimated or determined one or more angio delay times or the delay times.

11. The apparatus of claim 1, wherein the object is or includes a blood vessel or a vessel having blood in or being flushed from the vessel.

12. The apparatus of claim 1, wherein the one or more processors further operate to one or more of the following:
co-register the obtained one or more angiography images and the one or more intravascular images;
co-register the obtained one or more angiography images and the one or more intravascular images, the one or more angiography images and the one or more intravascular images being of multiple imaging modalities, where the multiple imaging modalities include one or more of the following: one or more Optical Coherence Tomography (OCT) or Intravascular Ultrasound (IVUS) images or frames; a tomography image; a fluorescence image; a near-infrared fluorescence (NIRAF) image; a near-infrared fluorescence (NIRAF) image in a predetermined view, a carpet view, and/or an indicator view; a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); a Magnetic Resonance Imaging (MRI) image; an X-ray image or view; and an angiography view; and/or
display an image for each of multiple imaging modalities on a display, wherein the multiple imaging modalities include two or more of the following: a tomography image; an Optical Coherence Tomography (OCT) image; a fluorescence image; a near-infrared fluorescence (NIRAF) image; a near-infrared fluorescence (NIRAF) image in a predetermined view, a carpet view, and/or an indicator view; a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); Magnetic Resonance Imaging (MRI);
Intravascular Ultrasound (IVUS); an X-ray image or view; and an angiography view.

13. A method for measuring or determining one or more delay times and/or for performing angiography synchronization using an imaging apparatus having one or more processors and having a catheter or probe including or being in communication with one or more markers or radiopaque markers, the catheter or probe operating to be used by the imaging apparatus to obtain one or more angiography images of an object and operating to obtain one or more intravascular images of the object, the method comprising:
obtaining, via the one or more processors, the one or more angiography images of the object;
obtaining, via the one or more processors, the one or more intravascular images at an acquisition location that is within at least a portion of the object, wherein the one or more angiography images are obtained before the obtaining of the one or more intravascular images, after the obtaining of the one or more intravascular images, or simultaneously with the obtaining of the one or more intravascular images, and wherein the one or more angiography images are obtained from a first data source and the one or more intravascular images are obtained independently from a second data source;
estimating or determining, via the one or more processors, one or more angio delay times or one or more delay times each being a latency difference between the first data source and the second data source by measuring the one or more angio delay times or the one or more delay times with synchronized signals or a controlled pullback;
determining whether to use one of the synchronized signals and the controlled pullback; and
in a case where the controlled pullback is used, conducting, via the one or more processors, the controlled pullback and reviewing data in the one or more angiography images, determining or labeling a location or locations of the one or more markers or radiopaque markers, applying linear regression processing to calculate a fractional starting time or a time where the one or more markers or radiopaque markers move or start to move, estimating or determining the one or more angio delay times or the one or more delay times or the one or more angio delay times or the one or more delay times and a tolerance error(s) for the one or more angio delay times or the one or more delay times based on the fractional starting time or the time where the one or more markers or radiopaque markers move or start to move, and, in a case where the estimated or determined one or more angio delay times or the one or more delay times or the estimated or determined one or more angio delay times or the one or more delay times and the tolerance error(s) is/are within a predetermined or set respective threshold, performing one or more of the following: accepting the estimated or determined one or more angio delay times or the one or more delay times or the one or more angio delay times or the one or more delay times and the tolerance error(s), synchronizing the one or more angiography images with the one or more intravascular images using the estimated or determined one or more angio delay times or the one or more delay times, and/or entering the estimated or determined one or more angio delay times or the one or more delay times or the one or more angio delay times or the one or more delay times and the tolerance error(s) in a result data table.

14. The method of claim 13, wherein the estimating or determining of the one or more angio delay times or the one or more delay times further comprises calculating a difference between the fractional starting time or the time where the one or more markers or radiopaque markers move or start to move and a time of a first intravascular image of the one or more intravascular images obtained in, during, or near the controlled pullback.

15. The method of claim 13, further comprising:
(i) finding, via the one or more processors, each of the estimated or determined one or more angio delay times or the one or more delay times as a difference in time between a time where a recording is ready after a spin motor of the imaging apparatus starts and achieves a steady, predetermined, or target speed and a time where the one or more angiography images are starting to be obtained;
(ii) determining, via the one or more processors, an initiation time for the controlled pullback and an image capturing start time for the controlled pullback, a difference between the initiation time and the image capturing start time representing a time that a linear pullback motor of the imaging apparatus takes to go from a default or rest state to a pullback-ready state during which the linear pullback motor starts the controlled pullback and captures the one or more intravascular images and/or the linear pullback motor starts the controlled pullback and then captures the one or more angiography images;
(iii) calculating, via the one or more processors, a total delay time or times by adding each of the estimated or determined one or more angio delay times or the one or more delay times, a data transfer delay time, or other delay time to a respective difference between the initiation time and the image capturing start time of the controlled pullback or by adding a data transfer or other delay time to a difference between a time a first angiography image is captured and the image capturing start time of the controlled pullback, and/or interpolating the start time of the controlled pullback into a sub angio interval level, which operates to match the first intravascular image of the one or more intravascular images with a time stamp between two adjacent angio images; and
(iv) determining, via the one or more processors, a time period during which the one or more angiography images and/or the one or more intravascular images are obtained for the pullback, the time period starting at a first time which is after the start time of the controlled pullback by an amount equal to the respective angio delay time or the delay time of the one or more angio delay times or the one or more delay times, and the time period ending at a second time which is after an end time of the pullback by an amount equal to the respective angio delay time or the delay time of the one or more angio delay times or the one or more delay times.

16. The method of claim 13, further comprising:
capturing data for the controlled pullback, the data including one or more data packets, where each of the one or more data packets includes intravascular image frames and one or more of the data packets include video frame, the video frames being captured into digital frames, and
registering the digital frames with the one or more processors with a time stamp, where the time stamp operates to adjust, order, or rank a relative relevance, order, or display of the one or more angiography images and/or the one or more intravascular images.

17. The method of claim 16, wherein the intravascular image frames of the one or more data packets include Optical Coherence Tomography (OCT) image frame(s), Multi-Modal OCT (MM-OCT) images, near-infrared fluorescence (NIRF) image frame(s), near-infrared auto-fluorescence (NIRAF) image frame(s), other intravascular image frame(s), and/or a combination of OCT, MM-OCT, NIRF, NIRAF, and/or other intravascular image frames; and the method further comprises:
(i) obtaining, calculating, or determining, via the one or more processors, a relative delay time between a time for the one or more MM-OCT images, OCT images, intravascular images, or other imaging modality images and the respective angio delay time or the delay time of the one or more angio delay times or the one or more delay times to perform angiography image synchronization;
(ii) setting a target time to synchronize for each of the one or more intravascular images and each of the one or more angiography images as a time at a middle or other predetermined location of each image acquisition; and/or
(iii) evaluating a sample rate for the one or more intravascular images and a sample rate for the one or more angiography images to determine an accuracy of the image, delay, or synchronization result(s).

18. The method of claim 13, further comprising:
(i) displaying a graphical user interface (GUI) on a display, where the GUI operates to manage delay time information or angio delay time information for multiple Operating Rooms (ORs) or other locations so that the apparatus operates to be used in different locations;
(ii) performing an initialization process that operates to add or include data for all of the ORs or other locations to the apparatus; and
(iii) performing the estimation or determination of the one or more angio delay times or the delay times for each location among all of the ORs and the other locations having data added or included in to the apparatus to allow for angio delay compensation to be applied for all pullbacks done in each location among all of the ORs and the other locations.

19. The method of claim 13, in a case where the synchronized signals are used and where the imaging apparatus further includes, or is in communication with, a rotating device having a stationary portion and a rotating portion, the stationary portion and the rotating portion each having a window or area where the window or area of the rotating portion operates to overlap with the window or area of the stationary portion at one or more times during the rotation of the rotating portion, the method further comprises:
(i) preparing the imaging apparatus and the catheter or probe with near-infrared fluorescence (NIRF) light and/or near-infrared auto-fluorescence (NIRAF) light and/or preparing the rotating portion of the rotating device to be spun or rotated for a pullback;
(ii) starting the pullback, turning on the NIRF and/or NIRAF light, and triggering the rotation of the rotating portion of the rotating device to rotate for one or more rounds under an angio image view;
(iii) on or using the angio frames, detecting, via the one or more processors, the frames with a partially or completely open window or area and calculating the open windows or areas for each image frame;
(iv) on or using the one or more intravascular images, detecting, via the one or more processors, the frames where the NIRF and/or NIRAF light is turned on by detecting a signal for the NIRF and/or NIRAF light and finding a center, middle, or other predetermined portion of the NIRF and/or NIRAF signal; and/or
(v) calculating the one or more angio delay times or the one or more delay times by determining a peak time where the calculated open windows or areas are at a maximum and/or based on a signal represented by an amount of overlap between at least the open windows or areas of the rotating device from one or more open areas in one or more angio images, by determining or identifying a corresponding time value for a corresponding portion or location of the NIRF and/or NIRAF light, and calculating a time difference between the peak time and the determined or identified corresponding time value for the corresponding portion or location of the NIRF and/or NIRAF light.

20. The method of claim 19, wherein the stationary portion is fixed on a base or other location of the rotating device, and the rotating portion operates to rotate around an axis over, or adjacent to, the stationary portion such that the rotating portion acts as a shutter where the shutter is open in a case where the windows or areas of the rotating portion and of the stationary portion are partially or completely overlapping, and where the shutter is otherwise closed; and the method further comprising:
(i) displaying or showing the overlapping windows or areas from the closed position or condition for the shutter to the fully overlapped, maximum area for the windows or areas at the peak time;
(ii) measuring a size or sizes of the windows or areas in each image frame of the one or more intravascular images and/or in each frame of the one or more angiography images; and
(iii) in a case where a peak time is in between frames, using two adjacent frames to interpolate the peak time to achieve an improved accuracy of a location of the peak time.

21. The method of claim 19, further comprising:
(i) displaying a graphical user interface (GUI) on a display, where the GUI operates to manage delay time information or angio delay time information for multiple Operating Rooms (ORs) or other locations so that the apparatus operates to be used in different locations;
(ii) performing an initialization process that operates to add or include data for all of the ORs or other locations to the apparatus; and
(iii) performing the estimation or determination of the one or more angio delay times or the delay times for each location among all of the ORs and the other locations having data added or included in to the apparatus to allow for angio delay compensation to be applied for all pullbacks done in each location among all of the ORs and the other locations, and/or record the estimated or determined one or more angio delay times or the delay times.

22. The method of claim 13, wherein the object is or includes a blood vessel or a vessel having blood in or being flushed from the vessel.

23. The method of claim 13, further comprising:
co-registering the obtained one or more angiography images and the one or more intravascular images;
co-registering the obtained one or more angiography images and the one or more intravascular images, the one or more angiography images and the one or more intravascular images being of multiple imaging modalities, where the multiple imaging modalities include one or more of the following: one or more Optical Coherence Tomography (OCT) or Intravascular Ultrasound (IVUS) images or frames; a tomography image; a fluorescence image; a near-infrared fluorescence (NIRAF) image; a near-infrared fluorescence (NIRAF) image in a predetermined view, a carpet view, and/or an indicator view; a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); a Magnetic Resonance Imaging (MRI) image; an X-ray image or view; and an angiography view; and/or
displaying an image for each of multiple imaging modalities on a display, wherein the multiple imaging modalities include two or more of the following: a tomography image; an Optical Coherence Tomography (OCT) image; a fluorescence image; a near-infrared fluorescence (NIRAF) image; a near-infrared fluorescence (NIRAF) image in a predetermined view, a carpet view, and/or an indicator view; a three-dimensional (3D) rendering; a 3D rendering of a vessel; a 3D rendering of a vessel in a half-pipe view or display; a 3D rendering of the object; a lumen profile; a lumen diameter display; a longitudinal view; computer tomography (CT); Magnetic Resonance Imaging (MRI); Intravascular Ultrasound (IVUS); an X-ray image or view; and an angiography view.

24. A non-transitory computer-readable storage medium storing at least one program for causing a computer to execute a method for measuring or determining one or more delay times and/or for performing angiography synchronization using an imaging apparatus having one or more processors and having a catheter or probe including or being in communication with one or more markers or radiopaque markers, the catheter or probe operating to be used by the imaging apparatus to obtain one or more angiography images of an object and operating to obtain one or more intravascular images of the object, the method comprising:
obtaining, via the one or more processors, the one or more angiography images of the object;
obtaining, via the one or more processors, the one or more intravascular images at an acquisition location that is within at least a portion of the object, wherein the one or more angiography images are obtained before the obtaining of the one or more intravascular images, after the obtaining of the one or more intravascular images, or simultaneously with the obtaining of the one or more intravascular images, and wherein the one or more angiography images are obtained from a first data source and the one or more intravascular images are obtained independently from a second data source;
estimating or determining, via the one or more processors, one or more angio delay times or one or more delay times each being a latency difference between the first data source and the second data source by measuring the one or more angio delay times or the one or more delay times with synchronized signals or a controlled pullback;
determining whether to use one of the synchronized signals and the controlled pullback; and
in a case where the controlled pullback is used, conducting, via the one or more processors, the controlled pullback and reviewing data in the one or more angiography images, determining or labeling a location or locations of the one or more markers or radiopaque markers, applying linear regression processing to calculate a fractional starting time or a time where the one or more markers or radiopaque markers move or start to move, estimating or determining the one or more angio delay times or the one or more delay times or the one or more angio delay times or the one or more delay times and a tolerance error(s) for the one or more angio delay times or the one or more delay times based on the fractional starting time or the time where the one or more markers or radiopaque markers move or start to move, and, in a case where the estimated or determined one or more angio delay times or the one or more delay times or the estimated or determined one or more angio delay times or the one or more delay times and the tolerance error(s) is/are within a predetermined or set respective threshold, performing one or more of the following: accepting the estimated or determined one or more angio delay times or the one or more delay times or the one or more angio delay times or the one or more delay times and the tolerance error(s), synchronizing the one or more angiography images with the one or more intravascular images using the estimated or determined one or more angio delay times or the one or more delay times, and/or entering the estimated or determined one or more angio delay times or the one or more delay times or the one or more angio delay times or the one or more delay times and the tolerance error(s) in a result data table.

* * * * *